(12) United States Patent
Sudo et al.

(10) Patent No.: US 10,323,186 B2
(45) Date of Patent: Jun. 18, 2019

(54) NEMATIC LIQUID CRYSTAL COMPOSITION AND LIQUID CRYSTAL DISPLAY ELEMENT USING THE SAME

(71) Applicant: DIC Corporation, Tokyo (JP)

(72) Inventors: Go Sudo, Kita-adachi-gun (JP); Marina Goto, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 101 days.

(21) Appl. No.: 15/525,723

(22) PCT Filed: Dec. 10, 2015

(86) PCT No.: PCT/JP2015/084647
§ 371 (c)(1),
(2) Date: May 10, 2017

(87) PCT Pub. No.: WO2016/104165
PCT Pub. Date: Jun. 30, 2016

(65) Prior Publication Data
US 2017/0327742 A1 Nov. 16, 2017

(30) Foreign Application Priority Data

Dec. 25, 2014 (JP) ................. 2014-261948

(51) Int. Cl.
| | |
|---|---|
| *C09K 19/12* | (2006.01) |
| *C08F 120/10* | (2006.01) |
| *C08K 5/00* | (2006.01) |
| *C09K 19/30* | (2006.01) |
| *C09K 19/38* | (2006.01) |
| *C09K 19/54* | (2006.01) |
| *C08L 33/04* | (2006.01) |
| *C08L 63/00* | (2006.01) |
| *C08L 101/02* | (2006.01) |
| *G02F 1/13* | (2006.01) |
| *G02F 1/1337* | (2006.01) |
| *G02F 1/00* | (2006.01) |
| *C09K 19/20* | (2006.01) |

(Continued)

(52) U.S. Cl.
CPC ............. *C09K 19/12* (2013.01); *C08F 120/10* (2013.01); *C08K 5/00* (2013.01); *C08L 33/04* (2013.01); *C08L 63/00* (2013.01); *C08L 101/02* (2013.01); *C09K 19/2014* (2013.01); *C09K 19/30* (2013.01); *C09K 19/3003* (2013.01); *C09K 19/322* (2013.01); *C09K 19/38* (2013.01); *C09K 19/388* (2013.01); *C09K 19/3852* (2013.01); *C09K 19/54* (2013.01); *G02F 1/0045* (2013.01); *G02F 1/13* (2013.01); *G02F 1/1337* (2013.01); *C09K 2019/0448* (2013.01); *C09K 2019/0466* (2013.01); *C09K 2019/122* (2013.01); *C09K 2019/123* (2013.01); *C09K 2019/301* (2013.01); *C09K 2019/303* (2013.01); *C09K 2019/3004* (2013.01); *C09K 2019/305* (2013.01); *C09K 2019/3009* (2013.01); *C09K 2019/3013* (2013.01); *C09K 2019/3019* (2013.01); *C09K 2019/3027* (2013.01); *C09K 2019/3036* (2013.01); *C09K 2019/3422* (2013.01); *Y10T 428/10* (2015.01)

(58) Field of Classification Search
CPC .. C09K 19/322; C09K 19/38; C09K 19/3852; C09K 19/388; C09K 19/54; C09K 2019/122; C09K 2019/123; C09K 2019/3004; C09K 2019/3009; C09K 2019/301; C09K 2019/3013; C09K 2019/3019; C09K 2019/3027; C09K 2019/303; C09K 2019/3036; C09K 2019/305; C09K 2019/3422; G02F 1/0045; G02F 1/1337; Y10T 428/10
USPC ...... 428/1.1, 1.55; 252/299.01, 299.6, 299.61
See application file for complete search history.

(56) References Cited

U.S. PATENT DOCUMENTS

| | | |
|---|---|---|
| 5,384,065 A | 1/1995 | Geelhaar et al. |
| 5,599,480 A | 2/1997 | Tarumi et al. |

(Continued)

FOREIGN PATENT DOCUMENTS

| | | |
|---|---|---|
| CN | 102876338 A | 1/2013 |
| EP | 0 474 062 A2 | 3/1992 |

(Continued)

OTHER PUBLICATIONS

International Search Report dated Jan. 26, 2016, issued in counterpart International Application No. PCT/JP2015/084647 (3 pages).

(Continued)

*Primary Examiner* — Ruiyun Zhang
(74) *Attorney, Agent, or Firm* — Westerman, Hattori, Daniels & Adrian, LLP

(57) ABSTRACT

There is provided a liquid crystal composition that exhibits a sufficiently low viscosity ($\eta$), a sufficiently low rotational viscosity ($\gamma 1$), and a large elastic modulus ($K_{33}$) without decreasing the refractive index anisotropy ($\Delta n$) and the nematic phase-isotropic liquid phase transition temperature ($T_{ni}$) and without increasing the solid phase-nematic phase transition temperature ($T_{cn}$). The liquid crystal display element that uses this liquid crystal composition satisfactorily obtains a pretilt angle and has a high voltage holding ratio (VHR) and high-speed response. Thus, a liquid crystal display element that has no or less alignment defects and display defects such as image sticking, and has high display quality and high response speed is obtained.

8 Claims, No Drawings

(51) Int. Cl.
*C09K 19/32* (2006.01)
*C09K 19/04* (2006.01)
*C09K 19/34* (2006.01)

(56) References Cited

U.S. PATENT DOCUMENTS

| | | |
|---|---|---|
| 5,653,911 A | 8/1997 | Kondo et al. |
| 5,720,899 A | 2/1998 | Kondo et al. |
| 6,066,268 A | 5/2000 | Ichinose et al. |
| 6,613,245 B1 | 9/2003 | Ohlemacher et al. |
| 8,092,871 B2 | 1/2012 | Usui et al. |
| 8,603,358 B2 | 12/2013 | Kuriyama et al. |
| 9,005,477 B2 | 4/2015 | Kuriyama et al. |
| 9,045,684 B2 | 6/2015 | Gotoh et al. |
| 9,725,651 B2 | 8/2017 | Hirata et al. |
| 10,113,115 B2 | 10/2018 | Maruyama et al. |
| 2002/0014613 A1 | 2/2002 | Klasen et al. |
| 2003/0222245 A1 | 12/2003 | Klasen-Memmer et al. |
| 2004/0099842 A1 | 5/2004 | Klasen-Memmer et al. |
| 2004/0146662 A1 | 7/2004 | Klasen-Memmer et al. |
| 2005/0116200 A1 | 6/2005 | Nakanishi et al. |
| 2005/0224758 A1 | 10/2005 | Yamamoto et al. |
| 2006/0238696 A1 | 10/2006 | Wen et al. |
| 2008/0090026 A1 | 4/2008 | Bernatz et al. |
| 2008/0149891 A1 | 6/2008 | Klasen-Memmer et al. |
| 2008/0191167 A1 | 8/2008 | Klasen-Memmer et al. |
| 2009/0103011 A1 | 4/2009 | Bernatz et al. |
| 2010/0025631 A1 | 2/2010 | Son et al. |
| 2010/0051864 A1 | 3/2010 | Klasen-Memmer et al. |
| 2010/0134751 A1 | 6/2010 | Klasen-Memmer et al. |
| 2010/0149446 A1 | 6/2010 | Fujisawa et al. |
| 2011/0043747 A1 | 2/2011 | Kawasaki et al. |
| 2011/0149226 A1 | 6/2011 | Saito et al. |
| 2011/0155953 A1 | 6/2011 | Hattori et al. |
| 2011/0175027 A1 | 7/2011 | Hattori et al. |
| 2011/0253933 A1 | 10/2011 | Hirata et al. |
| 2011/0253936 A1 | 10/2011 | Kurisawa et al. |
| 2012/0092608 A1 | 4/2012 | Ito et al. |
| 2012/0097895 A1 | 4/2012 | Kuriyama et al. |
| 2012/0161072 A1 | 6/2012 | Saito et al. |
| 2012/0162595 A1 | 6/2012 | Lee et al. |
| 2012/0181478 A1 | 7/2012 | Hattori et al. |
| 2012/0200794 A1 | 8/2012 | Matsumoto et al. |
| 2012/0229744 A1 | 9/2012 | Hattori et al. |
| 2012/0261614 A1 | 10/2012 | Goto et al. |
| 2012/0292567 A1 | 11/2012 | Kuriyama et al. |
| 2012/0292568 A1 | 11/2012 | Kuriyama et al. |
| 2012/0305843 A1 | 12/2012 | Klasen-memmer et al. |
| 2013/0038956 A1 | 2/2013 | Matsumoto et al. |
| 2013/0069002 A1 | 3/2013 | Yanai et al. |
| 2013/0114010 A1 | 5/2013 | Goetz et al. |
| 2013/0265527 A1 | 10/2013 | Takeuchi et al. |
| 2013/0277609 A1 | 10/2013 | Goto et al. |
| 2014/0010973 A1 | 1/2014 | Gotoh et al. |
| 2014/0027671 A1 | 1/2014 | Gotoh et al. |
| 2014/0028964 A1 | 1/2014 | Klasen-Memmer et al. |
| 2014/0043579 A1 | 2/2014 | Furusato et al. |
| 2014/0085591 A1 | 3/2014 | Feng et al. |
| 2014/0097383 A1 | 4/2014 | Furusato et al. |
| 2014/0183409 A1 | 7/2014 | Gotoh et al. |
| 2015/0123032 A1 | 5/2015 | Sudo et al. |
| 2015/0187984 A1 | 7/2015 | Yamashita et al. |
| 2015/0218450 A1 | 8/2015 | Sudo et al. |
| 2015/0299570 A1 | 10/2015 | Kurisawa et al. |
| 2016/0009999 A1 | 1/2016 | Hirata et al. |
| 2016/0122650 A1 | 5/2016 | Hirata et al. |
| 2016/0274418 A1 | 9/2016 | Schadt et al. |
| 2016/0289565 A1 | 10/2016 | Sudo et al. |
| 2016/0319191 A1 | 11/2016 | Hirata et al. |

FOREIGN PATENT DOCUMENTS

| | | |
|---|---|---|
| EP | 2 420 548 A1 | 2/2012 |
| EP | 2 522 649 A1 | 11/2012 |
| EP | 2 977 428 A1 | 1/2016 |
| EP | 3 144 367 A1 | 3/2017 |
| JP | H01-240591 A | 9/1989 |
| JP | H01-247482 A | 10/1989 |
| JP | H02-223822 A | 9/1990 |
| JP | H08-12605 A | 1/1996 |
| JP | H08-104869 A | 4/1996 |
| JP | H11-140447 A | 5/1999 |
| JP | 2000-258760 A | 9/2000 |
| JP | 2001-354967 A | 12/2001 |
| JP | 2002-145830 A | 5/2002 |
| JP | 2002-521354 A | 7/2002 |
| JP | 2003-307720 A | 10/2003 |
| JP | 2003-327965 A | 11/2003 |
| JP | 2004-302096 A | 10/2004 |
| JP | 2004-532344 A | 10/2004 |
| JP | 2005-183374 A | 7/2005 |
| JP | 2005-272562 A | 10/2005 |
| JP | 2005-320511 A | 11/2005 |
| JP | 2006-37054 A | 2/2006 |
| JP | 2006-301643 A | 11/2006 |
| JP | 2007-002132 A | 1/2007 |
| JP | 2008-116931 A | 5/2008 |
| JP | 2008-143902 A | 6/2008 |
| JP | 2008-144135 A | 6/2008 |
| JP | 2008-208365 A | 9/2008 |
| JP | 2008-239569 A | 10/2008 |
| JP | 2009-504814 A | 2/2009 |
| JP | 2009-057562 A | 3/2009 |
| JP | 2009-270085 A | 11/2009 |
| JP | 2011-042696 A | 3/2011 |
| JP | 2011-144274 A | 7/2011 |
| JP | 2011-213787 A | 10/2011 |
| JP | 2012-018215 A | 1/2012 |
| JP | 2012-077200 A | 4/2012 |
| JP | 2012-87165 A | 5/2012 |
| JP | 2012-97222 A | 5/2012 |
| JP | 2012-097222 A | 5/2012 |
| JP | 2012-136623 A | 7/2012 |
| JP | 2012-240945 A | 12/2012 |
| JP | 2012-241124 A | 12/2012 |
| JP | 2013-503952 A | 2/2013 |
| JP | 2013-76061 A | 4/2013 |
| JP | 2013-112631 A | 6/2013 |
| JP | 2013-166883 A | 8/2013 |
| JP | 2013-180974 A | 9/2013 |
| JP | 5333685 B2 | 11/2013 |
| JP | 2014-43561 A | 3/2014 |
| JP | 2014-141648 A | 8/2014 |
| JP | 2014-231568 A | 12/2014 |
| JP | 2015-157915 A | 9/2015 |
| JP | WO2013-161576 A1 | 12/2015 |
| JP | WO2014-024648 A1 | 7/2016 |
| WF | 2007/077872 A1 | 7/2007 |
| WO | 2010/029843 A1 | 3/2010 |
| WO | 2010/084823 A1 | 7/2010 |
| WO | 2010/119779 A1 | 10/2010 |
| WO | 2010/131600 A1 | 11/2010 |
| WO | 2011/055643 A1 | 5/2011 |
| WO | 2011/062017 A1 | 5/2011 |
| WO | 2011/074384 A1 | 6/2011 |
| WO | 2012/022391 A2 | 2/2012 |
| WO | 2012/043386 A1 | 4/2012 |
| WO | 2012/086504 A1 | 6/2012 |
| WO | 2012/130380 A1 | 10/2012 |
| WO | 2012/137810 A1 | 10/2012 |
| WO | 2013/022088 A1 | 2/2013 |
| WO | 2013/125379 A1 | 8/2013 |
| WO | 2013/161576 A1 | 10/2013 |
| WO | 2014/007118 A1 | 1/2014 |
| WO | 2014/148472 A1 | 9/2014 |

OTHER PUBLICATIONS

Notification of Reasons for Refusal dated May 24, 2016, issued in counterpart Japanese Patent Application No. 2016-515567, w/English translation (6 pages).

NEMATIC LIQUID CRYSTAL COMPOSITION AND LIQUID CRYSTAL DISPLAY ELEMENT USING THE SAME

TECHNICAL FIELD

The present invention relates to a liquid crystal composition that contains a polymerizable compound and a liquid crystal display element that uses the liquid crystal composition,

BACKGROUND ART

Polymer sustained alignment (PSA)-type liquid crystal display apparatuses have a structure in which a polymer structure is formed in a cell to control the pretilt angle of liquid crystal molecules, and have been developed as liquid crystal display elements that offer high-speed response and high contrast.

A PSA-type liquid crystal display element is manufactured by injecting a liquid crystal composition composed of a liquid crystal compound and a polymerizable compound into a gap between substrates, and polymerizing the polymerizable compound while having liquid crystal molecules aligned under voltage application so as to fix the alignment of the liquid crystal, molecules. It is known that some of the causes of image sticking, i.e., a display defect of PSA-type liquid crystal display elements, are impurities and changes in alignment of liquid crystal molecules (changes in pretilt angle).

Image sticking caused by impurities occurs because of the polymerizable compound that has remained after incomplete polymerization, and the polymerization initiator added to accelerate the progress of polymerization. Thus, it is necessary to minimize the amount of the polymerizable compound remaining after completion of the polymerization and to reduce the amount of the polymerization initiator added. For example, adding a large quantify of polymerization initiators to completely carry out polymerization degrades the voltage holding ratio of the liquid crystal display element due to the residual polymerization initiator and adversely affects the display quality. When the quantity of the polymerization initiator used during the polymerization is decreased to suppress degradation of the voltage holding ratio, the polymerization does not proceed completely, the polymerizable compound remains, and occurrence of the image sticking due to the residual polymerizable compound is inevitable.

One possible method to completely cure the polymerizable compound by adding a small amount of a polymerization initiator and to reduce the residual polymerizable compound is to apply a large quantity of energy, such as irradiation with an intense ultraviolet ray, for a long time during polymerization. However, this requires scaled-up production facilities, the production efficiency is thus degraded, and issues such as deterioration of the liquid crystal composition due to ultraviolet rays arise. Thus, according to a liquid crystal composition of related art that contains a polymerizable compound, it has been difficult to simultaneously decrease the amount of the uncured residual polymerizable compound and the amount of the residual polymerization initiator.

Image sticking also occurs due to a change in the pretilt angle of liquid crystal molecules. That is, differences among the cured products of the polymerizable compound change the pretilt angle when the same pattern is kept displayed in the display element for a long time, and this causes image sticking. In such a case, a polymerizable compound that forms an appropriate polymer structure is desired.

In order to prevent image sticking, there have been disclosed a display element configured by using a polymerizable compound that has a structure such as a 1,4-phenylene group as the ring structure (refer to PTL 1), and a display element configured by using a polymerizable compound having a biaryl structure (refer to PTL 2). However, these polymerizable compounds have low miscibility with the liquid crystal compound, and, when a liquid crystal composition is prepared therefrom, precipitation of the polymerizable compound occurs. Thus, it has been difficult to apply these compounds to practical liquid crystal compositions.

To prevent image sticking by improving the rigidity of the polymer, there has been proposed a liquid crystal display element configured by using a liquid crystal composition prepared by mixing a bifunctional polymerizable compound and a trifunctional or higher functional polymerizable compound, such as dipentaerythritol pentaacrylate or dipentaerythritol hexaacrylate (refer to PTL 3). However, since neither dipentaerythritol pentaacrylate nor dipentaerythritol hexaacrylate has a ring structure in the molecule, their affinity to the liquid crystal compound is weak, and the alignment-anchoring force is weak. Thus, there has been an issue of insufficient alignment stability. Moreover, addition of the polymerization initiator is indispensable in polymerizing these polymerizable compounds, and the polymerizable compound remains after polymerization unless the polymerization initiator is added.

In view of the above, it has been difficult to simultaneously satisfy requirements of the liquid crystal composition that contains a polymerizable compound, in other words, the image sticking properties of the liquid crystal display element, the alignment stability, the stability of the liquid crystal composition not causing precipitation, the production efficiency in producing the PSA-type liquid crystal display element, etc. Further improvements are needed.

While attempts to resolve the issues of display defects caused by alignment of the liquid crystal molecules in a PSA-type liquid crystal display element having useful display performance (contrast and response speed) are being made by studying polymerizable compound, some liquid crystal compositions have not been suitable for use in PSA-type liquid crystal display elements depending on the constituent components of the liquid crystal composition constituting the PSA-type liquid crystal display element. In particular, there has been disclosed a liquid crystal composition that contains a liquid crystal compound that has an alkenyl group side chain effective for decreasing the viscosity for improving the response performance. This liquid crystal composition is effective for decreasing the response speed of a VA-type liquid crystal display element (refer to PTL 4); however, there has been a new issue concerning alignment control in that, after polymerization of the polymerizable compound during the process of producing a PSA-type liquid crystal display element, the pretilt angle of the liquid crystal molecules cannot be smoothly imparted. When an appropriate pretilt is not imparted to the liquid crystal molecules, the direction in which the liquid crystal molecules move during operation cannot be regulated, and issues, such as degradation of contrast due to the liquid crystal molecules not tilting in a particular direction, slow response speed, etc., arise.

In view of the above, it has become necessary to achieve not only the performance, such as high contrast, high-speed response, high voltage holding ratio, etc., required for vertical alignment-type liquid crystal display elements, such as VA-type elements, but also the performance, such as formation of an appropriate pretilt angle, successive stability of the pretilt angle, etc., required for PSA-type liquid crystal display elements.

CITATION LIST

Patent Literature

PTL 1: Japanese Unexamined Patent Application Publication No. 2003-307720
PTL 2: Japanese Unexamined Patent Application Publication No. 2008-116931
PTL 3: Japanese Unexamined Patent Application Publication No. 2004-302096
PTL 4: Japanese Unexamined Patent Application Publication (Translation of PCT Application) No. 2009-504814

SUMMARY OF INVENTION

Technical Problem

In order to obtain a liquid crystal composition that has a low viscosity and high-speed response, it is effective to use a liquid crystal compound having a bicyclohexane structure, in particular, a liquid crystal compound that has both an alkenyl group and a bicyclohexane structure. However, when a polymerizable compound is added to such a liquid crystal composition and a PSA- or PSVA-type liquid crystal display element is produced, issues such as alignment defects and display defects caused by an insufficient pretilt angle, a large quantity of residual monomers, a low voltage holding ratio (VHR), etc., arise. Moreover, the pretilt angle and the residual monomers cannot be controlled, optimization and reduction of the energy cost of production become difficult, and the production efficiency is degraded. Thus, a stable mass production has not been achieved.

An object of the present invention is to provide a liquid crystal composition that contains a polymerizable compound for producing a PSA- or PSVA-type liquid crystal display element that has excellent response performance, a satisfactory pretilt angle, and less residual monomers, and suffer no or less issues such as alignment defects and display defects caused by a low voltage holding ratio (VHR) and the like. A liquid crystal display element that uses the liquid crystal composition is also provided.

Solution to Problem

Extensive studies conducted by the inventors of the present invention revealed that the object can be achieved by a liquid crystal composition that contains a polymerizable compound having a particular chemical structure and a liquid crystal compound. Thus, the present invention has been made.

The present invention provides a liquid crystal composition that contains at least one polymerizable compound represented by general formula (I-1).

[Chem. 1]

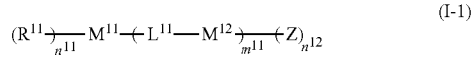
(I-1)

(In the formula, Z represents a hydrogen atom, an alkyl group having 1 to 12 carbon atoms, an alkoxy group having 1 to 12 carbon atoms, or $P^{12}$-$S^{12}$-, $R^{11}$ represents $P^{11}$-$S^{11}$-, and $P^{11}$ and $P^{12}$ each independently represent a group selected from formula (R-1) to formula (R-15).

[Chem. 2]

(R-1)

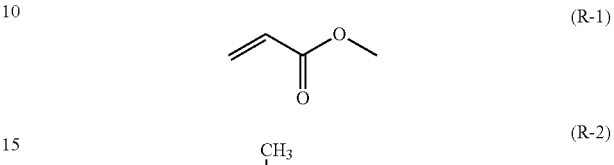
(R-2)

(R-3)

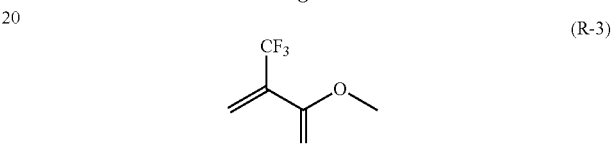
(R-4)

(R-5)

(R-6)

(R-7)

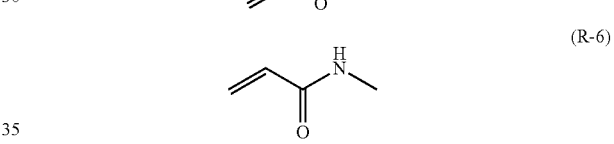
(R-8)

(R-9)

(R-10)

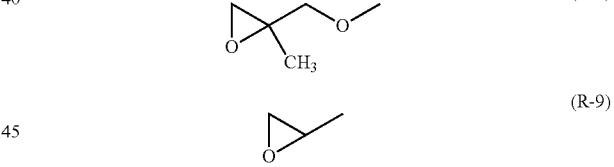
(R-11)

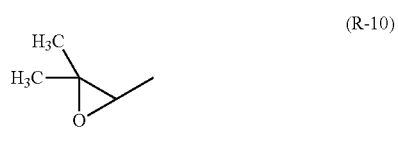
(R-12)

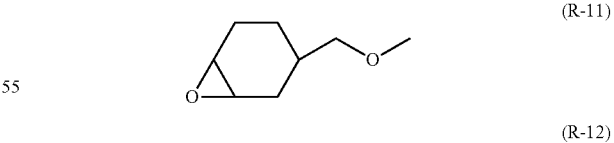
(R-13)

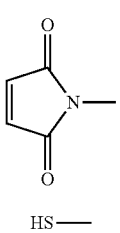

(R-14)

HS— (R-15)

$S^{11}$ and $S^{12}$ each independently represent a single bond or an alkylene group having 1 to 15 carbon atoms, one —$CH_2$— or two or more non-adjacent —$CH_2$— in the alkylene group may each be substituted with —O—, —OCO—, or —COO— as long as oxygen atoms are not directly adjacent to each other, $n^{11}$ represents an integer of 1 to 3, $n^{12}$ represents an integer of 1 to 3, and $m^{11}$ represents an integer of 0 to 4, $M^{11}$ represents a divalent cyclic group selected from a 1,4-phenylene group, a 1,4-cyclohexylene group, a pyridine-2,5-diyl group, a pyrimidine-2,5-diyl group, a naphthalene-2,6-diyl group, an indane-2,5-diyl group, a 1,2,3,4-tetrahydronaphthalene-2,6-diyl group, a 1,3-dioxane-2,5-diyl group, and a phenanthrene-2,7-diyl group; however, when $n^{11}$ represents 2 or 3 and/or when $m^{11}$ represents 0 and $n^{12}$ represents 2 or 3, $M^{11}$ further has a bond at any desired position in the divalent cyclic group, $M^{12}$ each independently represent a divalent cyclic group selected from a 1,4-phenylene group, a 1,4-cyclohexylene group, a pyridine-2,5-diyl group, a pyrimidine-2,5-diyl group, a naphthalene-2,6-diyl group, an indane-2,5-diyl group, a 1,2,3,4-tetrahydronaphthalene-2,6-diyl group, a 1,3-dioxane-2,5-diyl group, and a phenanthrene-2,7-diyl group; however, when $n^{12}$ represents 2 or 3, $M^{12}$ bonded to Z further has a bond at any desired position in the divalent cyclic group ($M^{12}$ not bonded to Z are each independently selected from the divalent cyclic groups described above), at least one cyclic group selected from those represented by $M^{11}$ and, if exists, $M^{12}$ may be substituted with at least one alkyl group having 1 to 12 carbon atoms, at least one alkoxy group having 1 to 12 carbon atoms, or at least one halogen, but at least one cyclic group selected from those represented by $M^{11}$ and, if exists, $M^{12}$ is substituted with at least one alkoxy group having 1 to 12 carbon atoms, $L^{11}$ represents a single bond, —O—, —S—, —$CH_2$—, —$OCH_2$—, —$CH_2O$—, —CO—, —$C_2H_4$—, —COO—, —OCO—, —$OCOOCH_2$—, —$CH_2OCOO$—, —$OCH_2CH_2O$—, —CO—$NR^a$—, —$NR^a$—CO—, —$SCH_2$—, —$CH_2S$—, —CH=$CR^a$—COO—, —CH=$CR^a$—OCO—, —COO—$CR^a$=CH—, —OCO—$CR^a$=CH—, —COO—$CR^a$=CH—COO—, —COO—$CR^a$=CH—OCO—, —OCO—$CR^a$=CH—COO—, —OCO—$CR^a$=CH—OCO—, —($CH_2$)$_Y$—C(=O)—O—, —($CH_2$)$_Y$—O—(C=O)—, —O—(C=O)—($CH_2$)$_Y$—, —(C=O)—O—($CH_2$)$_Y$—, —CH=CH—, —CF=CF—, —CF=CH—, —CH=CF—, —$CF_2$—, —$CF_2O$—, —$OCF_2$—, —$CF_2CH_2$—, —$CH_2CF_2$—, —$CF_2CF_2$—, or —C≡C— (in the formulae, $R^a$ each independently represent a hydrogen atom or an alkyl group having 1 to 4 carbon atoms, and Y represents an integer of 1 to 4), and when two or more $R^{11}$, two or more Z, two or more $L^{11}$, and two or more $M^{12}$ are present, they may each be the same or different). A liquid crystal display element that uses the liquid crystal composition is also provided.

Advantageous Effects of Invention

A liquid crystal composition according to the present invention is a liquid crystal composition that exhibits a sufficiently low viscosity ($\eta$), a sufficiently low rotational viscosity ($\gamma 1$), and a large elastic modulus ($K_{33}$) without decreasing the refractive index anisotropy ($\Delta n$) and the nematic phase-isotropic liquid phase transition temperature ($T_{ni}$) and without increasing the solid phase-nematic phase transition temperature ($T_{cn}$). A liquid crystal display element that uses this liquid crystal composition satisfactorily obtains a pretilt angle, contains less residual monomers, and has a high voltage holding ratio (VHR) and high-speed response. Thus, a liquid crystal display element that has no or less alignment defects and display defects such as image sticking, and has high display quality and high response speed is obtained.

In the liquid crystal composition according to the present invention, by adjusting the content and the combination of the polymerizable compounds, the pretilt angle and residual monomers can be controlled, the energy cost for production can be optimized and reduced, and thus production efficiency can be easily improved. Thus, the liquid crystal display element of the present invention is highly useful.

DESCRIPTION OF EMBODIMENTS

A liquid crystal composition according to the present invention contains a polymerizable compound represented by general formula (I-1).

[Chem. 3]

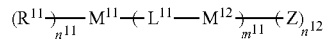

(I-1)

In the formula, Z represents a hydrogen atom, an alkyl group having 1 to 12 carbon atoms, an alkoxy group having 1 to 12 carbon atoms, or $P^{12}$—$S^{12}$—, but preferably represents $P^{12}$—$S^{12}$—. In the formula, $R^{11}$ represents $P^{11}$—$S^{11}$—, and $P^{11}$ and $P^{12}$ each independently represent one of formula (R-1) to formula (R-15).

[Chem. 4]

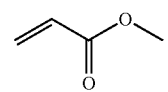

(R-1)

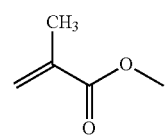

(R-2)

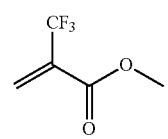

(R-3)

(R-4) [chemical structure: allyl methyl ether type]

(R-5) [chemical structure: vinyl methyl ether type]

(R-6) [chemical structure: N-methyl acrylamide]

(R-7) [chemical structure: glycidyl methyl ether]

(R-8) [chemical structure: methyl-substituted glycidyl methyl ether]

(R-9) [chemical structure: ethylene oxide / oxirane]

(R-10) [chemical structure: 2,2-dimethyl oxirane]

(R-11) [chemical structure: 7-oxabicyclo[4.1.0]heptane with methoxymethyl]

(R-12) [chemical structure: 3-methyl-3-propyl oxetane]

(R-13) [chemical structure: 3-methyl-3-(methoxymethyl)oxetane]

(R-14) [chemical structure: N-methyl maleimide]

(R-15) HS—

However, formula (R-1) or formula (R-2) is preferable.

In the formulae, $S^{11}$ and $S^{12}$ each independently represent a single bond or an alkylene group having 1 to 15 carbon atoms, and one or more —CH$_2$— in the alkylene group may each be substituted with —O—, —OCO—, or —COO— as long as oxygen atoms are not directly adjacent to each other. However, a single bond or an alkylene group having 1 to 6 carbon atoms is preferable, and a single bond is more preferable. When the solubility with the liquid crystal composition is important, an alkylene group having 1 to 6 carbon atoms is preferable, an alkylene group having 1 to 3 carbon atoms is more preferable, an alkylene group having 1 or 2 carbon atoms is yet more preferable; and one or more —CH$_2$— in the alkylene group may each be substituted with —O—, —OCO—, or —COO— as long as oxygen atoms are not directly adjacent to each other. Of $S^{11}$ and $S^{12}$ that are present, at least one represents a single bond, but preferably both $S^{11}$ and $S^{12}$ represent a single bond.

In the formula, $n^{11}$ represents an integer of 1 to 3, $n^{12}$ represents an integer of 1 to 3, $n^{11}+n^{12}$ is and integer of 1 to 6, and when two or more $R^{11}$ and two or more Z are present, they may each be the same or different. $n^{11}$ preferably represents an integer of 1 or 2, and $n^{12}$ preferably represents an integer of 1 or 2. Furthermore, $n^{11}+n^{12}$ is preferably and integer of 1 to 5, more preferably an integer of 1 to 4, yet more preferably an integer of 1 to 3, and most preferably an integer of 2 or 3.

In the formula, $m^{11}$ represents an integer of 0 to 4, When two or more $L^{11}$ and two or more $M^{12}$ are present, they may each be the same or different. Furthermore, $m^{11}$ preferably represents an integer of 1 to 3. When the polymerization rate is important, $m^{11}$ preferably represents an integer of 2 to 4, and $m^{11}$ more preferably represents 2 or 3. When miscibility with the liquid crystal composition is important, $m^{11}$ preferably represents an integer of 0 to 2. Thus, in order to achieve both the polymerization rate and the miscibility, $m^{11}$ particularly preferably represents 2.

In the formula, $M^{11}$ represents a divalent cyclic group selected from a 1,4-phenylene group, a 1,4-cyclohexylene group, a pyridine-2,5-diyl group, a pyrimidine-2,5-diyl group, a naphthalene-2,6-diyl group, an indane-2,5-diyl group, a 1,2,3,4-tetrahydronaphthalene-2,6-diyl group, a 1,3-dioxane-2,5-diyl group, and a phenanthrene-2,7-diyl group. $M^{11}$ preferably represents a divalent cyclic group selected from a 1,4-phenylene group, a naphthalene-2,6-diyl group, and a phenanthrene-2,7-diyl group; and when $n^{11}$ represents 2 or 3 and/or when $m^{11}$ represents 0 and $n^{12}$ represents 2 or 3, the divalent cyclic group further has a bond at any desired position.

In the formula, $M^{12}$ represents a divalent cyclic group selected from a 1,4-phenylene group, a 1,4-cyclohexylene group, a pyridine-2,5-diyl group, a pyrimidine-2,5-diyl group, a naphthalene-2,6-diyl group, an indane-2,5-diyl group, a 1,2,3,4-tetrahydronaphthalene-2,6-diyl group, a 1,3-dioxane-2,5-diyl group, and a phenanthrene-2,7-diyl group, $M^{12}$ preferably represents a divalent cyclic group selected from a 1,4-phenylene group, a naphthalene-2,6-diyl group, and a phenanthrene-2,7-diyl group. When $n^{12}$ represents 2 or 3, $M^{12}$ bonded to Z further has a bond at any desired position in the divalent cyclic group, but $M^{12}$ not bonded to Z are each independently selected from the divalent cyclic groups described above.

In the formula, at least one cyclic group selected from those represented by $M^{11}$ and, if exists, $M^{12}$ may be substituted with at least one alkyl group having 1 to 12 carbon atoms, at least one alkoxy group having 1 to 12 carbon atoms, or at least one halogen; however, at least one cyclic group selected from those represented by $M^{11}$ and, if exists, $M^{12}$ is substituted with at least one alkoxy group having 1 to 12 carbon atoms.

The alkoxy group is preferably an alkoxy group having 1 to 6 carbon atoms, preferably an alkoxy group having 1 to 5 carbon atoms, preferably an alkoxy group having 1 to 4 carbon atoms, preferably an alkoxy group having 1 to 3 carbon atoms, preferably an alkoxy group having 1 or 2 carbon atoms, and, particularly preferably an alkoxy group having 1 carbon atom.

$L^{11}$ represents a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —OCH$_2$CH$_2$O—, —CO—NR$^a$—, —NR$^a$—CO—, —SCH$_2$—, —CH$_2$S—, —CH═CR$^a$—COO—, —CH═CR$^a$—OCO—, —COO—CR$^a$═CH—, —OCO—CR$^a$═CH—, —COO—CR$^a$═CH—COO—, —COO—CR$^a$═CH—OCO—, —OCO—CR$^a$═CH—COO—, —OCO—CR$^a$=CH—OCO—, —(CH$_2$)$_Y$—C(=O)—O—, —(CH$_2$)$_Y$—O—(C=O)—, —O—(C=O)—(CH$_2$)$_Y$—, —(C=O)—O—(CH$_2$)$_Y$—, —CH=CH—, —CF=CF—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— (in the formulae, R$^a$ each independently represent a hydrogen atom or an alkyl group having 1 to 4 carbon atoms, and in the formulae, Y represents an integer of 1 to 4). However, L$^{11}$ preferably represents a single bond, —OCH$_2$—, —CH$_2$O—, —C$_2$H$_4$—, —COO—, —OCO—, —CH=CR$^a$—COO—, —CH=CR$^a$—OCO—, —COO—CR$^a$=CH—, —OCO—CR$^a$=CH—, —(CH$_2$)$_Y$—COO—, —(CH$_2$)$_Y$—OCO—, —OCO—(CH$_2$)$_Y$—, —COO—(CH$_2$)$_Y$—, —CH=CH—, —CF$_2$O—, —OCF$_2$—, or —C≡C— (in the formulae, R$^a$ each independently represent a hydrogen atom or an alkyl group having 1 to 3 carbon atoms; and in the formulae, Y represents an integer of 1 to 4), more preferably represents a single bond, —COO—, —OCO—, —CH=CH—COO—, —CH=CH—OCO—, —COO—CH=CH—, —OCO—CH=CH—, —(CH$_2$)$_2$—COO—, —(CH$_2$)$_2$—OCO—, —OCO—(CH$_2$)$_2$—, —COO—(CH$_2$)$_2$—, or —C≡C—, yet more preferably represents —COO—, —OCO—, —CH=CH—COO—, —OCO—CH=CH—, —(CH$_2$)$_2$—COO—, or —OCO—(CH$_2$)$_2$—, and most preferably represents —(CH$_2$)$_2$—COO— or —OCO—(CH$_2$)$_2$—.

Specific examples of the preferable polymerizable compound represented by general formula (I-1) include compounds represented by general formulae (I-11-01) to (I-11-10), general formulae (I-12-01) to (I-12-06), general formulae (I-13-01) to (I-13-04), general formulae (I-14-01) to (I-14-17), and general formulae (I-15-01) to (I-15-10) below.

[Chem. 5]

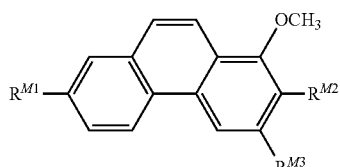
(I-11-01)

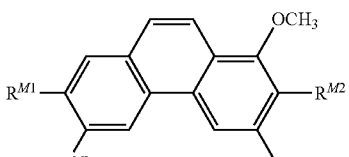
(I-11-02)

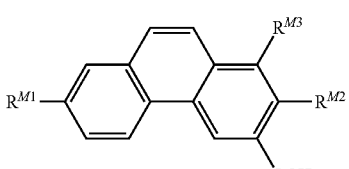
(I-11-03)

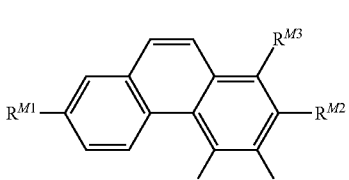
(I-11-04)

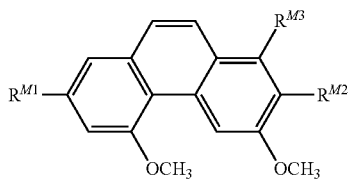
(I-11-05)

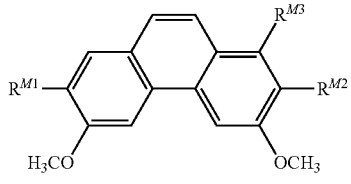
(I-11-06)

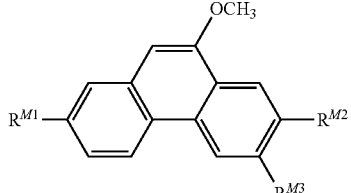
(I-11-07)

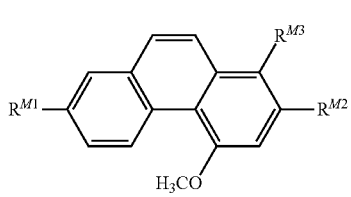
(I-11-08)

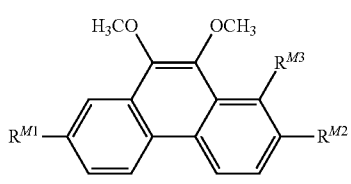
(I-11-09)

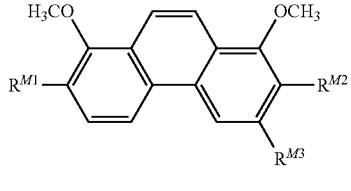
(I-11-10)

[Chem. 6]

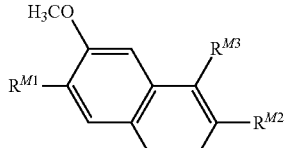
(I-12-01)

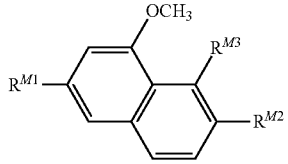
(I-12-02)

-continued
(I-12-03)
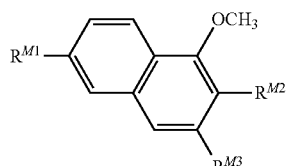
(I-12-04)
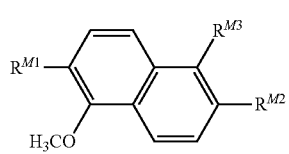
(I-12-05)
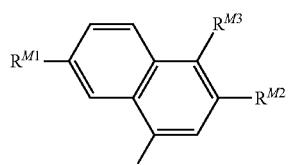
(I-12-06)
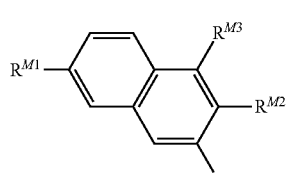
[Chem. 7]
(I-13-01)
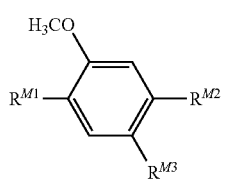
(I-13-02)
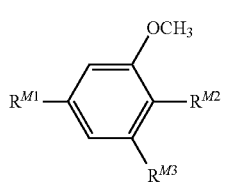
(I-13-03)
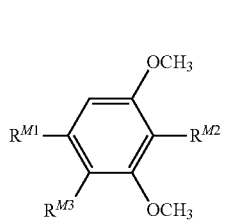
(I-13-04)
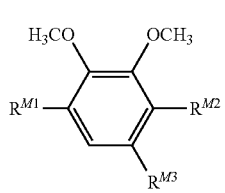
-continued
[Chem. 8]
(I-14-01)
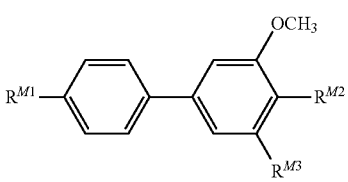
(I-14-02)
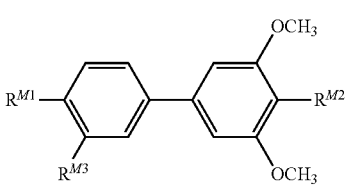
(I-14-03)
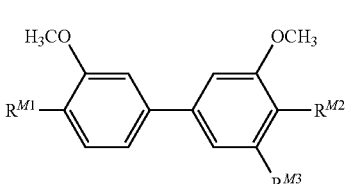
(I-14-04)
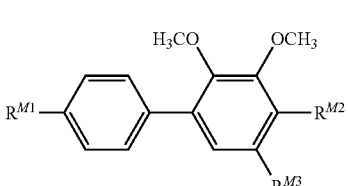
(I-14-05)
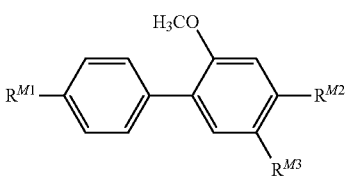
(I-14-06)
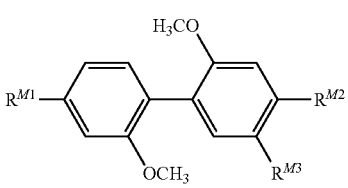
(I-14-07)
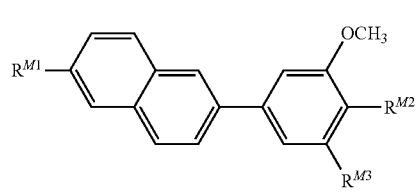
(I-14-08)
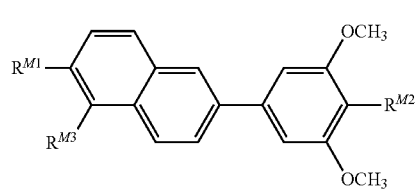

(I-14-09) 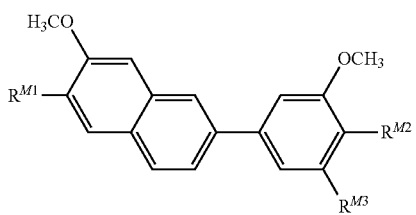
(I-14-10) 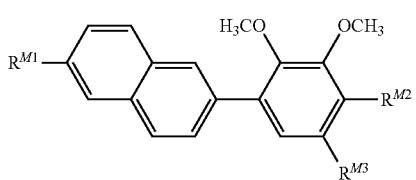
(I-14-11) 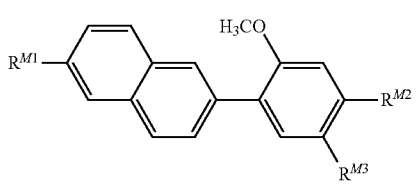
(I-14-12) 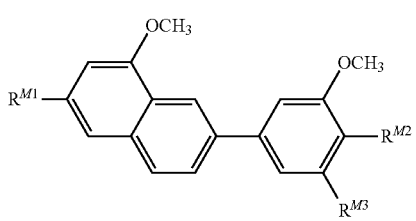
(I-14-13) 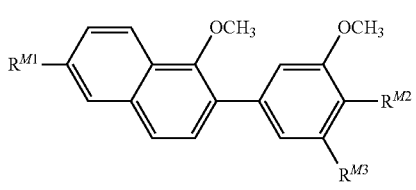
(I-14-14) 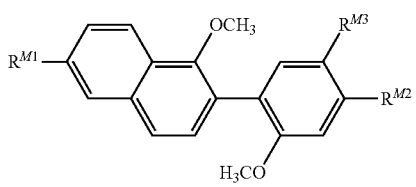
(I-14-15) 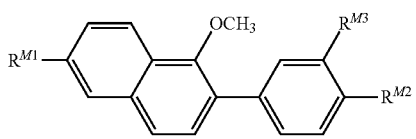
(I-14-16) 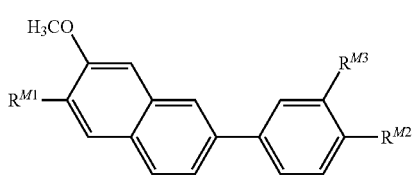
(I-14-17) 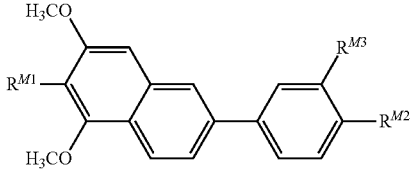
[Chem. 9]
(I-15-01) 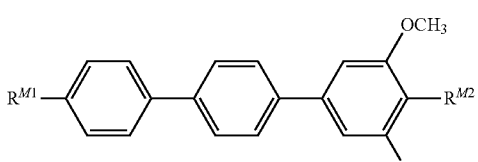
(I-15-02) 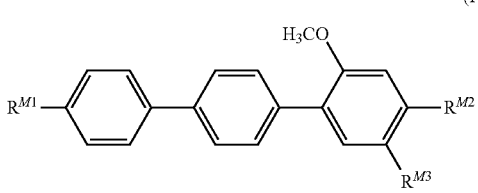
(I-15-03) 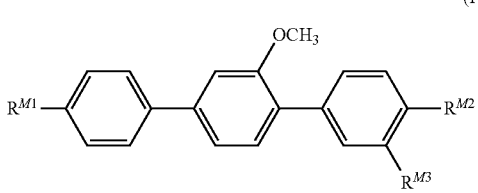
(I-15-04) 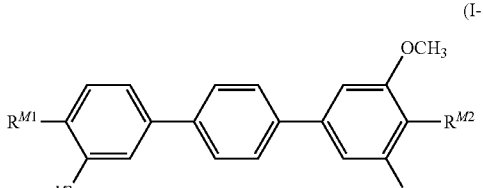
(I-15-05) 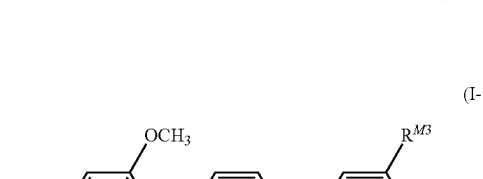
(I-15-06) 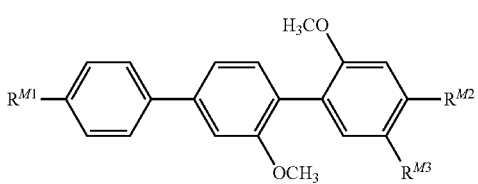

-continued (I-15-07)
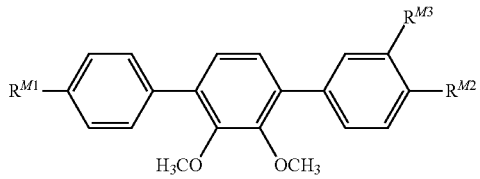

(I-15-08)
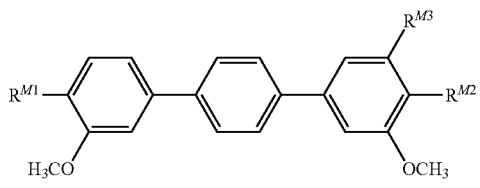

(I-15-09)
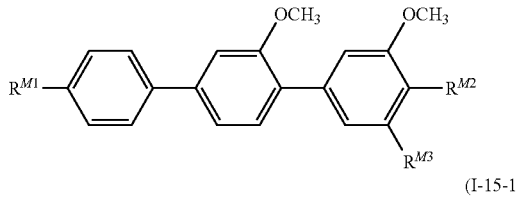

(I-15-10)
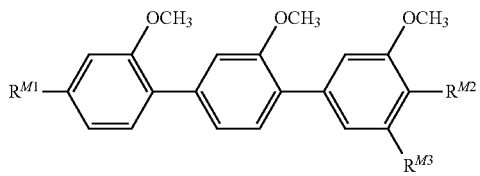

In the formulae, $R^{M1}$ represents $P^{15}—S^{15}—$, $R^{M2}$ and $R^{M3}$ each independently represent a hydrogen atom, an alkyl group having 1 to 5 carbon atoms, an alkoxy group having 1 to 5 carbon atoms, or $P^{16}—S^{16}—$; $P^{15}$ and $P^{16}$ represent the same groups as $P^{11}$ and $P^{12}$ defined in general formula (I-1); and $S^{15}$ and $S^{16}$ represent the same groups as $S^{11}$ and $S^{12}$ defined in general formula (I-1). $R^{M2}$ and $R^{M3}$ preferably each independently represent a hydrogen atom, an alkoxy group having 1 to 3 carbon atoms, or $P^{16}—S^{16}—$, and more preferably each independently represent a hydrogen atom or $P^{16}—S^{16}—$. $P^{15}$ and $P^{16}$ preferably each independently represent one of formula (R-1) to formula (R-5) described above, and more preferably each independently represent formula (R-1) or formula (R-2). $S^{15}$ and $S^{16}$ preferably each independently represent a single bond or an alkylene group having 1 to 6 carbon atoms, more preferably each independently represent a single bond or an alkylene group having 1 to 3 carbon atoms, and yet more preferably each independently represent a single bond or an alkylene group having 1 or 2 carbon atoms. One or more —CH$_2$— in the alkylene group may each be substituted with —O—, —OCO—, or —COO— as long as oxygen atoms are not directly adjacent to each other. When two or more $P^{16}$ and two or more $S^{16}$ are present, they may each be the same or different. The polymerizable compound represented by general formula (I-1) is preferably at least one selected from the group consisting of compounds represented by general formula (I-31) and general formula (I-32).

(I-31)
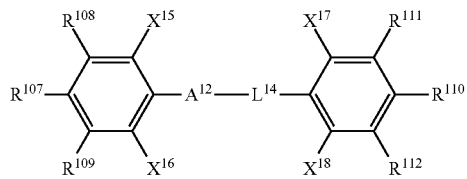

(I-32)
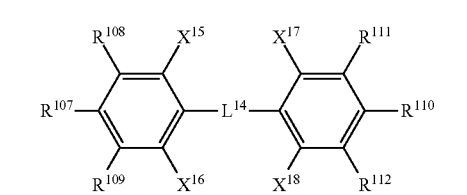

(In the formulae, $R^{107}$ and $R^{110}$ each represent $P^{13}—S^{13}—$, $R^{108}$, $R^{109}$, $R^{111}$, and $R^{112}$ each independently represent $P^{14}—S^{14}—$, an alkyl group having 1 to 5 carbon atoms, an alkoxy group having 1 to 5 carbon atoms, a fluorine atom, or a hydrogen atom; however, at least one selected from $R^{108}$, $R^{109}$, $R^{111}$, and $R^{112}$ preferably represents $P^{14}—S^{14}—$, at least one selected from $R^{111}$ and $R^{112}$ more preferably represents $P^{14}—S^{14}—$, and at least one selected from $R^{111}$ and $R^{112}$ yet more preferably represents $P^{14}—S^{14}—$. Here, $P^{13}$ and $P^{14}$ are the same as $P^{11}$ and $P^{12}$ defined in general formula (I-1), $S^{13}$ and $S^{14}$ are the same as $S^{11}$ and $S^{12}$ defined in general formula (I-1), and when two or more $P^{13}$, two or more $P^{14}$, two or more $S^{13}$, and two or more $S^{14}$ are present, they may each be the same or different. $P^{13}$ and $P^{14}$ preferably each independently represent one of formula (R-1) to formula (R-5) described above, and more preferably each independently represent formula (R-1) or formula (R-2). $S^{13}$ and $S^{14}$ preferably each independently represent a single bond or an alkylene group having 1 to 6 carbon atoms, more preferably each independently represent a single bond or an alkylene group having 1 to 3 carbon atoms, and yet more preferably each independently represent a single bond or an alkylene group having 1 or 2 carbon atoms. One or more —CH$_2$— in the alkylene group may each be substituted with —O—, —OCO—, or —COO— as long as oxygen atoms are not directly adjacent to each other. When two or more $P^{13}$, two or more $P^{14}$, two or more $S^{13}$, and two or more $S^{14}$ are present, they may each be the same or different.

The cyclic group $A^{12}$ represents a 1,4-phenylene group, a 1,4-cyclohexylene group, a pyridine-2,5-diyl group, a pyrimidine-2,5-diyl group, a naphthalene-2,6-diyl group, an indane-2,5-diyl group, a 1,2,3,4-tetrahydronaphthalene-2,6-diyl group, or a 1,3-dioxane-2,5-diyl group. The group may be unsubstituted or may be substituted with an alkyl group having 1 to 12 carbon atoms, an alkoxy group having 1 to 12 carbon atoms, a halogen, a cyano group, or a nitro group. The cyclic group $A^{12}$ is preferably a cyclic group selected from a 1,4-phenylene group, a naphthalene-2,6-diyl group, and a phenanthrene-2,7-diyl group.

$L^{14}$ represents a single bond, —OCH$_2$—, —CH$_2$O—, —C$_2$H$_4$—, —COO—, —OCO—, —CH=CR$^a$—COO—, —CH=CR$^a$—OCO—, —COO—CR$^a$=CH—, —OCO—CR$^a$=CH—, —(CH$_2$)$_t$—COO—, —(CH$_2$)$_t$—OCO—, —OCO—(CH$_2$)$_t$—, —COO—(CH$_2$)$_t$—, —CH=CH—, —CF$_2$O—, —OCF$_2$—, or —C≡C— (in the formulae, R$^a$ each independently represent a hydrogen atom or an alkyl group having 1 to 3 carbon atoms, and t represents an integer of 1 to 4), preferably represents —COO—, —OCO—, —CH=CH—COO—, —CH=CH—OCO—, —COO—CH=CH—, —OCO—CH=CH—, —(CH$_2$)$_2$—COO—, —(CH$_2$)$_2$—OCO—, —OCO—(CH$_2$)$_2$—, —COO—(CH$_2$)$_2$—, or —C≡C—, more preferably represents —COO—, —OCO—, —CH=CH—COO—, —OCO—CH=CH—, —(CH$_2$)$_2$—COO—, or —OCO—(CH$_2$)$_2$—, and yet more preferably represents —CH$_2$)$_2$—COO— or —OCO—(CH$_2$)$_2$—.

X$^{15}$, X$^{16}$, X$^{17}$, and X$^{18}$ each independently represent a hydrogen atom, an alkyl group having 1 to 12 carbon atoms, an alkoxy group having 1 to 12 carbon atoms, or a fluorine atom, preferably each independently represent a hydrogen atom or a fluorine atom, and yet more preferably each independently represent a hydrogen atom.

However, at least one selected from R$^{108}$, R$^{109}$, R$^{111}$, R$^{112}$, X$^{15}$, X$^{16}$, X$^{17}$, and X$^{18}$ represents an alkoxy group and/or A$^{12}$ is substituted with at least one alkoxy group having 1 to 5 carbon atoms.

Of the polymerizable compounds represented by general formula (I-31) and general formula (I-32), preferably, as indicated by the structure mentioned above, a compound has a mesogen structure having two or more cyclic groups, in which the linking group L$^{14}$ that links the rings to one another is a group having a particular structure, at least one position of the ring structure has an alkoxy group, and two or more polymerizable groups are contained.

Specific examples of the polymerizable compound represented by general formula (I-31) are compounds represented by general formula (I-31-01) to (I-31-09).

[Chem. 11]

(I-31-01)

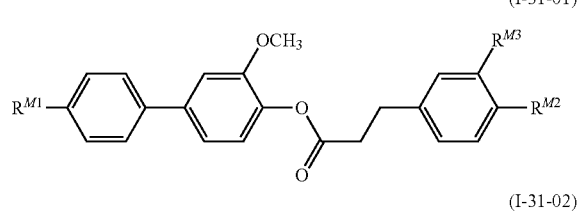

(I-31-02)

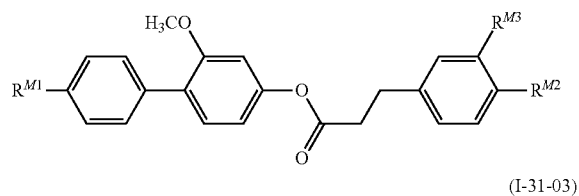

(I-31-03)

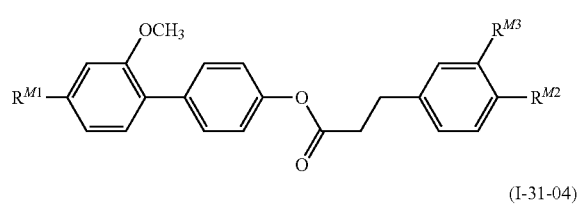

(I-31-04)

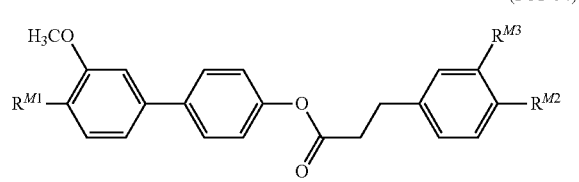

(I-31-05)

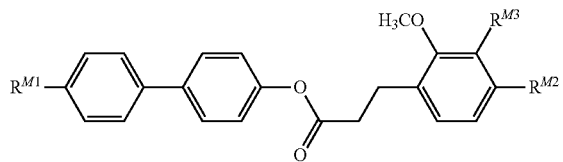

(I-31-06)

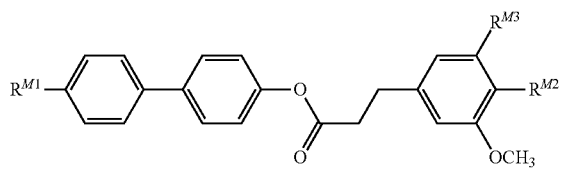

(I-31-07)

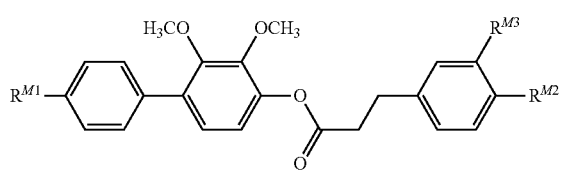

(I-31-08)

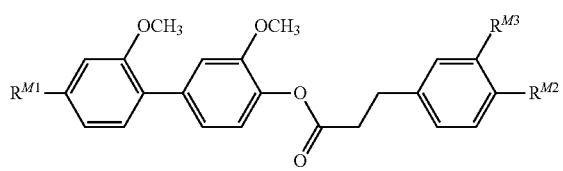

(I-31-09)

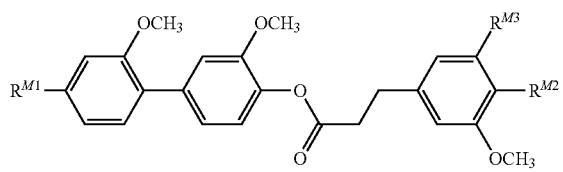

In the formulae, R$^{M1}$ and R$^{M2}$ each independently represent P$^{17}$—S$^{17}$—, R$^{M3}$ each independently represent a hydrogen atom, an alkyl group having 1 to 5 carbon atoms, an alkoxy group having 1 to 5 carbon atoms, or P$^{18}$—S$^{18}$—, P$^{17}$ and P$^{18}$ represent the same groups as P$^{11}$ and P$^{12}$ defined in general formula (I-1), and S$^{17}$ and S$^{18}$ represent the same groups as S$^{11}$ and S$^{12}$ defined in general formula (I-1). R$^{M3}$ preferably each independently represent a hydrogen atom, an alkoxy group having 1 to 3 carbon atoms, or P$^{18}$—S$^{18}$— and more preferably each independently represent a hydrogen atom or P$^{18}$—S$^{18}$—. P$^{17}$ and P$^{18}$ preferably each independently represent one selected from formula (R-1) to formula (R-5) and more preferably each independently represent formula (R-1) or formula (R-2). S$^{17}$ and S$^{18}$ preferably each independently represent a single bond or an alkylene group having 1 to 6 carbon atoms, more preferably each independently represent a single bond or an alkylene group having 1 to 3 carbon atoms, and yet more preferably each independently represent a single bond or an alkylene group having 1 or 2 carbon atoms. One or more —CH$_2$— in the alkylene group may each be substituted with —O—, —OCO—, or —COO— as long as oxygen atoms are not directly adjacent to one another. When two or more P$^{17}$ and two or more S$^{17}$ are present, they may each be the same or different. Specific examples of the polymerizable compound represented by general formula (I-32) are compounds represented by general formula (I-32-01) to (I-32-06).

[Chem. 12]

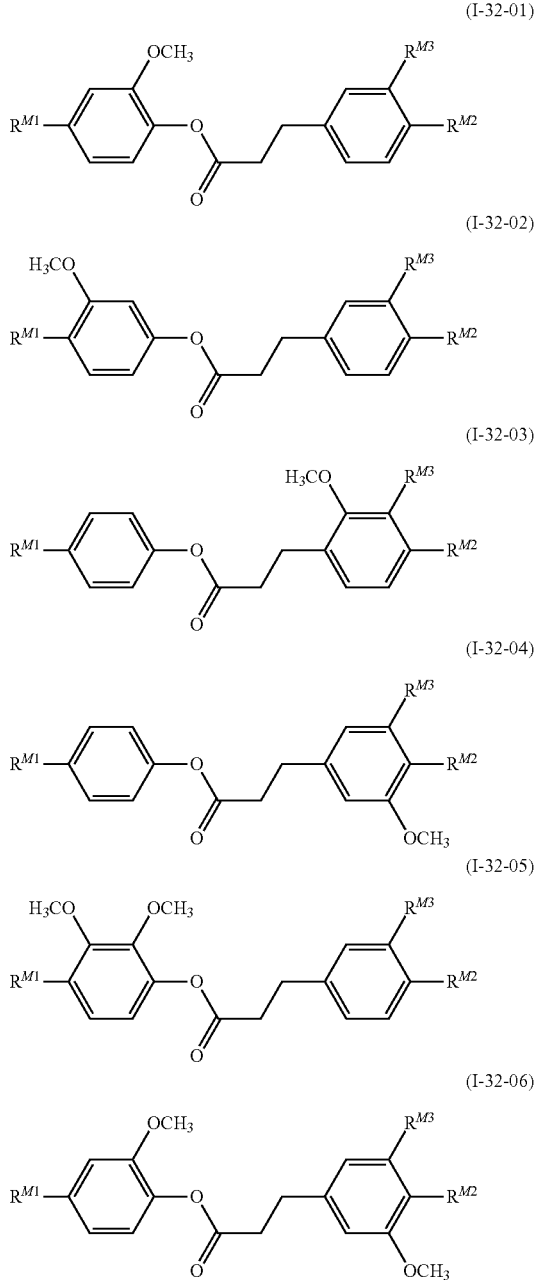

In the formulae, $R^{M1}$ and $R^{M2}$ each independently represent $P^{19}$—$S^{19}$—, $R^{M3}$ each independently represent a hydrogen atom, an alkyl group having 1 to 5 carbon atoms, an alkoxy group having 1 to 5 carbon atoms, or $P^{20}$—$S^{20}$—, $P^{19}$ and $P^{20}$ represent the same groups as $P^{11}$ and $P^{12}$ defined in general formula (I-1), and $S^{19}$ and $S^{20}$ represent the same groups as $S^{11}$ and $S^{12}$ defined in general formula (I-1). $R^{M3}$ preferably each independently represent a hydrogen atom, an alkoxy group having 1 to 3 carbon atoms, or $P^{20}$—$S^{20}$—, and more preferably each independently represent a hydrogen atom or $P^{20}$—$S^{20}$—. $P^{19}$ and $P^{20}$ preferably each independently represent one selected from formula (R-1) to formula (R-5) described above and more preferably each independently represent formula (R-1) or formula (R-2). $S^{19}$ and $S^{20}$ preferably each independently represent a single bond or an alkylene group having 1 to 6 carbon atoms, more preferably each independently represent a single bond or an alkylene group having 1 to 3 carbon atoms, and yet more preferably each independently represent a single bond or an alkylene group having 1 or 2 carbon atoms. One or more —CH$_2$— in the alkylene group may be substituted with —O—, —OCO—, or —COO— as long as oxygen atoms are not directly adjacent to each other. When two or more $P^{19}$ and two or more $S^{19}$ are present, they may each be the same or different.

The polymerizable compound represented by general formula (I-1) is preferably at least one compound selected from the group consisting of compounds represented by general formula (I-21) and general formula (I-22).

[Chem. 13]

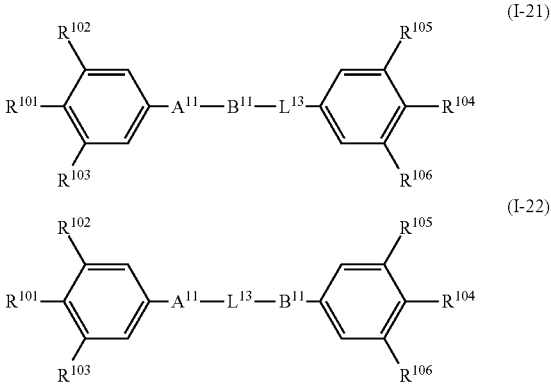

In the formulae, $R^{101}$ to $R^{106}$ each independently represent a hydrogen atom, an alkyl group having 1 to 12 carbon atoms, an alkoxy group having 1 to 12 carbon atoms, or $P^{21}$—$S^{21}$—, $P^{21}$ is the same as $P^{11}$ and $P^{12}$ defined in general formula (I-1), and $S^{21}$ is the same as $S^{11}$ and $S^{12}$ defined in general formula (I-1). When two or more $P^{21}$ and two or more $S^{21}$ are present, they may each be the same or different.

Specifically, two, three, or four selected from $R^{101}$ to $R^{106}$ preferably each independently represent $P^{21}$—$S^{21}$—. Three or four selected from $R^{101}$ to $R^{106}$ preferably each independently represent $P^{21}$—$S^{21}$—. Three selected from $R^{101}$ to $R^{106}$ preferably each independently represent $P^{21}$—$S^{21}$—. When three selected from $R^{101}$ to $R^{106}$ each independently represent $P^{21}$—$S^{21}$—, $R^{101}$ and $R^{104}$ preferably each independently represent $P^{21}$—$S^{21}$—. $P^{21}$ preferably each independently represent one selected from formula (R-1) to formula (R-5) and more preferably each independently represent formula (R-1) or formula (R-2). $S^{21}$ preferably each independently represent a single bond or an alkylene group having 1 to 6 carbon atoms, more preferably each independently represent a single bond or an alkylene group having 1 to 3 carbon atoms, and yet more preferably each independently represent a single bond or an alkylene group having 1 or 2 carbon atoms. One or more —CH$_2$— in the alkylene group may each be substituted with —O—, —OCO—, or —COO— as long as oxygen atoms are not directly adjacent to each other. When two or more $P^{21}$ and two or more $S^{21}$ are present, they may each be the same or different.

The cyclic groups $A^{11}$ and $B^{11}$ each independently represent a 1,4-phenylene group, a 1,4-cyclohexylene group, a naphthalene-2,6-diyl group, or a 1,2,3,4-tetrahydronaphthalene-2,6-diyl group. The group may be unsubstituted or may be substituted with at least one alkyl group having 1 to 12 carbon atoms, at least one alkoxy group having 1 to 12 carbon atoms, or at least one halogen. The group is preferably a 1,4-phenylene group or naphthalene-2,6-diyl group that is unsubstituted or that is substituted with an alkyl group having 1 to 3 carbon atoms or a fluorine group. The group is more preferably a 1,4-phenylene group that is unsubstituted or substituted with a fluorine group.

When none of $R^{101}$ to $R^{106}$ represent an alkoxy group having 1 to 5 carbon atoms, at least one selected from the cyclic groups $A^{11}$ and $B^{11}$ is substituted with at least one alkoxy group having 1 to 5 carbon atoms. The alkoxy group is preferably an alkoxy group having 1 to 4 carbon atoms, preferably an alkoxy group having 1 to 3 carbon atoms, preferably an alkoxy group having 1 or 2 carbon atoms, and particularly preferably an alkoxy group having 1 carbon atom.

$L^{13}$ represents a single bond, —OCH$_2$—, —CH$_2$O—, —C$_2$H$_4$—, —COO—, —OCO—, —CH=CR$^a$—COO—, —CH=CR$^a$—OCO—, —COO—CR$^a$=CH—, —OCO—CR$^a$=CH—, —(CH$_2$)$_t$—COO—, —(CH$_2$)$_t$—OCO—, —OCO—(CH$_2$)$_t$—, —COO—(CH$_2$)$_t$—, —CH=CH—, —CF$_2$O—, —OCF$_2$—, or —C≡C— (in the formulae, $R^a$ each independently represent a hydrogen atom or an alkyl group having 1 to 3 carbon atoms, and t represents an integer of 1 to 4), preferably represents —OCH$_2$—, —CH$_2$O—, —C$_2$H$_4$—, —COO—, —OCO—, —CH=CH—COO—, —CH=CH—OCO—, —COO—CH=CH—, —OCO—CH=CH—, —(CH$_2$)$_2$—COO—, —(CH$_2$)$_2$—OCO—, —OCO—(CH$_2$)$_2$—, —COO—(CH$_2$)$_2$—, —CH=CH—,-, or —C≡C—, more preferably represents —COO—, —OCO—, —CH=CH—COO—, —OCO—CH=CH—, —(CH$_2$)$_2$—COO—, or —OCO—(CH$_2$)$_2$—, yet more preferably represents —CH=CH—COO—, —OCO—CH=CH—, —(CH$_2$)$_2$—COO—, or —OCO—(CH$_2$)$_2$—, and most preferably represents —(CH$_2$)$_2$—COO— or —OCO—(CH$_2$)$_2$—.

Examples of the polymerizable compound represented by general formula (I-21) include compounds represented by general formulae (I-21-01) to (I-21-15).

[Chem. 14]

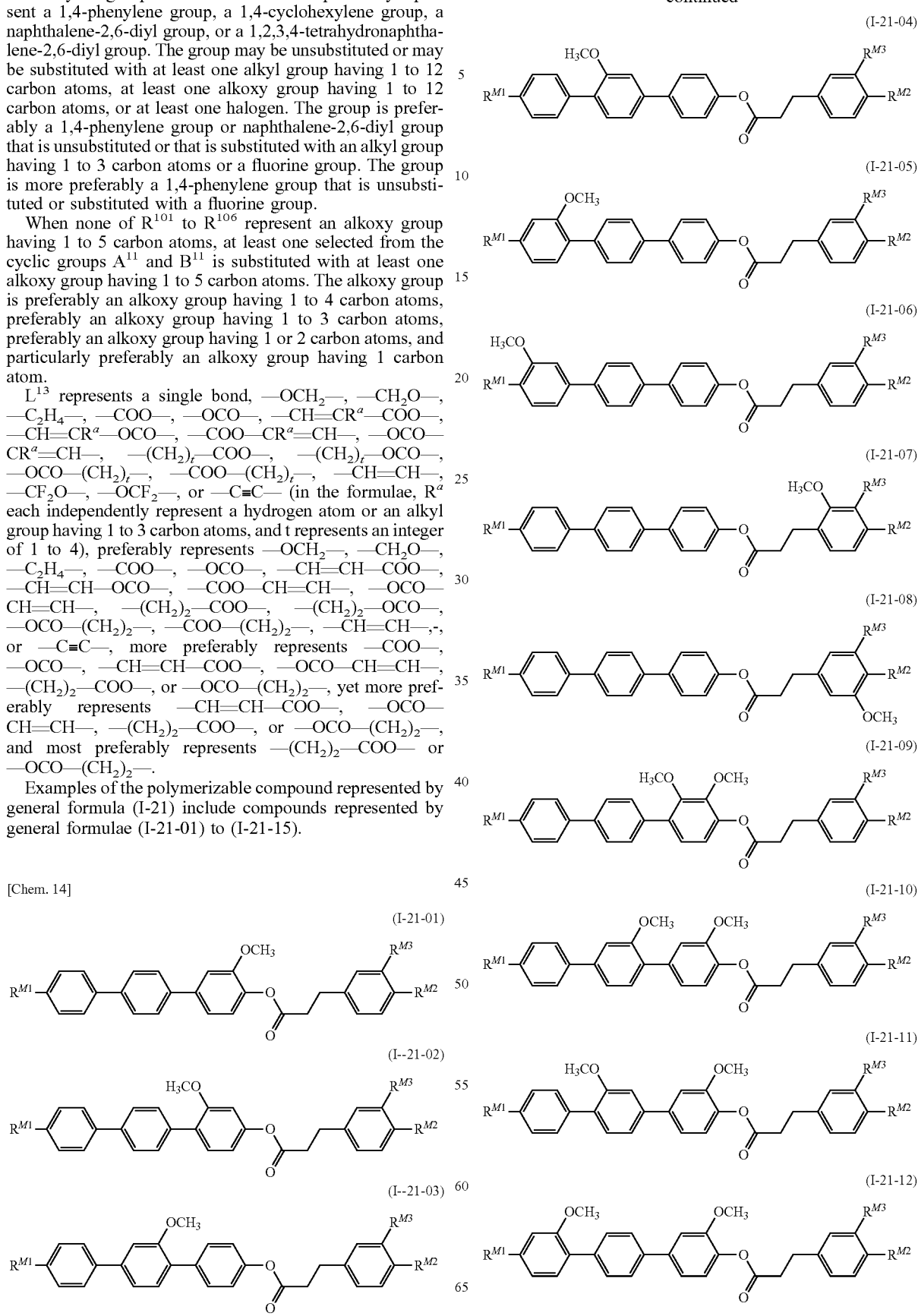

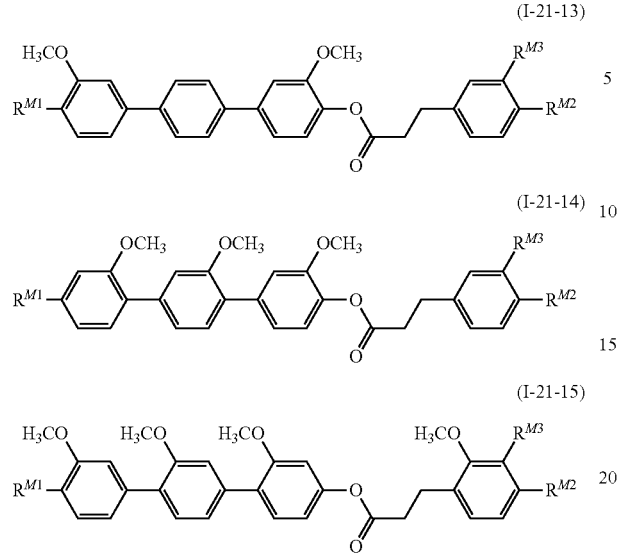

(I-21-13)
(I-21-14)
(I-21-15)

In the formulae, $R^{M1}$ and $R^{M2}$ each independently represent $P^{22}$—$S^{22}$—, $R^{M3}$ each independently represent a hydrogen atom, an alkyl group having 1 to 5 carbon atoms, an alkoxy group having 1 to 5 carbon atoms, or $P^{23}$—$S^{23}$—, $P^{22}$ and $P^{23}$ represent the same groups as $P^{11}$ and $P^{12}$ defined in general formula (I-1), and $S^{22}$ and $S^{23}$ represent the same groups as $S^{11}$ and $S^{12}$ defined in general formula (I-1). $R^{M3}$ is preferably each independently represent a hydrogen atom, an alkoxy group having 1 to 3 carbon atoms, or $P^{23}$—$S^{23}$—, and more preferably each independently represent a hydrogen atom or $P^{23}$—$S^{23}$—. $P^{22}$ and $P^{23}$ preferably each independently represent one selected from formula (R-1) to formula (R-5) described above, and more preferably each independently represent formula (R-1) or formula (R-2). $S^{22}$ and $S^{23}$ each independently represent a single bond or an alkylene group having 1 to 6 carbon atoms, more preferably each independently represent a single bond or an alkylene group having 1 to 3 carbon atoms, and yet more preferably each independently represent a single bond or an alkylene group having 1 or 2 carbon atoms. One or more —CH$_2$— in the alkylene group may each be substituted with —O—, —OCO—, or —COO— as long as oxygen atoms are not direction adjacent to each other. When two or more $P^{12}$ and two or more $S^{23}$ are present, they may each be the same or different.

Examples of the polymerizable compound represented by general formula (I-22) include compounds represented by general formulae (I-22-01) to (I-22-15).

[Chem. 15]

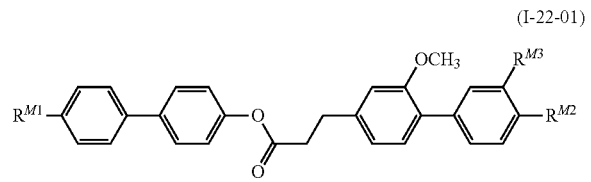

(I-22-01)

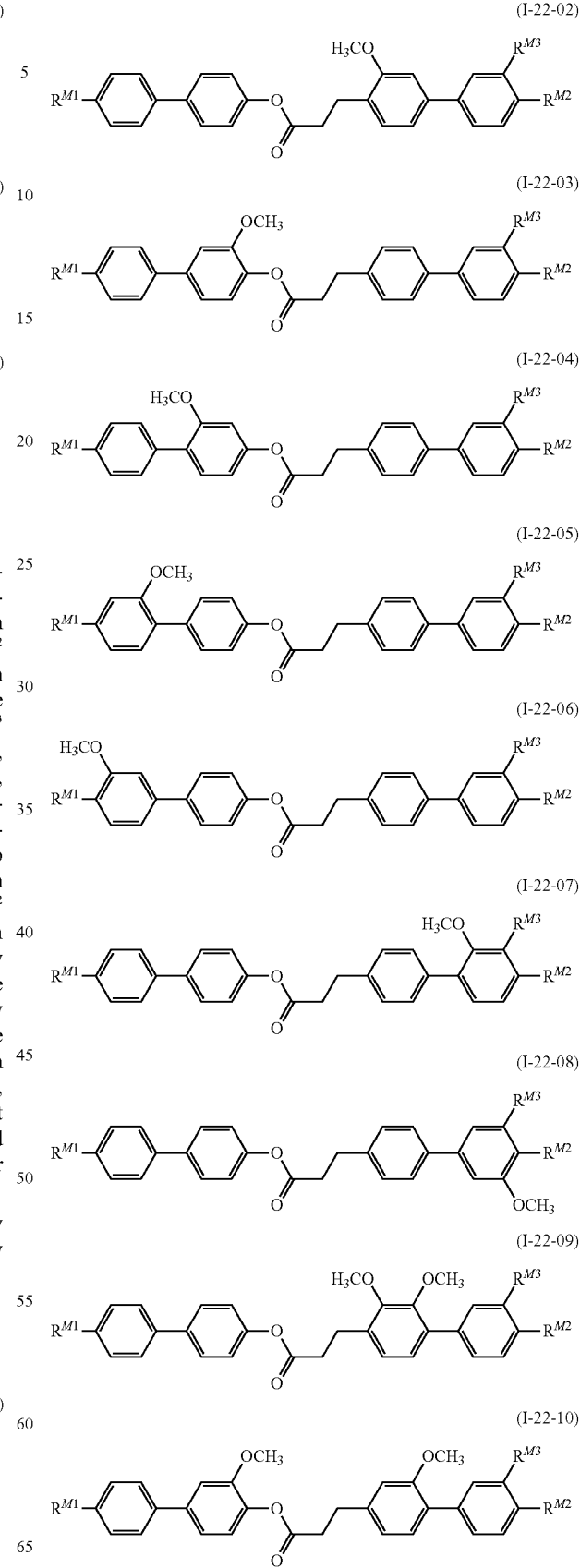

(I-22-02)
(I-22-03)
(I-22-04)
(I-22-05)
(I-22-06)
(I-22-07)
(I-22-08)
(I-22-09)
(I-22-10)

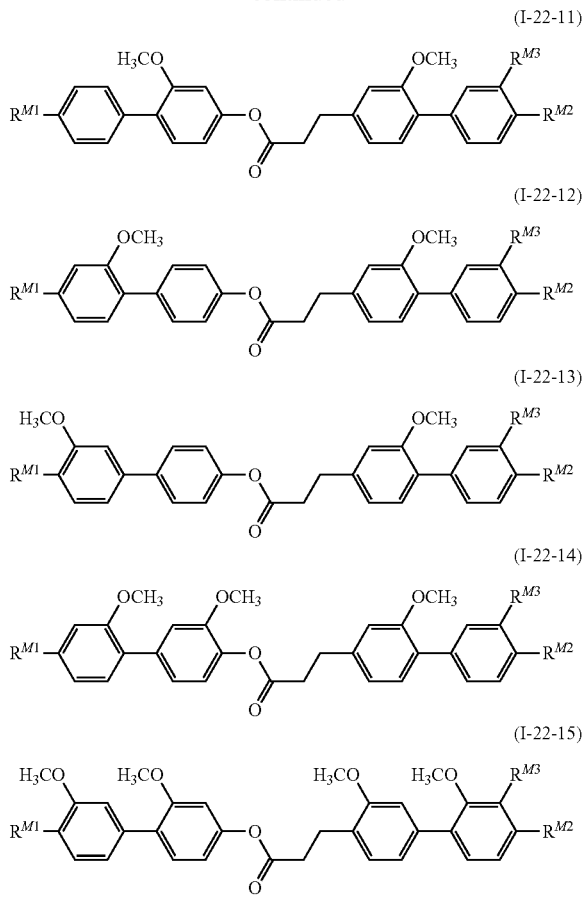

(I-22-11)
(I-22-12)
(I-22-13)
(I-22-14)
(I-22-15)

In the formulae, $R^{M1}$ and $R^{M2}$ each independently represent $P^{24}$—$S^{24}$—, $R^{M3}$ each independently represent a hydrogen atom, an alkyl group having 1 to 5 carbon atoms, an alkoxy group having 1 to 5 carbon atoms, or $P^{25}$—$S^{25}$—, $P^{22}$ and $P^{23}$ represent the same groups as $P^{11}$ and $P^{12}$ defined in general formula (I-1), and $S^{24}$ and $S^{25}$ represent the same groups as $S^{11}$ and $S^{12}$ defined in general formula (I-1). $R^{M3}$ preferably each independently represent a hydrogen atom, an alkoxy group having 1 to 3 carbon atoms, or $P^{24}$—$S^{24}$—, and more preferably each independently represent a hydrogen atom or $P^{25}$—$S^{25}$—. $P^{24}$ and $P^{25}$ preferably each independently represent one selected from formula (R-1) to formula (R-5), and more preferably each independently represent formula (R-1) or formula (R-2). $S^{24}$ and $S^{25}$ preferably each independently represent a single bond or an alkylene group having 1 to 6 carbon atoms, more preferably each independently represent a single bond or an alkylene group having 1 to 3 carbon atoms, and yet more preferably each independently represent a single bond or an alkylene group having 1 or 2 carbon atoms. One or more —$CH_2$— in the alkylene group may each be substituted with —O—, —OCO—, or —COO— as long as oxygen atoms are not directly adjacent to each other. When two or more $P^{24}$ and two or more $S^{24}$ are present, they may each be the same or different. Among the polymerizable compounds represented by general formula (I-1), at least one compound selected from the group consisting of compounds represented by general formula (I-31), general formula (I-32), general formula (I-21), and general formula (I-22) described above is preferably used. Specifically, a liquid crystal composition that contains a polymerizable compound that has a mesogen structure having two or more rings, —OCO—$CH_2$—$CH_2$— that serves as a linking group that links the rings together, an alkoxy group at one or more sites in the ring structure, and three polymerizable groups is particularly preferable. This is because a PSA-type or PSVA-type liquid crystal display element that has excellent response performance and a satisfactorily pretilt angle, contains less residual monomers, and suffers no or very little issues such as alignment defects and display defects caused by low voltage holding ratios (VHR) can be efficiently produced.

Of the polymerizable compounds represented by general formula (I-1), at least one compound selected from the group consisting of compounds represented by general formula (I-31) and general formula (I-21) is preferably used. Specifically, a compound, which has a mesogen structure having three or more rings, —OCO—$CH_2$—$CH_2$— as a linking group that links to a terminal ring among the linking groups that link the rings to each other, an alkoxy group at one or more sites in the ring structures, and three polymerizable groups, has excellent miscibility with the liquid crystal composition and is thus more preferable since monomer reactivity is rapid, a stable pretilt is obtained, and a VHR after formation of pretilt is excellent.

The liquid crystal composition according to the present invention contains 0.01% to 5% by mass of the polymerizable compound represented by general formula (I-1). The lower limit of its content is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.1% by mass, preferably 0.15% by mass, preferably 0.2% by mass, preferably 0.25% by mass, preferably 0.3% by mass, preferably 0.35% by mass, preferably 0.4% by mass, preferably 0.5% by mass, and preferably 0.55% by mass. The upper limit of its content is preferably 4.5% by mass, preferably 4% by mass, preferably 3.5% by mass, preferably 3% by mass, preferably 2.5% by mass, preferably 2% by mass, preferably 1.5% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, and preferably 0.55% by mass.

More specifically, in order to obtain a satisfactory pretilt angle, less residual monomers, or a high voltage holding ratio (VHR), the content is preferably 0.2% to 0.6% by mass. When suppression of precipitation at low temperature is important, the content is preferably 0.01% to 0.4% by mass. When two or more polymerizable compounds represented by general formula (I-1) are contained, the content of each compound is preferably 0.01% to 0.4% by mass. Thus, in order to resolve all issues, the polymerizable compounds represented by general formula (I-1) are preferably adjusted within the range of 0.1% to 0.6% by mass.

The liquid crystal composition that contains a polymerizable compound according to the present invention is characterized by containing a compound represented by general formula (II).

[Chem. 16]

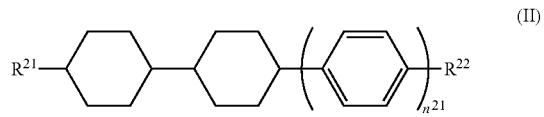

(II)

In the formula, $R^{21}$ represents an alkyl group having 1 to 10 carbon atoms or an alkenyl group having 2 to 10 carbon atoms, but an alkyl group having 1 to 5 carbon atoms or an alkenyl group having 2 to 5 carbon atoms is preferable. In the formula, $R^{22}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms. One —$CH_2$— or two or more non-adjacent —$CH_2$— present in $R^{22}$ may each independently be substituted with —O— or —S—. One or more hydrogen atoms present in $R^{22}$ may each independently be substituted with a fluorine atom or a chlorine atom, but an alkyl group having 1 to 5 carbon atoms, an alkoxy group having 1 to 5 carbon atoms, an alkenyl group having 2 to 5 carbon atoms, or an alkenyloxy group having 2 to 5 carbon atoms is preferable; and an alkyl group having 1 to 5 carbon atoms or an alkenyl group having 2 to 5 carbon atoms is preferable.

In the formula, $n^{21}$ represents 0, 1, or 2 but preferably represents 0 or 1; and a compound with $n^{21}$ representing 0 is an essential component.

The liquid crystal composition according to the present invention contains 1% to 80% by mass of the compound represented by general formula (II). The lower limit of the content is preferably 1% by mass, preferably 2% by mass, preferably 3% by mass, preferably 4% by mass, preferably 5% by mass, preferably 10% by mass, preferably 15% by mass, preferably 20% by mass, preferably 25% by mass, and preferably 30% by mass. The upper limit of the content is preferably 80% by mass, preferably 75% by mass, preferably 70% by mass, preferably 65% by mass, preferably 60% by mass, preferably 55% by mass, and preferably 50% by mass.

Among the compounds represented by general formula (II), compounds represented by general formula (II-11) and general formula (II-12) are preferable.

[Chem. 17]

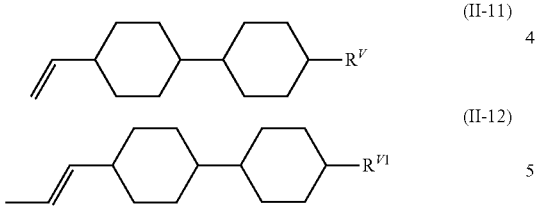

They are suitable when the response speed of the liquid crystal display element is important.

In the formulae, $R^V$ and $R^{V1}$ each independently represent an alkyl group having 1 to 10 carbon atoms or an alkenyl group having 2 to 10 carbon atoms, preferably each independently represent an alkyl group having 1 to 5 carbon atoms or an alkenyl group having 2 to 5 carbon atoms, and preferably each independently represent an alkyl group having 2 to 5 carbon atoms or an alkenyl group having 2 or 3 carbon atoms.

The compounds represented by general formula (II-11) and/or general formula (II-12) are preferably the compounds represented by general formulae (II-101) to (II-110), for example.

[Chem. 18]

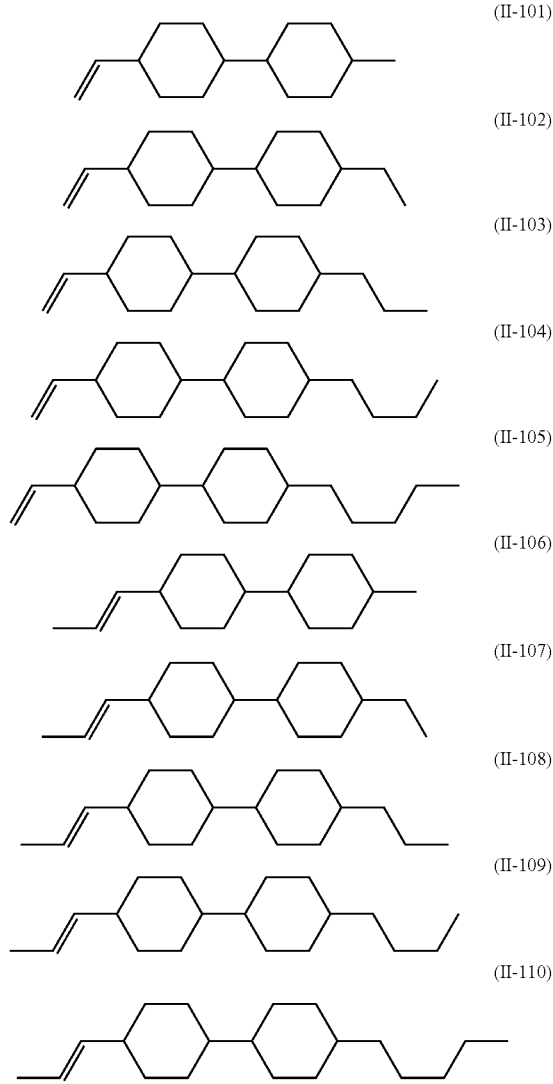

More specifically, in order to obtain a high response speed, the content of the compounds represented by general formula (II-11) and general formula (II-12) is preferably 20% to 80% by mass. When suppression of precipitation at low temperature is important, the content is preferably 5% to 40% by mass. When a high voltage holding ratio (VHR) is important, the compounds represented by general formula (II-11) and general formula (II-12) are preferably contained in an amount of 1% to 30% by mass, preferably in an amount of 1% to 30% by mass, preferably in an amount of 1% to 20% by mass, and preferably in an amount of 1% to 10% by mass. In order to obtain a particularly high voltage holding ratio (VHR), of the compounds represented by general formula (II), the compound with $R^{21}$ representing an alkyl group having 1 to 5 carbon atoms and $R^{22}$ representing an alkyl group having 1 to 5 carbon atoms or an alkoxy group having 1 to 5 carbon atoms is preferred, and a compound with an alkyl group having 1 to 5 carbon atoms is preferred.

The liquid crystal composition according to the present invention can further contain a compound represented by general formula (III-1) and/or a compound represented by general formula (III-2).

[Chem. 19]

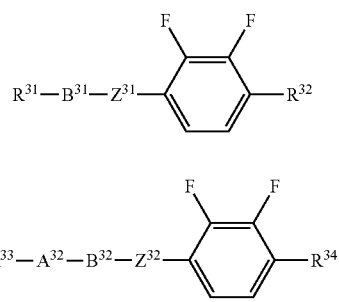

(III-1)

(III-2)

In the formulae, $R^{31}$ to $R^{34}$ each independently represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms. One —$CH_2$— or two or more non-adjacent —$CH_2$— that are present in $R^{31}$ to $R^{34}$ may each independently be substituted with —O— or —S—. One or more hydrogen atoms present in $R^{31}$ to $R^{34}$ may each independently be substituted with a fluorine atom or a chlorine atom. However, $R^{31}$ and $R^{32}$ preferably each independently represent an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably each independently represent an alkyl group having 1 to 5 carbon atoms or an alkenyl group having 2 to 5 carbon atoms, and more preferably each independently represent an alkyl group having 1 to 3 carbon atoms or an alkenyl group having 2 or 3 carbon atom. $R^{32}$ and $R^{34}$ preferably each independently represent an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, and more preferably each independently represent an alkyl group having 1 to 5 carbon atoms or an alkoxy group having 1 to 5 carbon atoms.

The ring $A^{32}$, ring $B^{31}$, and ring $B^{32}$ each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2,2,2]octylene group, a piperidine-1,4-diyl group, a naphthalene-2,6-diyl group, a decahydronaphthalene-2,6-diyl group, or a 1,2,3,4-tetrahydronaphthalene-2,6-diyl group but preferably each independently represent a trans-1,4-cyclohexylene group or 1,4-phenylene group.

$Z^{31}$ and $Z^{32}$ each independently represent —$OCH_2$—, —$CH_2O$—, —$CF_2O$—, —$OCF_2$—, —$CH_2CH_2$—, —$CF_2CF_2$—, or a single bond, preferably each independently represent —$CH_2O$—, —$CF_2O$—, —$CH_2CH_2$—, —$CF_2CF_2$—, or a single bond, more preferably each independently represent —$CH_2O$—, —$CH_2CH_2$—, or a single bond, and yet more preferably each independently represent —$CH_2O$— or a single bond.

The compounds represented by general formula (III-1) are specifically preferably compounds represented by general formula (III-A1) to general formula (III-A4) below, preferably compounds represented by general formula (III-A1), preferably compounds represented by general formula (III-A3), preferably compounds represented by general formula (III-A4), preferably compounds represented by general formula (III-A1), more preferably compounds represented by general formula (III-A3), and yet more preferably compounds represented by general formula (III-A1).

[Chem. 20]

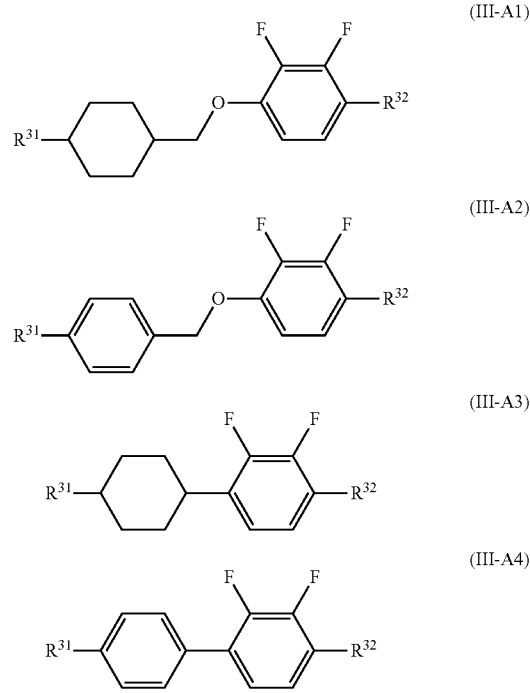

In the formulae, $R^{31}$ and $R^{32}$ are the same as those described above.

The compounds represented by general formula (III-2) are specifically preferably compounds represented by general formula (III-B1) to general formula (III-B6) below, preferably compounds represented by general formula (III-B1), preferably compounds represented by general formula (III-B3), preferably compounds represented by general formula (III-B4), preferably compounds represented by general formula (III-B5), preferably compounds represented by general formula (III-B6), more preferably compounds represented by general formula (III-B1), more preferably compounds represented by general formula (III-B3), more preferably compounds represented by general formula (III-B5), more preferably compounds represented by general formula (III-B6), particularly preferably compounds represented by general formula (III-B1), and particularly preferably compounds represented by general formula (III-B5).

[Chem. 21]

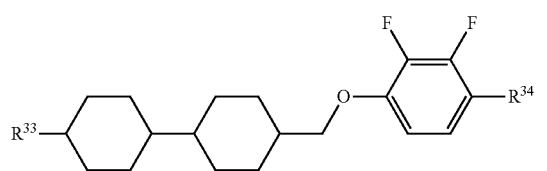

(III-B1)

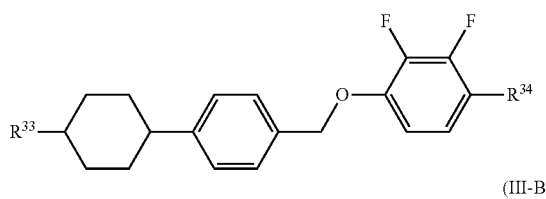
(III-B2)

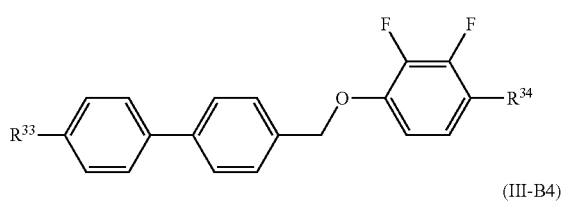
(III-B3)

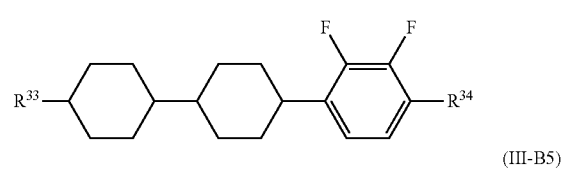
(III-B4)

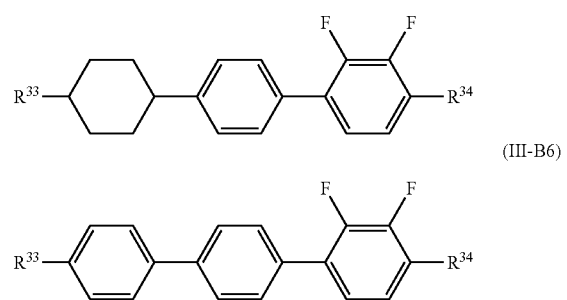
(III-B5)

(III-B6)

In the formulae, $R^{33}$ and $R^{34}$ are the same as those described above.

The liquid crystal composition according to the present invention is preferably composed of a combination of general formula (III-A1) and general formula (III-B1), more preferably composed of a combination of general formula (III-A1), general formula (III-B1), and general formula (III-B4), and yet more preferably composed of a combination of general formula (III-A1), general formula (III-B1), and general formula (III-B5).

The liquid crystal composition according to the present invention is preferably composed of a combination of general formula (III-A3) and general formula (III-B5), more preferably composed of a combination of general formula (III-A3), general formula (III-B4), and general formula (III-B5), and yet more preferably composed of a combination of general formula (III-A3), general formula (III-B5), and general formula (III-B1).

The liquid crystal composition according to the present invention is preferably composed of a combination of general formula (III-A4) and general formula (III-B1), more preferably composed of a combination of general formula (III-A4), general formula (III-A1), and general formula (III-B1), more preferably composed of a combination of general formula (III-A4) and general formula (III-B5), preferably composed of a combination of general formula (III-A4), general formula (III-B5), and general formula (III-B4), preferably composed of a combination of general formula (III-A4) and general formula (III-B1), and more preferably composed of a combination of general formula (III-A4), general formula (III-B1), and general formula (III-B5).

The liquid crystal composition according to the present invention contains at least one selected from the compounds represented by general formula (III-1) and/or compounds represented by general formula (III-2) but preferably contains two to ten compounds. The content thereof is 10% to 90% by mass. The lower limit is preferably 10% by mass, preferably 15% by mass, preferably 20% by mass, preferably 25% by mass, preferably 30% by mass, preferably 35% by mass, preferably 40% by mass, and preferably 45% by mass. The upper limit is preferably 80% by mass, preferably 75% by mass, preferably 70% by mass, preferably 65% by mass, preferably 60% by mass, preferably 55% by mass, preferably 50% by mass, and preferably 45% by mass.

The liquid crystal composition according to the present invention preferably contains, as other components, at least one compound selected from the compounds represented by general formula (IV-A) to general formula (IV-J).

[Chem. 22]

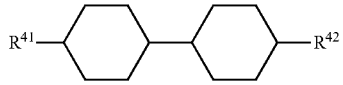
(IV-A)

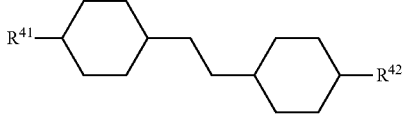
(IV-B)

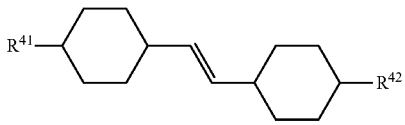
(IV-C)

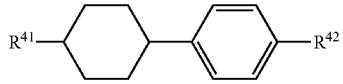
(IV-D)

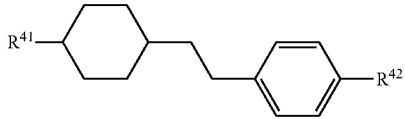
(IV-E)

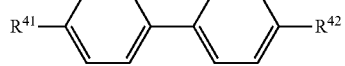
(IV-F)

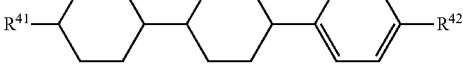
(IV-G)

(IV-H)

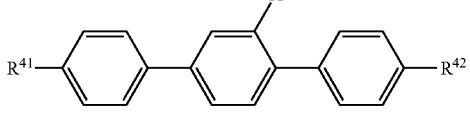
(IV-I)

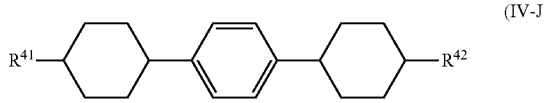

(IV-J)

However, the same compounds as those represented by general formula (II) are excluded.

In the formulae, $R^{41}$ and $R^{42}$ each independently represent an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, but preferably each independently represent an alkyl group having 2 to 5 carbon atoms, an alkoxy group having 1 to 3 carbon atoms, or an alkenyl group having 2 to 5 carbon atoms.

$X^{41}$ represents an alkyl group having 1 to 3 carbon atoms, an alkoxy group having 1 to 3 carbon atoms, a fluorine atom, or a hydrogen atom, but preferably represents a methyl group, a fluorine atom, or a hydrogen atom and more preferably represents a fluorine atom or a hydrogen atom.

Note that in general formula (IV-F), general formula (IV-G), general formula (IV-H), and general formula (IV-I), $R^{41}$ and $R^{42}$ may each independently represent an alkenyl group having 2 to 5 carbon atoms or an alkenyloxy group having 2 to 5 carbon atoms.

Of general formula (IV-A) to general formula (IV-J), a compound selected from general formula (IV-A), general formula (IV-D), general formula (IV-F), general formula (IV-G), general formula (IV-H), and general formula (IV-I) is preferable. A compound selected from general formula (IV-A), general formula (IV-F), general formula (IV-G), general formula (IV-H), and general formula (IV-I) is more preferable. A compound selected from general formula (IV-F), general formula (IV-H), and general formula (IV-I) is more preferable. A compound selected from general formula (III-F) and general formula (III-H) is yet more preferable.

The content of the compound selected from the group consisting of the compounds represented by general formula (IV-A) to general formula (IV-J) is 1% by mass to 60% by mass, but is preferably 5% by mass to 50% by mass, preferably 5% by mass to 40% by mass, preferably 10% by mass to 40% by mass, and preferably 10% by mass to 30% by mass.

The liquid crystal composition according to the present invention can further contain at least one compound represented by general formula (V).

[Chem. 23]

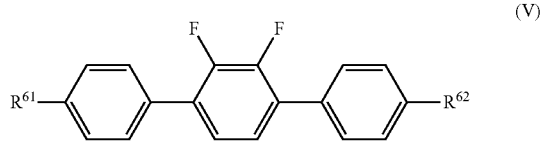

(V)

In the formula, $R^{61}$ and $R^{62}$ each independently represent an alkyl group having 1 to 8 carbon atoms, an alkoxy group having 1 to 3 carbon atoms, an alkenyl group having 2 to 8 carbon atoms, or an alkenyloxy group having 2 to 8 carbon atoms; however, an alkyl group having 1 to 5 carbon atoms or an alkenyl group having 2 to 5 carbon atoms is preferable.

The liquid crystal composition according to the present invention may contain at least one compound represented by general formula (N-001).

[Chem. 24]

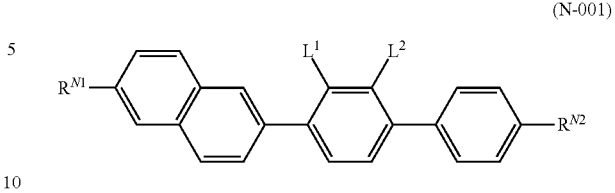

(N-001)

In the formula, $R^{N1}$ and $R^{N2}$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms; however, an alkyl group having 1 to 5 carbon atoms is preferable.

In the formula, $L^1$ and $L^2$ each independently represent a hydrogen atom, a fluorine atom, $CH_3$, or $CF_3$; however, at least one selected from $L^1$ and $L^2$ preferably represents a fluorine atom and preferably both represent a fluorine atom.

The liquid crystal composition according to the present invention can use a dielectrically positive ($\Delta\varepsilon$ greater than 2) compound represented by general formula (M) below in combination with a compound represented by general formula (III-1) and/or a compound represented by general formula (III-2), or can contain a compound represented by general M below instead of the compound represented by general formula (III-1) arid/or the compound represented by general formula (III-2).

[Chem. 25]

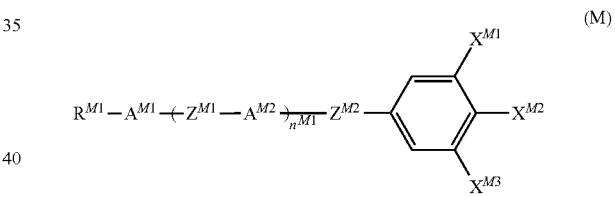

(M)

(In the formula, $R^{M1}$ represents an alkyl group having 1 to 8 carbon atoms, one —$CH_2$— or two or more non-adjacent —$CH_2$— in the alkyl group may each independently be substituted with —CH=CH—, —C≡C—, —O—, —CO—, —COO—, or —OCO—, $n^{M1}$ represents 0, 1, 2, 3, or 4, $A^{M1}$ and $A^{M2}$ each independently represent a group selected from the group consisting of (a) a 1,4-cyclohexylene group (one —$CH_2$— or two or more non-adjacent —$CH_2$— present in this group may each be substituted with —O— or —S—) and (b) a 1,4-phenylene group (one —CH= or two or more non-adjacent —CH= present in this group may each be substituted with —N=), hydrogen atoms in the group (a) and the group (b) described above may be each independently substituted with a cyano group, a fluorine atom, or a chlorine atom, $Z^{M1}$ and $Z^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, when $n^{M1}$ represents 2, 3, or 4 and two or more $A^{M2}$ are present, they may be the same or different; and when $n^{M1}$ represents 2, 3, or 4, and two or more $Z^{M1}$ are present, they may be the same or different, $X^{M1}$ and $X^{M3}$ each independently represent a hydrogen atom, a chlorine atom, or a fluorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group.)

In general formula (M), $R^{M1}$ preferably represents an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, preferably represents an alkyl group having 1 to 5 carbon atoms or an alkenyl group having 2 to 5 carbon atoms, more preferably represents an alkyl group having 2 to 5 carbon atoms or an alkenyl group having 2 or 3 carbon atoms, and yet more preferably represents an alkenyl group having 3 carbon atoms (propenyl group).

When reliability is important, $R^{M1}$ preferably represents an alkyl group. When decreasing the viscosity is important, an alkenyl group is preferable.

When the ring structure to which $R^{M1}$ bonds is a phenyl group (aromatic), a linear alkyl group having 1 to 5 carbon atoms, a linear alkoxy group having 1 to 4 carbon atoms, and an alkenyl group having 4 or 5 carbon atoms are preferable. When the ring structure to which $R^{M1}$ bonds is a saturated ring structure such as cyclohexane, pyran, and dioxane, a linear alkyl group having 1 to 5 carbon atoms, a linear alkoxy group having 1 to 4 carbon atoms, and a linear alkenyl group having 2 to 5 carbon atoms are preferable. In order to stabilize the nematic phase, the total number of carbon atoms and, if any, oxygen atoms is preferably 5 or less and $R^{M1}$ is preferably linear.

The alkenyl group is preferably one selected from the groups represented by formula (R1) to formula (R5) (the black dot in each formula represents a carbon atom in the ring structure).

[Chem. 26]

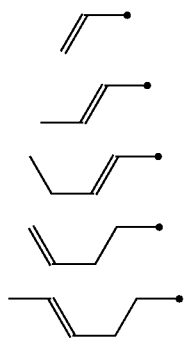

(R1)
(R2)
(R3)
(R4)
(R5)

$A^{M1}$ and $A^{M2}$ are preferably each independently aromatic if a large Δn is desired, are preferably each independently aliphatic in order to improve the response speed, and preferably each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2,2,2]octylene group, a piperidine-1,4-diyl group, a naphthalene-2,6-diyl group, a decahydronaphthalene-2,6-diyl group, or a 1,2,3,4-tetrahydronaphthalene-2,6-diyl group. They more preferably each independently represent the following structure:

[Chem. 27]

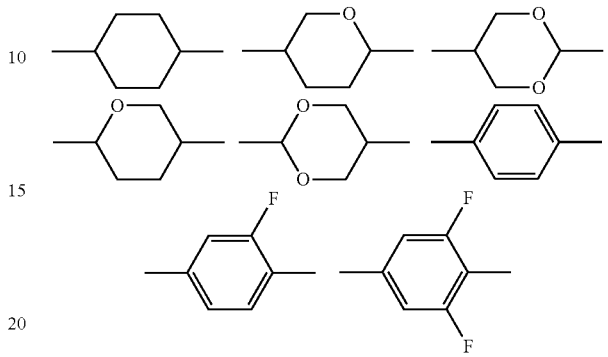

and yet more preferably each independently represent the following structure:

[Chem. 28]

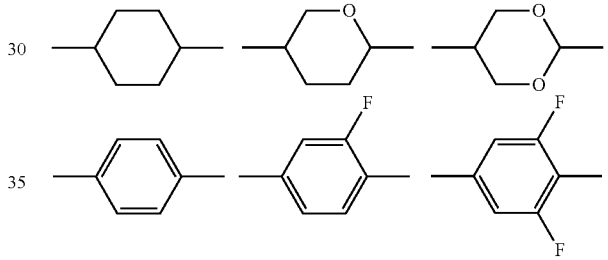

$Z^{M1}$ and $Z^{M2}$ preferably each independently represent —CH$_2$O—, —CF$_2$O—, —CH$_2$CH$_2$—, —CF$_2$CF$_2$—, or a single bond, more preferably each independently represent —CF$_2$O—, —CH$_2$CH$_2$—, or a single bond, and yet more preferably each independently represent —CF$_2$O— or a single bond.

The number of compounds that can be used in combination is not particularly limited. The compounds are used in combination depending on the desired performance such as low-temperature solubility, transition temperature, electrical reliability, and birefringence. For example, the number of compounds used in an embodiment of the present invention is 1, 2, or 3. In other embodiments of the present invention, the number is 4, 5, 6, 7, or more.

In the composition according to the present invention, the content of the compound represented by general formula (M) must be appropriately adjusted depending on the desired performance, such as low-temperature solubility, transition temperature, electrical reliability, birefringence, process compatibility, drop marks, image sticking, and dielectric anisotropy.

The preferable lower limit of the content of the compound represented by formula (M) relative to the total amount of the composition of the present invention is 1% by mass, 10% by mass, 20% by mass, 30% by mass, 40% by mass, 50% by mass, 55% by mass, 60% by mass, 65% by mass, 70% by mass, 75% by mass, or 80% by mass. For example, in an embodiment of the present invention, the preferable upper limit of the content relative to the total amount of the composition of the present invention is 95% by mass, 85% by mass, 75% by mass, 65% by mass, 55% by mass, 45% by mass, 35% by mass, or 25% by mass.

When the viscosity of the composition of the present invention is to be maintained low and a composition having high response speed is necessary, the lower limit is preferably relatively low and the upper limit is preferably relatively low. When Tni of the composition of the present invention is to be maintained high and a composition having good temperature stability is necessary, the lower limit is preferably relatively low and the upper limit is preferably relatively low. When the dielectric anisotropy is desirably increased to keep the drive voltage low, the lower limit is preferably relatively high and the upper limit is preferably relatively high.

When reliability is important, $R^{M1}$ preferably represents an alkyl group. When decreasing the viscosity is important, $R^{M1}$ preferably represents an alkenyl group.

The compound represented by general formula (M) is preferably a compound selected from the group consisting of compounds represented by general formula (M-1), for example.

[Chem. 29]

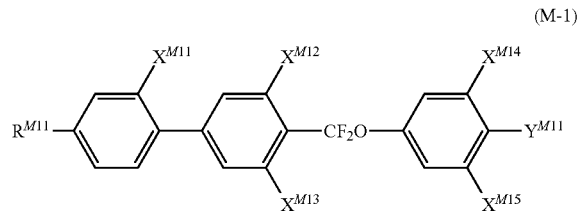

(M-1)

(In the formula, $R^{M11}$ represents an alkyl group having 1 to 5 carbon atoms, an alkenyl group having 2 to 5 carbon atoms, or an alkoxy group having 1 to 4 carbon atoms, $X^{M11}$ to $X^{M15}$ each independently represent a hydrogen atom or a fluorine atom, and $Y^{M11}$ represents a fluorine atom or $OCF_3$.)

The number of compounds that can be used in combination is not particularly limited. The compounds are used in combination depending on the desired performance such as low-temperature solubility, transition temperature, electrical reliability, and birefringence. For example, the number of compounds used in an embodiment of the present invention is 1, 2, 3, or more.

The preferable lower limit of the content of the compound represented by formula (M-1) relative to the total amount of the composition of the present invention is 1% by mass, 2% by mass, 5% by mass, 8% by mass, 10% by mass, 13% by mass, 15% by mass, 18% by mass, 20% by mass, 22% by mass, 25% by mass, or 30% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

When the viscosity of the composition of the present invention is to be maintained low and a composition having high response speed is necessary, the lower limit is preferably relatively low and the upper limit is preferably relatively low. When Tni of the composition of the present invention is to be maintained high and a composition having good temperature stability is necessary, the lower limit is preferably relatively low and the upper limit is preferably relatively low. When the dielectric anisotropy is desirably increased to keep the drive voltage low, the lower limit is preferably relatively high and the upper limit is preferably relatively high.

The compounds represented by general formula (M-1) are specifically preferably compounds represented by formula (M-1.1) to formula (M-1.4), preferably a compound represented by formula (M-1.1) or formula (M-1.2), and more preferably a compound represented by formula (M-1.2). It is also preferable to simultaneously use the compound represented by formula (M-1.1) or formula (M-1.2).

[Chem. 30]

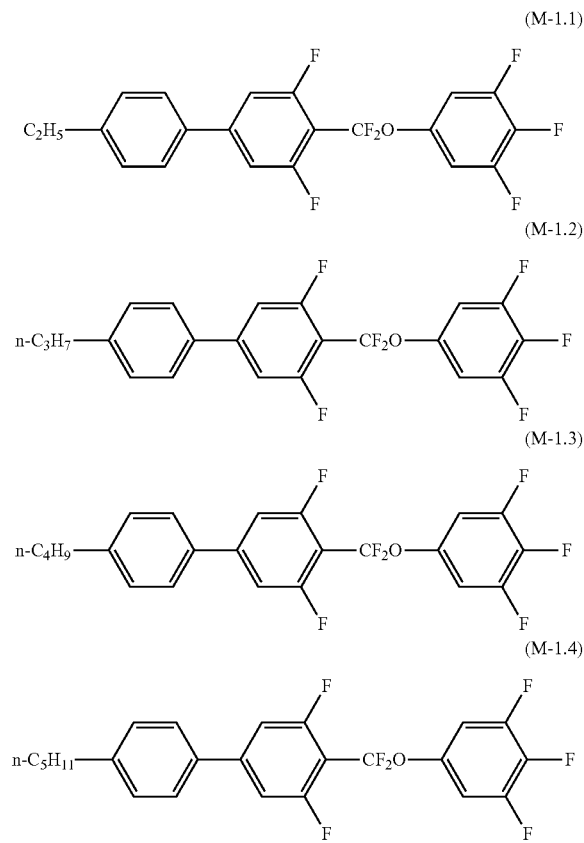

The preferable lower limit of the content of the compound represented by formula (M-1.1) relative to the total amount of the composition of the present invention is 1% by mass, 2% by mass, 5% by mass, or 6% by mass. The preferable upper limit of the content is 15% by mass, 13% by mass, 10% by mass, 8% by mass, or 5% by mass.

The preferable lower limit of the content of the compound represented by formula (M-1.2) relative to the total amount of the composition of the present invention is 1% by mass, 2% by mass, 5% by mass, or 6% by mass. The preferable upper limit of the content is 30% by mass, 25% by mass, 23% by mass, 20% by mass, 18% by mass, 15% by mass, 13% by mass, 10% by mass, or 8% by mass.

The preferable lower limit of the total content of the compounds represented by formula (M-1.1) and formula (M-1.2) relative to the total amount of the composition of the present invention is 1% by mass, 2% by mass, 5% by mass, or 6% by mass. The preferable upper limit of the content is 30% by mass, 25% by mass, 23% by mass, 20% by mass, 18% by mass, 15% by mass, 13% by mass, 10% by mass, or 8% by mass.

The compound represented by general formula (M) is preferably a compound selected from the group consisting of compounds represented by general formula (M-2), for example.

[Chem. 31]

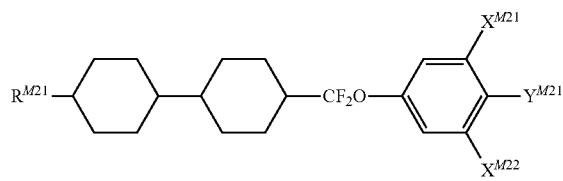
(M-2)

(In the formula, $R^{M21}$ represents an alkyl group having 1 to 5 carbon atoms, an alkenyl group having 2 to 5 carbon atoms, or an alkoxy group having 1 to 4 carbon atoms, $X^{M21}$ and $X^{M22}$ each independently represent a hydrogen atom or a fluorine atom, and $Y^{M21}$ represents a fluorine atom, a chlorine atom, or $OCF_3$.)

The preferable lower limit of the content of the compound represented by formula (M-1) relative to the total amount of the composition of the present invention is 1% by mass, 2% by mass, 5% by mass, 8% by mass, 10% by mass, 13% by mass, 15% by mass, 18% by mass, 20% by mass, 22% by mass, 25% by mass, or 30% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

When the viscosity of the composition of the present invention is to be maintained low and a composition having high response speed is necessary, the lower limit is preferably relatively low and the upper limit is preferably relatively low. When Tni of the composition of the present invention is to be maintained high and a composition with which image sticking rarely occurs is necessary, the lower limit is preferably relatively low and the upper limit is preferably relatively low. When the dielectric anisotropy is desirably increased to keep the drive voltage low, the lower limit is preferably relatively high and the upper limit is preferably relatively high.

The compounds represented by general formula (M-2) are preferably compounds represented by formula (M-2.1) to formula (M-2.5), and are preferably a compound represented by formula (M-2.3) and/or a compound represented by formula (M-2.5).

[Chem. 32]

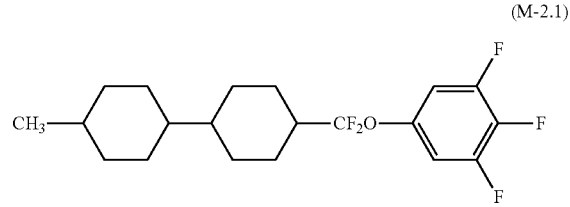
(M-2.1)

-continued

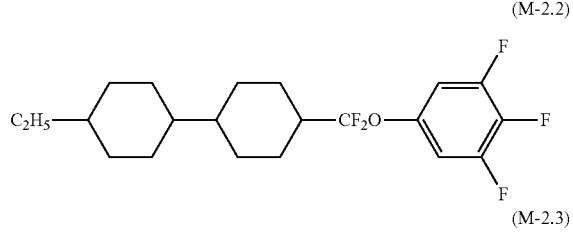
(M-2.2)

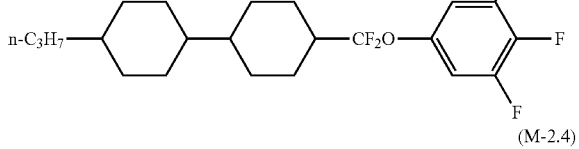
(M-2.3)

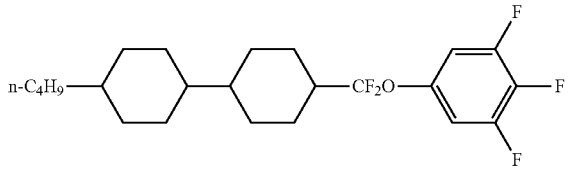
(M-2.4)

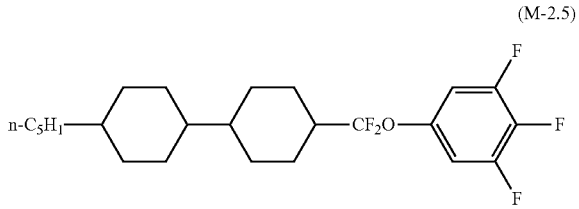
(M-2.5)

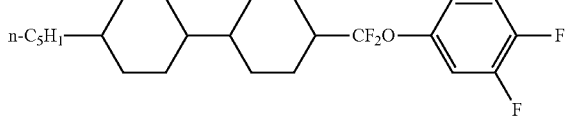

The preferable lower limit of the content of the compound represented by formula (M-2.2) relative to the total amount of the composition of the present invention is 1% by mass, 2% by mass, 5% by mass, or 6% by mass. The preferable upper limit of the content is 15% by mass, 13% by mass, 10% by mass, 8% by mass, or 5% by mass.

The preferable lower limit of the content of the compound represented by formula (M-2.3) relative to the total amount of the composition of the present invention is 1% by mass, 2% by mass, 5% by mass, or 6% by mass. The preferable upper limit of the content is 30% by mass, 25% by mass, 23% by mass, 20% by mass, 18% by mass, 15% by mass, 13% by mass, 10% by mass, or 8% by mass.

The preferable lower limit of the content of the compound represented by formula (M-2.5) relative to the total amount of the composition of the present invention is 1% by mass, 2% by mass, 5% by mass, or 6% by mass. The preferable upper limit of the content is 30% by mass, 25% by mass, 23% by mass, 20% by mass, 18% by mass, 15% by mass, 13% by mass, 10% by mass, or 8% by mass.

The preferable lower limit of the total content of the compounds represented by formulae (M-2.2), (M-2.3), and (M-2.5) relative to the total amount of the composition of the present invention is 1% by mass, 2% by mass, 5% by mass, or 6% by mass. The preferable upper limit of the content is 30% by mass, 25% by mass, 23% by mass, 20% by mass, 18% by mass, 15% by mass, 13% by mass, 10% by mass, or 8% by mass.

The content relative to the total amount of the composition of the present invention is preferably 1% by mass or more, more preferably 5% by mass or more, more preferably 8% by mass or more, more preferably 10% by mass or more, more preferably 14% by mass or more, and yet more preferably 16% by mass or more. In view of low-temperature solubility, transition temperature, electrical reliability, etc., the maximum ratio is preferably 30% by mass or less, more preferably 25% by mass or less, yet more preferably 22% by mass or less, and most preferably less than 20% by mass.

The compounds represented by general formula (M) used in the composition of the present invention are preferably compounds represented by general formula (M-3).

[Chem. 33]

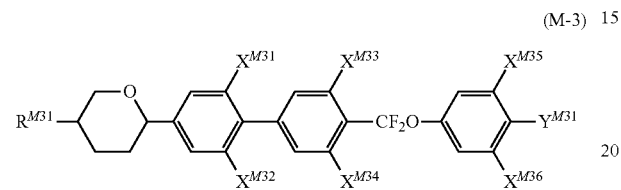

(M-3)

(In the formula, $R^{M31}$ represents an alkyl group having 1 to 5 carbon atoms, an alkenyl group having 2 to 5 carbon atoms, or an alkoxy group having 1 to 4 carbon atoms, $X^{M31}$ to $X^{M36}$ each independently represent a hydrogen atom or a fluorine atom, and $Y^{M31}$ represents a fluorine atom, a chlorine atom, or $OCF_3$.)

The number of compounds that can be used in combination is not particularly limited. One or more compounds are preferably used in combination considering low-temperature solubility, transition temperature, electrical reliability, birefringence, etc.

There are an upper limit and a lower limit to the content of the compound represented by general formula (M-3) according to the respective embodiments in view of properties such as low-temperature solubility, transition temperature, electrical reliability, and birefringence.

The preferable lower limit of the content of the compound represented by formula (M-3) relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 20% by mass, 18% by mass, 15% by mass, 13% by mass, 10% by mass, 8% by mass, or 5% by mass.

The compounds represented by general formula (M-3) used in the composition of the present invention are specifically preferably compounds represented by formula (M-3.1) to formula (M-3.4). Among these, a compound represented by formula (M-3.1) and/or a compound represented by formula (M-3.2) is preferably contained.

[Chem. 34]

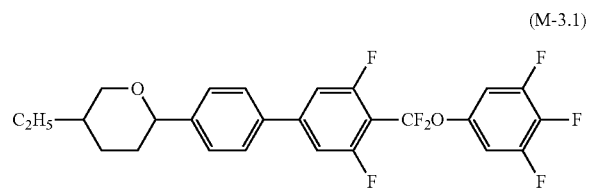

(M-3.1)

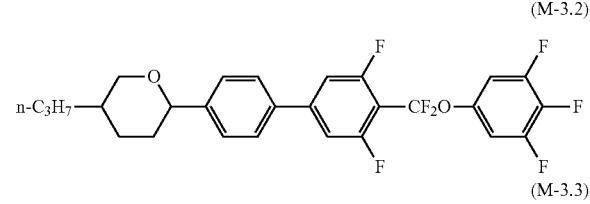

(M-3.2)

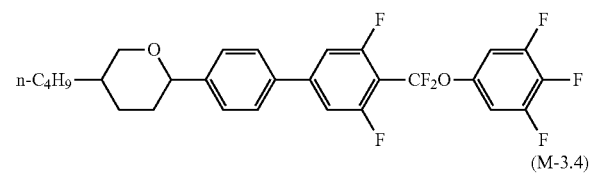

(M-3.3)

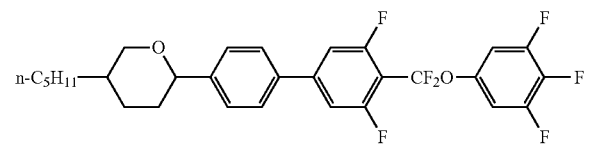

(M-3.4)

The preferable lower limit of the content of the compound represented by formula (M-3.1) relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 20% by mass, 18% by mass, 15% by mass, 13% by mass, 10% by mass, 8% by mass, or 5% by mass.

The preferable lower limit of the content of the compound represented by formula (M-3.2) relative to the total amount of the composition of the present invention is 1% by mass, 2% by mass, 4% by mass, 5% by mass, 8% by mass, 10% by mass, 13% by mass, 15% by mass, 18%, or 20%. The preferable upper limit of the content is 20% by mass, 18% by mass, 15% by mass, 13% by mass, 10% by mass, 8% by mass, or 5% by mass.

The preferable lower limit of the total content of the compounds represented by formula (M-3.1) and formula (M-3.2) relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 20%, 18% by mass, 15% by mass, 13% by mass, 10% by mass, 8% by mass, or 5% by mass.

The compound represented by general formula (M) is preferably a compound selected from the group consisting of compounds represented by general formula (M-4).

[Chem. 35]

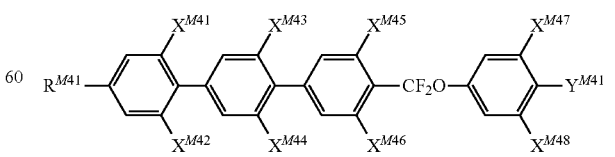

(M-4)

(In the formula, $R^{M41}$ represents an alkyl group having 1 to 5 carbon atoms, an alkenyl group having 2 to 5 carbon atoms, or an alkoxy group having 1 to 4 cartoon atoms, $X^{M41}$ to $X^{M48}$ each independently represent a fluorine atom or a hydrogen atom, and $Y^{M41}$ represents a fluorine atom, a chlorine atom, or $OCF_3$.)

The compounds that can be used in combination are not particularly limited. Considering low-temperature solubility, transition temperature, electrical reliability, birefringence, etc., one, two, or three or more compounds are preferably used in combination.

There are an upper limit and a lower limit to the content of the compound represented by general formula (M-4) according to the respective embodiments in view of properties such as low-temperature solubility, transition temperature, electrical reliability, and birefringence.

The preferable lower limit of the content of the compound represented by formula (M-4) relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

When the composition of the present invention is used in a liquid crystal display element having a small cell gap, the content of the compound represented by general formula (M-4) is preferably relatively large. When the composition is used in a liquid crystal display element with a low drive voltage, the content of the compound represented by general formula (M-4) is preferably relatively large. When the composition is used in a liquid crystal display element for use in a low-temperature environment, the content of the compound represented by general formula (M-4) is preferably relatively small. When the composition is used in a liquid crystal display element having high response speed, the content of the compound represented by general formula (M-4) is preferably relatively small.

The compounds represented by general formula (M-4) used in the composition of the present invention are specifically preferably compounds represented by formula (M-4.1) to formula (M-4.4). Among these, the compounds represented by formula (M-4.2) to formula (M-4.4) are preferably contained, and more preferably the compound represented by formula (M-4.2) is contained.

[Chem. 36]

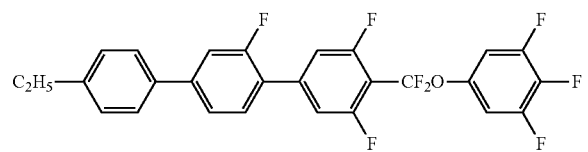

(M-4.1)

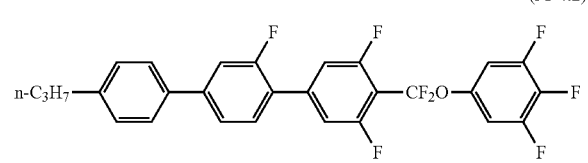

(M-4.2)

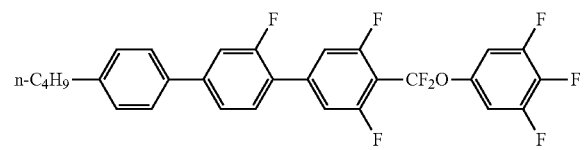

(M-4.3)

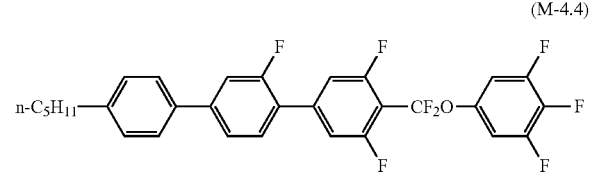

(M-4.4)

The compounds represented by general formula (M) are preferably compounds represented by general formula (M-5).

[Chem. 37]

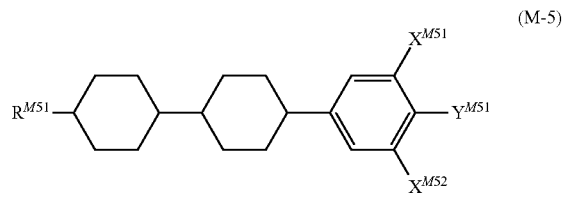

(M-5)

(In the formula, $R^{M51}$ represents an alkyl group having 1 to 5 carbon atoms, an alkenyl group having 2 to 5 carbon atoms, or an alkoxy group having 1 to 4 carbon atoms, $X^{M51}$ and $X^{M52}$ each independently represent a hydrogen atom or a fluorine atom, and $Y^{M51}$ represents a fluorine atom, a chlorine atom, or $OCF_3$.)

The number of compounds that can be used in combination is not particularly limited. The compounds are used in combination depending on the desired performance, such as low-temperature solubility, transition temperature, electrical reliability, and birefringence, for each embodiment. For example, one compound is used in one embodiment of the present invention, two compounds are used in another embodiment, three compounds are used in yet another embodiment, four compounds are used in yet another embodiment, five compounds are used in yet another embodiment, and six or more compounds are used in combination in yet another embodiment.

The preferable lower limit of the content of the compound represented by formula (M-5) relative to the total amount of the composition of the present invention is 1% by mass, 2% by mass, 5% by mass, 8% by mass, 10% by mass, 13% by mass, 15% by mass, 18% by mass, 20% by mass, 22% by mass, 25% by mass, or 30% by mass. The preferable upper limit of the content is 50% by mass, 45% by mass, 40% by mass, 35% by mass, 33% by mass, 30% by mass, 28% by mass, 25% by mass, 23% by mass, 20% by mass, 18% by mass, 15% by mass, 13% by mass, 10% by mass, 8% by mass, 5% by mass.

When the viscosity of the composition of the present invention is to be maintained low and a composition having high response speed is necessary, the lower limit is preferably relatively low and the upper limit is preferably relatively low. When Tni of the composition of the present invention is to be maintained high and a composition with which image sticking rarely occurs is necessary, the lower limit is preferably relatively low and the upper limit is preferably relatively low. When the dielectric anisotropy is desirably increased to keep the drive voltage low, the lower limit is preferably relatively high and the upper limit is preferably relatively high.

The compounds represented by general formula (M-5) are preferably compounds represented by formula (M-5.1) to formula (M-5.4), and are preferably compounds represented by formula (M-5.1) to formula (M-5.4).

[Chem. 38]

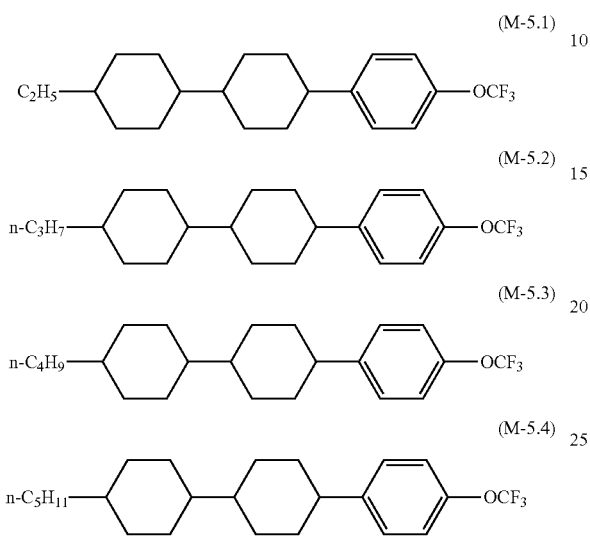

The preferable lower limit of the content of these compounds relative to the total amount of the composition of the present invention is 1% by mass, 2% by mass, 5% by mass, 8% by mass, 10% by mass, 13% by mass, or 15% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The compounds represented by general formula (M-5) are preferably compounds represented by formula (M-5.11) to formula (M-5.17), and are preferably the compounds represented by formula (M-5.11), formula (M-5.13), and formula (M-5.17).

[Chem. 39]

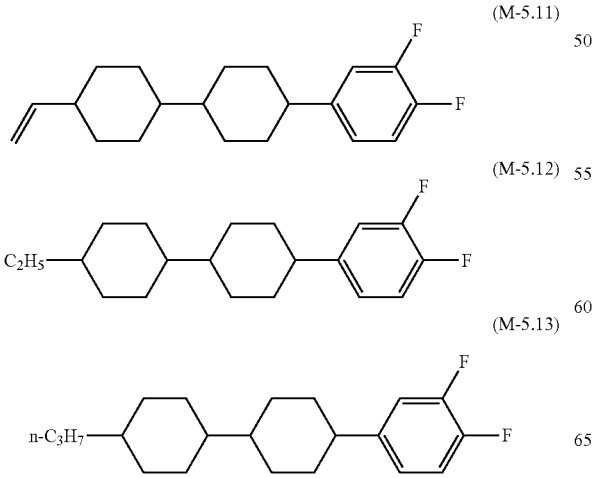

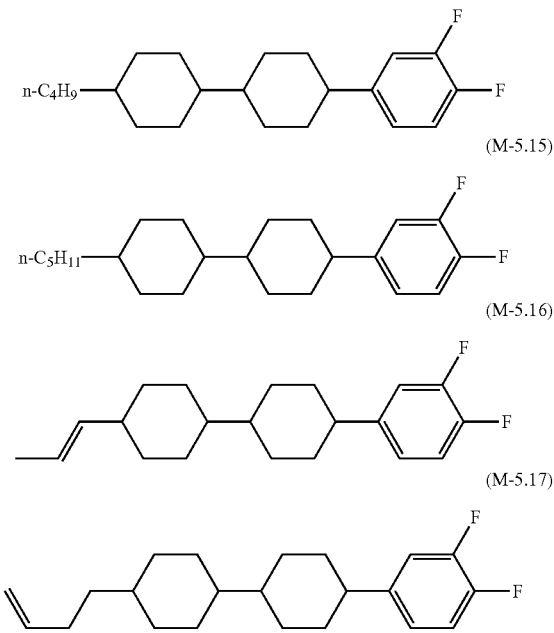

The preferable lower limit of the content of these compounds relative to the total amount of the composition of the present invention is 1% by mass, 2% by mass, 5% by mass, 8% by mass, 10% by mass, 13% by mass, or 15% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The compounds represented by general formula (M-5) are preferably compounds represented by formula (M-5.21) to formula (M-5.28), and are preferably the compounds represented by formula (M-5.21), formula (M-5.22), formula (M-5.23), and formula (M-5.25).

[Chem. 40]

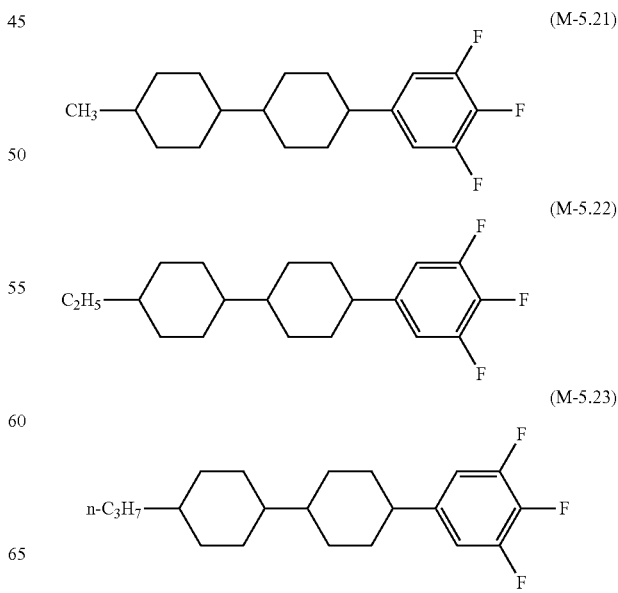

-continued (M-5.24)
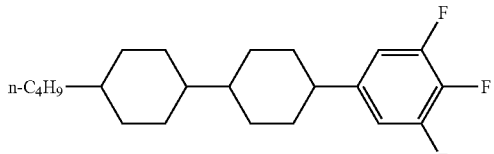

(M-5.25)
(M-5.26)
(M-5.27)
(M-5.28)
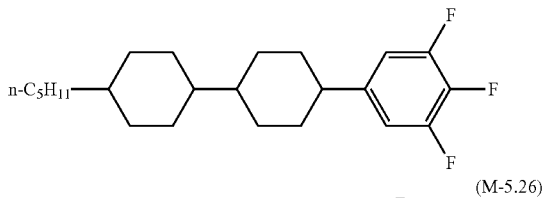
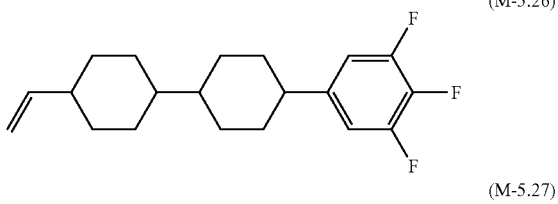
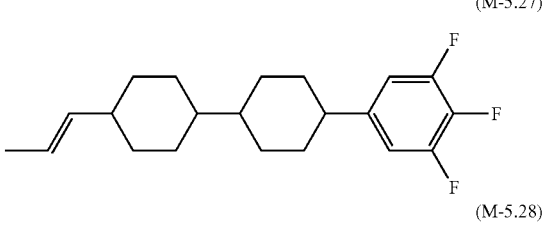
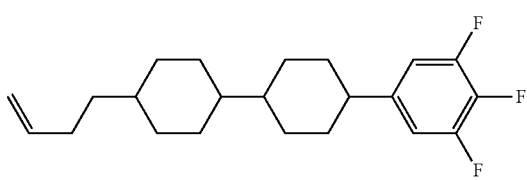

The preferable lower limit of the content of these compounds relative to the total amount of the composition of the present invention is 1% by mass, 2% by mass, 5% by mass, 8% by mass, 10% by mass, 13% by mass, 15% by mass, 18% by mass, 20% by mass, 22% by mass, 25% by mass, or 30% by mass. The preferable upper limit of the content is 40% by mass, 35% by mass, 33% by mass, 30% by mass, 28% by mass, 25% by mass, 23% by mass, 20% by mass, 18% by mass, 15% by mass, 13% by mass, 10% by mass, 8% by mass, or 5% by mass.

The compounds represented by general formula (M) are preferably compounds represented by general formula (M-6).

[Chem. 41]

(M-6)
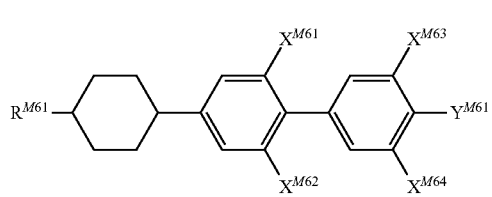

(In the formula, $R^{M61}$ represents an alkyl group having 1 to 5 carbon atoms, an alkenyl group having 2 to 5 carbon atoms, or an alkoxy group having 1 to 4 carbon atoms, $X^{M61}$ to $X^{M64}$ each independently represent a fluorine atom or a hydrogen atom, and $Y^{M61}$ represents a fluorine atom, a chlorine atom, or $OCF_3$.)

The number of compounds that can be used in combination is not particularly limited. The compounds are used in combination preferable for each embodiment in view of low-temperature solubility, transition temperature, electrical reliability, birefringence, etc.

The preferable lower limit of the content of the compound represented by formula (M-6) relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13%, 10% by mass, 8% by mass, or 5% by mass .

When the composition of the present invention is used in a liquid crystal display element with a low drive voltage, the content of the compound represented by general formula (M-6) is preferably relatively large. When the composition is used in a liquid crystal display element with a high response speed, the content of the compound represented by general formula (M-6) is preferably relatively small.

The compounds represented by general formula (M-6) are specifically preferably compounds represented by formula (M-6.1) to formula (M-6.4). Among these, compounds represented by formula (M-6.2) and formula (M-6.4) are preferably contained.

[Chem. 42]

(M-6.1)
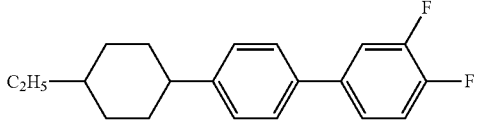

(M-6.2)
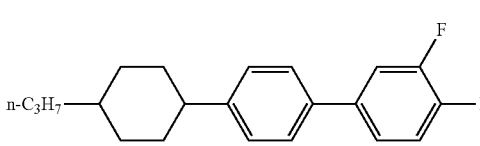

(M-6.3)
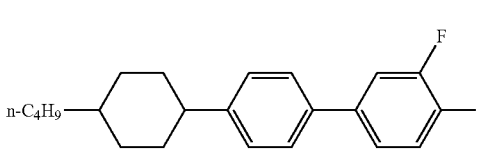

(M-6.4)
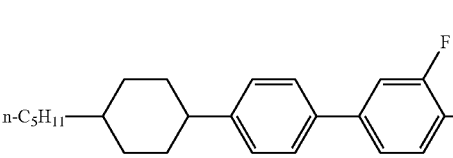

The preferable lower limit of the content of these compounds relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The compounds represented by general formula (M-6) are specifically preferably compounds represented by formula (M-6.11) to formula (M-6.14). Among these, compounds represented by formula (M-6.12) and formula (M-6.14) are preferably contained.

[Chem. 43]

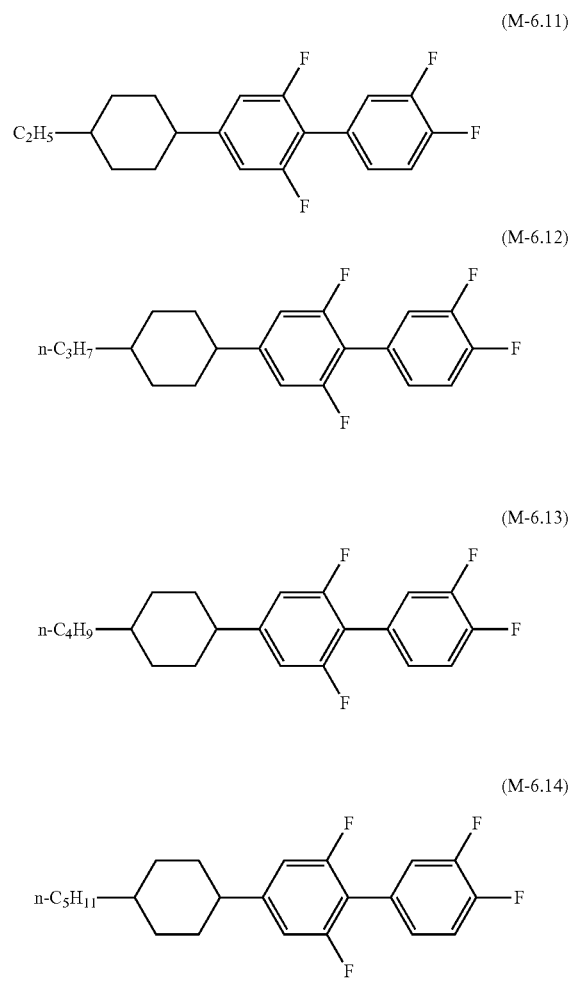

The preferable lower limit of the content of these compounds relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The compounds represented by general formula (M-6) are specifically preferably compounds represented by formula (M-6.21) to formula (M-6.24). Among these, the compounds represented by formula (M-6.21), formula (M-6.22), and formula (M-6.24) are preferably contained.

[Chem. 44]

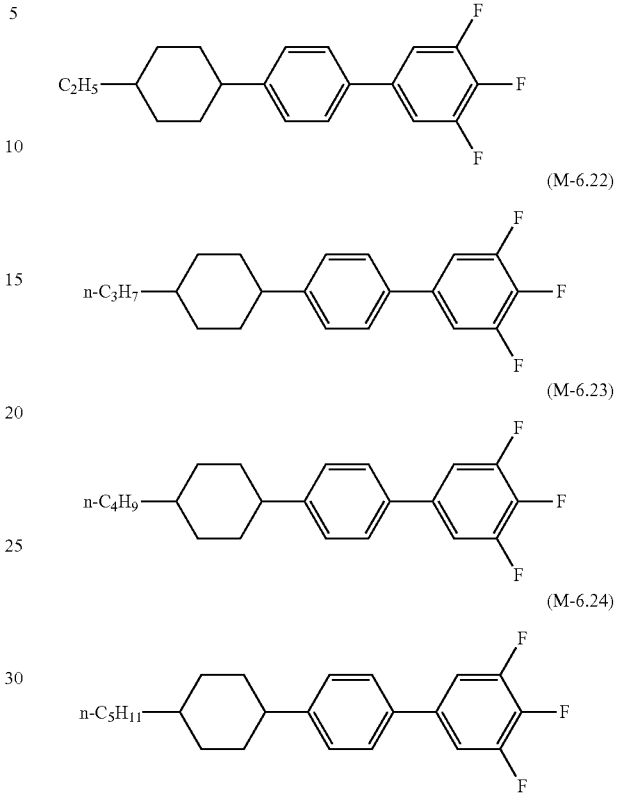

The preferable lower limit of the content of these compounds relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The compounds represented by general formula (M-6) are specifically preferably compounds represented by formula (M-6.31) to formula (M-6.34). Among these, compounds represented by formula (M-6.31) and formula (M-6.32) are preferably contained.

[Chem. 45]

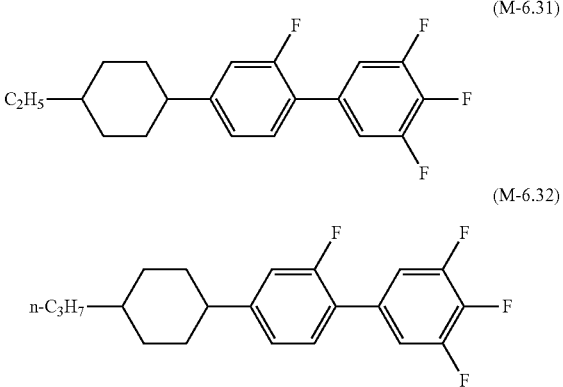

-continued (M-6.33)
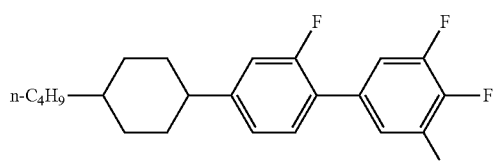

(M-6.34)
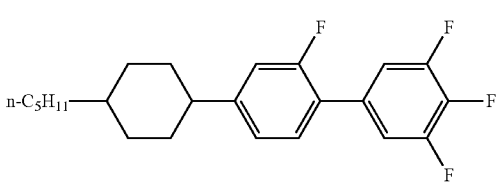

The preferable lower limit of the content of these compounds relative to the total amount of the composition of the present invention is 1% by mass, 2% by mass, 4% by mass, 5% by mass, 8% by mass, 10% by mass, 13% by mass, 15% by mass, 18% by mass, or 20%. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The compounds represented by general formula (M-6) are specifically preferably compounds represented by formula (M-6.41) to formula (M-6.44). Among these, the compound represented by formula (M-6.42) is preferably contained.

[Chem. 46]

(M-6.41)
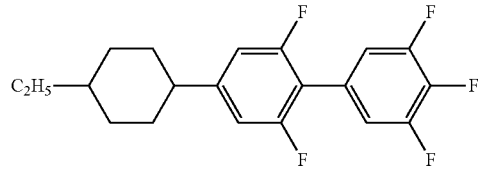

(M-6.42)
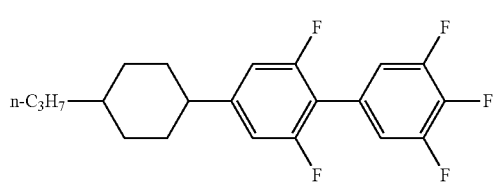

(M-6.43)
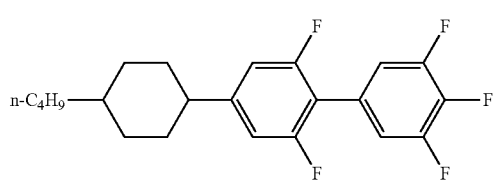

(M-6.44)
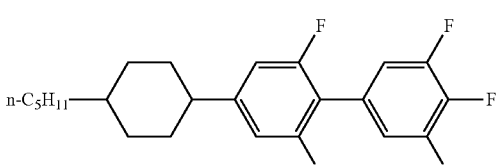

The preferable lower limit of the content of these compounds relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The compound represented by general formula (M) is preferably a compound selected from the group consisting of compounds represented by general formula (M-7).

[Chem. 47]

(M-7)
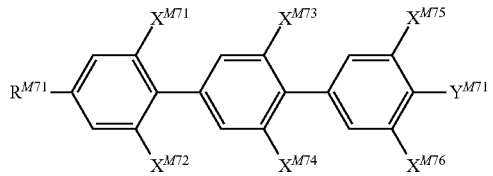

(In the formula, $X^{M71}$ and $X^{M76}$ each independently represent a fluorine atom or a hydrogen atom, $R^{M71}$ represents an alkyl group having 1 to 5 carbon atoms, an alkenyl group having 2 to 5 carbon atoms, or an alkoxy group having 1 to 4 carbon atoms, and $Y^{M71}$ represents a fluorine atom or $OCF_3$.)

The number of compounds that can be used in combination is not particularly limited. One or two selected from these compounds are preferably contained. More preferably, one to three compounds are contained. Yet more preferably, one to four compounds are contained.

There are an upper limit and a lower limit to the content of the compound represented by general formula (M-7) according to the respective embodiments in view of properties such as low-temperature solubility, transition temperature, electrical reliability, and birefringence.

The preferable lower limit of the content of the compound represented by formula (M-7) relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

When the composition of the present invention is used in a liquid crystal display element having a small cell gap, the content of the compound represented by general formula (M-7) is preferably relatively large. When the composition is used in a liquid crystal display element with a low drive voltage, the content of the compound represented by general formula (M-7) is preferably relatively large. When the composition is used in a liquid crystal display element for use in a low-temperature environment, the content of the compound represented by general formula (M-7) is preferably relatively small. When the composition is used in a liquid crystal display element having high response speed, the content of the compound represented by general formula (M-7) is preferably relatively small.

The compounds represented by general formula (M-7) are preferably compounds represented by formula (M-7.1) to formula (M-7.4). The compound represented by formula (M-7.2) is preferable.

[Chem. 48]

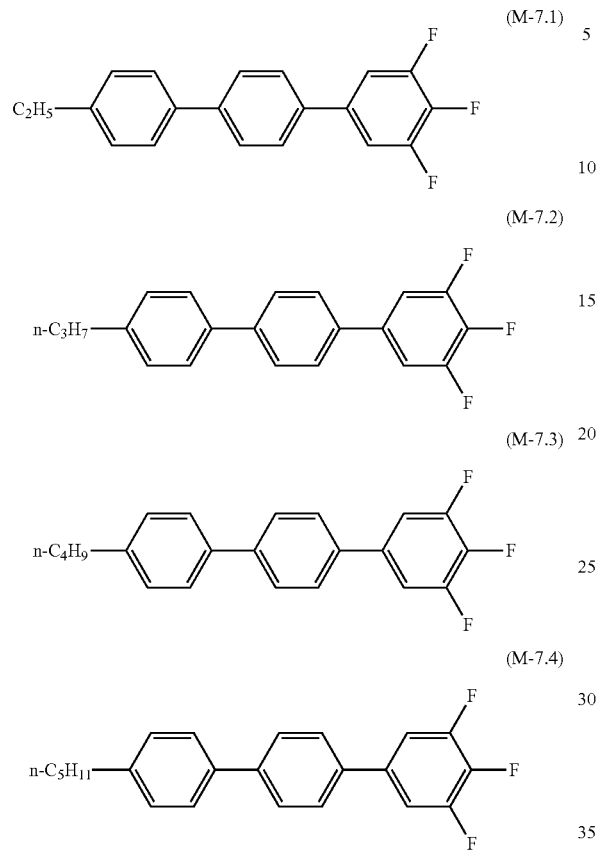

(M-7.1)
(M-7.2)
(M-7.3)
(M-7.4)

The preferable lower limit of the content of these compounds relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The compounds represented by general formula (M-7) are preferably compounds represented by formula (M-7.11) to formula (M-7.14), and are preferably compounds represented by formula (M-7.11) and formula (M-7.12).

[Chem. 49]

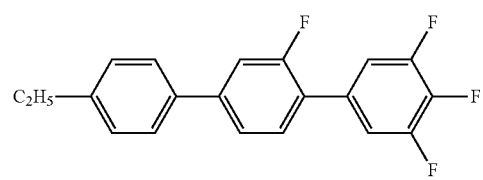

(M-7.11)

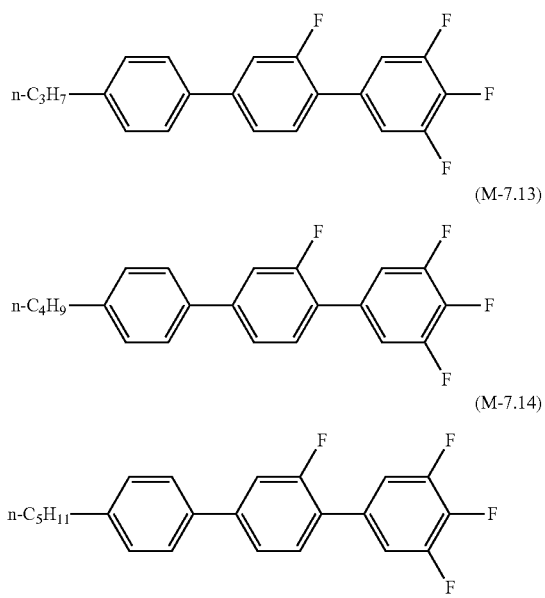

(M-7.12)
(M-7.13)
(M-7.14)

The preferable lower limit of the content of these compounds relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The compounds represented by general formula (M-7) are preferably compounds represented by formula (M-7.21) to formula (M-7.24), and are preferably compounds represented by formula (M-7.21) and formula (M-7.22).

[Chem. 50]

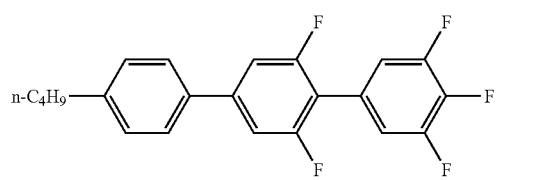

(M-7.21)
(M-7.22)
(M-7.23)

-continued (M-7.24)

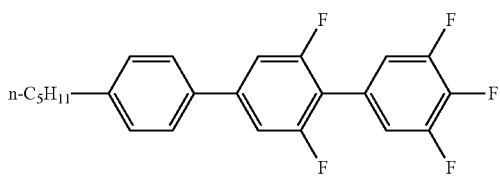

The preferable lower limit of the content of these compounds relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The compounds represented by general formula (M) are more preferably compounds represented by general formula (M-8).

[Chem. 51]

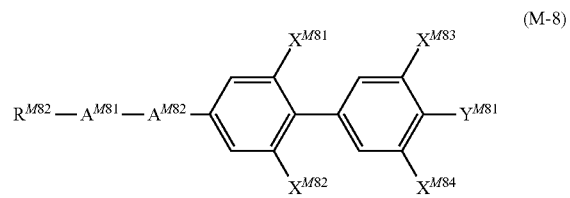

(M-8)

(In the formula, $X^{M81}$ to $X^{M84}$ each independently represent a fluorine atom or a hydrogen atom, $Y^{M81}$ represents a fluorine atom, a chlorine atom-, or —$OCF_3$, $R^{M81}$ represents an alkyl group having 1 to 5 carbon atoms, an alkenyl group having 2 to 5 carbon atoms, or an alkoxy group having 1 to 4 carbon atoms, and $A^{M81}$ and $A^{M82}$ each independently represent a 1,4-cyclohexylene group, a 1,4-phenylene group, or

[Chem. 52]

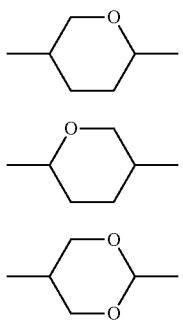

[Chem. 53]

[Chem. 54]

However, a hydrogen atom in the 1,4-phenylene group may be substituted with a fluorine atom.)

The preferable lower limit of the content of the compound represented by formula (M-8) relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28%, 25% by mass, 23% by mass, 20% by mass, 18% by mass, 15% by mass, 13% by mass, 10% by mass, 8% by mass, or 5% by mass.

When the viscosity of the composition of the present invention is to be maintained low and a composition having high response speed is necessary, the lower limit is preferably relatively low and the upper limit is preferably relatively low. When a composition with which image sticking rarely occurs is necessary, the lower limit is preferably relatively low and the upper limit is preferably relatively low. When the dielectric anisotropy is desirably increased to keep the drive voltage low, the lower limit is preferably relatively high and the upper limit is preferably relatively high.

The compounds represented by general formula (M-8) used in the composition of the present invention are specifically preferably compounds represented by formula (M-8.1) to formula (M-8.4). Among these, compounds represented by formula (M-8.1) and formula (M-8.2) are preferably contained.

[Chem. 55]

(M-8.1)

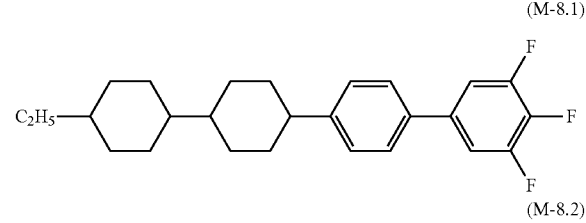

(M-8.2)

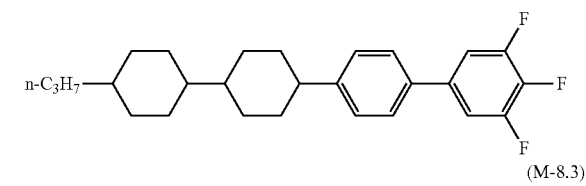

(M-8.3)

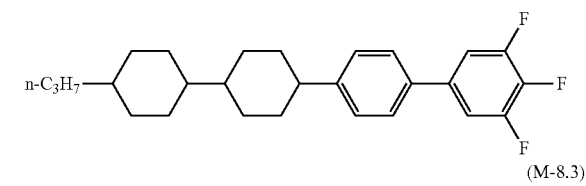

(M-8.4)

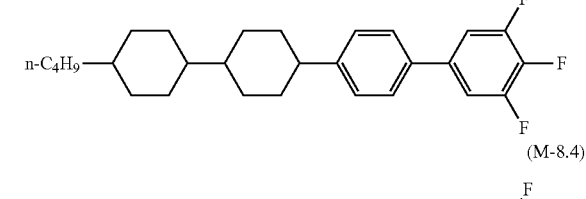

The preferable lower limit of the content of these compounds relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The compounds represented by general formula (M-8) used in the composition of the present invention are specifically preferably compounds represented by formula (M-8.11) to formula (M-8.14). Among these, the compound represented by formula (M-8.12) is preferably contained.

[Chem. 56]

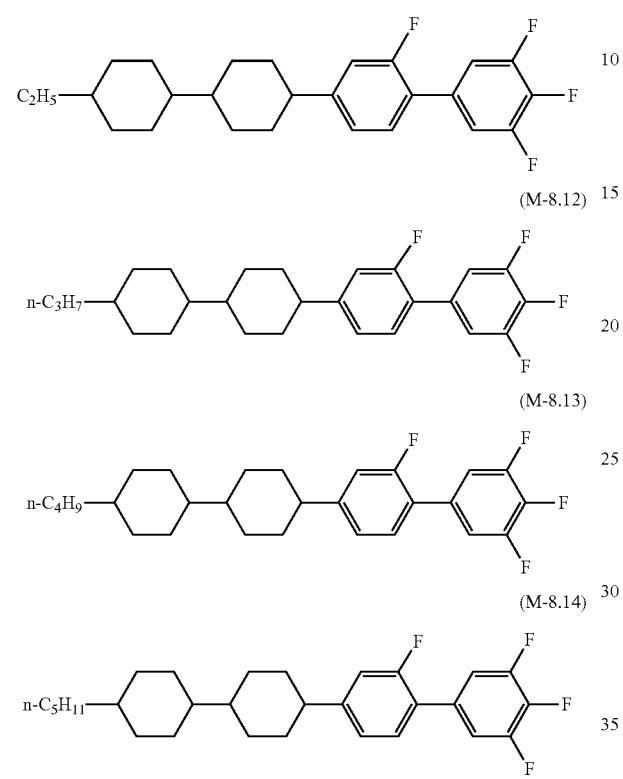

The preferable lower limit of the content of these compounds relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18%, 15% by mass, 13% by mass, 10% by mass, 8% by mass, or 5% by mass.

The compounds represented by general formula (M-8) used in the composition of the present invention are specifically preferably compounds represented by formula (M-8.21) to formula (M-8.24). Among these, the compound represented by formula (M-8.22) is preferably contained.

[Chem. 57]

The preferable lower limit of the content of these compounds relative to the total amount of the composition of the present invention is 1% by mass, 2% by mass, 4% by mass, 5% by mass, 8% by mass, 10% by mass, 13% by mass, 15% by mass, 18%, or 20%. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The compounds represented by general formula (M-8) used in the composition of the present invention are specifically preferably compounds represented by formula (M-8.31) to formula (M-8.34). Among these, the compound represented by formula (M-8.32) is preferably contained.

[Chem. 58]

(M-8.34)

[structure: n-C5H11—cyclohexyl—cyclohexyl—(2,6-F2-phenyl)—(3,5-F2-phenyl)—OCF3]

The preferable lower limit of the content of these compounds relative to the total amount of the composition of the present invention is 1%, 2%, 4%, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The compounds represented by general formula (M-8) used in the composition of the present invention are specifically preferably compounds represented by formula (M-8.41) to formula (M-8.44). Among these, the compound represented by formula (M-8.42) is preferably contained.

[Chem. 59]

(M-8.41)
[structure: C2H5—cyclohexyl—phenyl—(2-F-phenyl)—(3,5-F2-phenyl)—OCF3]

(M-8.42)
[structure: n-C3H7—cyclohexyl—phenyl—(2-F-phenyl)—(3,5-F2-phenyl)—OCF3]

(M-8.43)
[structure: n-C4H9—cyclohexyl—phenyl—(2-F-phenyl)—(3,5-F2-phenyl)—OCF3]

(M-8.44)
[structure: n-C5H11—cyclohexyl—phenyl—(2-F-phenyl)—(3,5-F2-phenyl)—OCF3]

The preferable lower limit of the content of these compounds relative to the total amount of the composition of the present invention is 1% by mass, 2% by mass, 4% by mass, 5% by mass, 8% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

Specifically, the compounds represented by general formula (M-8) used in the composition of the present invention are preferably compounds represented by formula (M-8.51) to formula (M-8.54). Among these, the compound represented by formula (M-8.52) is preferably contained.

[Chem. 60]

(M-8.51)
[structure: C2H5—phenyl—phenyl—(2-F-phenyl)—(3,4,5-F3-phenyl)—F]

(M-8.52)
[structure: n-C3H7—phenyl—phenyl—(2-F-phenyl)—(3,4,5-F3-phenyl)—F]

(M-8.53)
[structure: n-C4H9—phenyl—phenyl—(2-F-phenyl)—(3,4,5-F3-phenyl)—F]

(M-8.54)
[structure: n-C5H11—phenyl—phenyl—(2-F-phenyl)—(3,4,5-F3-phenyl)—F]

The preferable lower limit of the content of these compounds relative to the total amount of the composition of the present invention is 1% by mass, 2% by mass, 4% by mass, 5% by mass, 3% by mass, 10% by mass, 13% by mass, 15% by mass, 18% by mass, or 20% by mass. The preferable upper limit of the content is 30% by mass, 28% by mass, 25% by mass, 23% by mass, 20% by mass, 18% by mass, 15% by mass, 13% by mass, 10% by mass, 8% by mass, or 5% by mass.

The liquid crystal composition of the present invention can contain at least one compound represented by general formula (VIII-a), general formula (VIII-c), or general formula (VIII-d).

[Chem. 61]

(VIII-a)
[structure: $R^{51}$—cyclohexyl—phenyl—phenyl—cyclohexyl—$R^{52}$]

[Chem. 62]

(VIII-c)
[structure: $R^{51}$—cyclohexyl—phenyl—(X51,X52-phenyl)—cyclohexyl—$R^{52}$]

[Chem. 63]

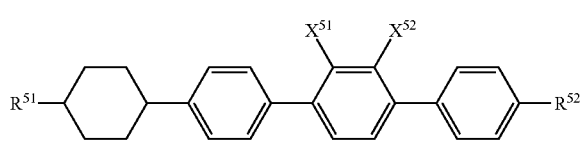

(VIII-d)

In the formulae, $R^{51}$ and $R^{52}$ each independently represent an alkyl group having 1 to 5 carbon atoms, an alkenyl group having 2 to 5 carbon atoms, or an alkoxy group having 1 to 5 carbon atoms, $X^{51}$ and $X^{52}$ each independently represent a fluorine atom or a hydrogen atom, and at least one selected from $X^{51}$ and $X^{52}$ represents a fluorine atom.

The liquid crystal composition of the present invention may contain at least one selected from compounds represented by general formula (V-9.1) to general formula (V-9.3).

[Chem. 64]

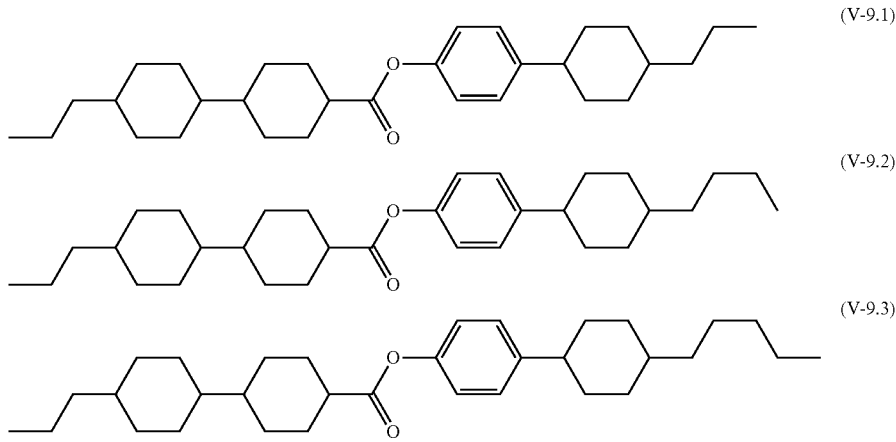

The liquid crystal composition of the present invention preferably simultaneously contains the compounds represented by formula (I-1), formula (II), general formula (III-A1), and general formula (IV-F), preferably simultaneously contains the compounds represented by formula (I-1), formula (II), general formula (III-A3), and general formula (IV-F), preferably simultaneously contains the compounds represented by formula (I-1), formula (II), general formula (III-A4), and general formula (IV-F), preferably simultaneously contains the compounds represented by formula (I-1), formula (II), general formula (III-B1), and general formula (IV-F), preferably simultaneously contains the compounds represented by formula (I-1), formula (II), general formula (III-B3), and general formula (IV-F), preferably simultaneously contains the compounds represented by formula (I-1), formula (II), general formula (III-B4), and general formula (IV-F), and preferably simultaneously contains the compounds represented by formula (I-1), formula (II), general formula (III-B5), and general formula (IV-F). In this case, the content of the polymerizable compound represented by general formula (I-1) relative to the total content of the compound represented by general formula (I-1) and other compounds preferably contained simultaneously is preferably 0.01% by mass or more and 5.00% by mass or less. The lower limit thereof is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.10% by mass, preferably 0.15% by mass, preferably 0.20% by mass, more preferably 0.25% by mass, and more preferably 0.30% by mass. The upper limit thereof is preferably 4.50% by mass, preferably 4.00% by mass, preferably 3.50% by mass, preferably 3.00% by mass, preferably 2.50% by mass, preferably 2.00% by mass, preferably 1.50% by mass, preferably 1.00% by mass, preferably 0.90% by mass, preferably 0.80% by mass, preferably 0.70% by mass, more preferably 0.60% by mass, more preferably 0.55% by mass, more preferably 0.50% by mass, more preferably 0.45% by mass, and more preferably 0.40% by mass.

The liquid crystal composition of the present invention more preferably simultaneously contains compounds represented by formula (I-1), formula (II), general formula (III-A1), general formula (III-B1), and general formula (IV-F), more preferably simultaneously contains compounds represented by formula (I-1), formula (II), general formula (III-A3), general formula (III-B5), and general formula (IV-F), more preferably simultaneously contains compounds represented by formula (I-1), formula (II), general formula (III-A1), general formula (III-B4), and general formula (IV-F), and more preferably simultaneously contains compounds represented by formula (I-1), formula (II), general formula (III-A1), general formula (III-B5), and general formula (IV-F). In this case, the content of the polymerizable compound represented by general formula (I-1) relative to the total content of the compound represented by general formula (I-1) and other compounds preferably contained simultaneously is preferably 0.01% by mass or more and 5.00% by mass or less. The lower limit thereof is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.10% by mass, preferably 0.15% by mass, preferably, 0.20% by mass, more preferably 0.25% by mass, and more preferably 0.30% by mass. The upper limit thereof is preferably 4.50% by mass, preferably 4.00% by mass, preferably 3.50% by mass, preferably 3.00% by mass, preferably 2.50% by mass, preferably 2.00% by mass, preferably 1.50% by mass, preferably 1.00% by mass, preferably 0.90% by mass, preferably 0.80% by mass, preferably 0.70% by mass, more preferably 0.60% by mass, more preferably 0.55% by mass, more preferably 0.50% by mass, more preferably 0.45% by mass, and more preferably 0.40% by mass.

The liquid crystal composition of the present invention preferably simultaneously contains the compounds represented by formula (I-1), formula (II), general formula (III-A1), and general formula (IV-H), preferably simultaneously contains the compounds represented by formula (I-1), formula (II), general formula (III-A3), and general formula (IV-H), preferably simultaneously contains the compounds represented by formula (I-1), formula (II), general formula (III-A4), and general formula (IV-H), preferably simultaneously contains the compounds represented by formula (I-1), formula (II), general formula (III-B1), and general formula (IV-H), preferably simultaneously contains the compounds represented by formula (I-1), formula (II), general formula (III-B3), and general formula (IV-H), preferably simultaneously contains the compounds represented by formula (I-1), formula (II), general formula (III-B4), and general formula (IV-H), and preferably simultaneously contains the compounds represented by formula (I-1), formula (II), general formula (III-B5), and general formula (IV-H). In this case, the content of the polymerizable compound represented by general formula (I-1) relative to the total content of the compound represented by general formula (I-1) and other compounds preferably contained simultaneously is 0.01% by mass or more and 5.00% by mass or less. The lower limit thereof is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.10% by mass, preferably 0.15% by mass, preferably 0.20% by mass, more preferably 0.25% by mass, and more preferably 0.30% by mass. The upper limit thereof is preferably 4.50% by mass, preferably 4.00% by mass, preferably 3.50% by mass, preferably 3.00% by mass, preferably 2.50% by mass, preferably 2.00% by mass, preferably 1.50% by mass, preferably 1.00% by mass, preferably 0.90% by mass, preferably 0.80% by mass, preferably 0.70% by mass, more preferably 0.60% by mass, more preferably 0.55% by mass, more preferably 0.50% by mass, more preferably 0.45% by mass, and more preferably 0.40% by mass.

The liquid crystal composition of the present invention more preferably simultaneously contains compounds represented by formula (I-1), formula (II), general formula (III-A1), general formula (III-B1), and general formula (IV-H), more preferably simultaneously contains compounds represented by formula (I-1), formula (II), general formula (III-A3), general formula (III-B5), and general formula (IV-H), more preferably simultaneously contains compounds represented by formula (I-1), formula (II), general formula (III-A1), general formula (III-B4), and general formula (IV-H), and more preferably simultaneously contains compounds represented by formula (I-1), formula (II), general formula (III-A1), general formula (III-B5), and general formula (IV-H). In this case, the content of the polymerizable compound represented by general formula (I-1) relative to the total content of the compound represented by general formula (I-1) and other compounds preferably contained simultaneously is preferably 0.01% by mass or more and 5.00% by mass or less. The lower limit thereof is 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.10% by mass, preferably 0.15% by mass, preferably 0.20% by mass, more preferably 0.25% by mass, and more preferably 0.30% by mass. The upper limit thereof is preferably 4.50% by mass, preferably 4.00% by mass, preferably 3.50% by mass, preferably 3.00% by mass, preferably 2.50% by mass, preferably 2.00% by mass, preferably 1.50% by mass, preferably 1.00% by mass, preferably 0.90% by mass, preferably 0.80% by mass, preferably 0.70% by mass, more preferably 0.60% by mass, more preferably 0.55% by mass, more preferably 0.50% by mass, more preferably 0.45% by mass, and more preferably 0.40% by mass.

The liquid crystal composition of the present invention preferably simultaneously contains the compounds represented by formula (I-1), formula (II), general formula (III-A1), and general formula (IV-I), preferably simultaneously contains the compounds represented by formula (I-1), formula (II), general formula (III-A3), and general formula (IV-I), preferably simultaneously contains the compounds represented by formula (I-1), formula (II), general formula (III-A4), and general formula (IV-I), preferably simultaneously contains the compounds represented by formula (I-1), formula (II), general formula (III-B1), and general formula (IV-I), preferably simultaneously contains the compounds represented by formula (I-1), formula (II), general formula (III-B3), and general formula (IV-I), preferably simultaneously contains the compounds represented by formula (I-1), formula (II), general formula (III-B4), and general formula (IV-I), and preferably simultaneously contains the compounds represented by formula (I-1), formula (II), general formula (III-B5), and general formula (IV-I). In this case, the content of the polymerizable compound represented by general formula (I-1) relative to the total content of the compound represented by general formula (I-1) and other compounds preferably contained simultaneously is preferably 0.01% by mass or more and 5.00% by mass or less. The lower limit thereof is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.10% by mass, preferably 0.15% by mass, preferably 0.20% by mass, preferably 0.25% by mass, and more preferably 0.30% by mass. The upper limit thereof is preferably 4.50% by mass, preferably 4.00% by mass, preferably 3.50% by mass, preferably 3.00% by mass, preferably 2.50% by mass, preferably 2.00% by mass, preferably 1.50% by mass, preferably 1.00% by mass, preferably 0.90% by mass, preferably 0.80% by mass, preferably 0.70% by mass, more preferably 0.60% by mass, more preferably 0.55% by mass, more preferably 0.50% by mass, more preferably 0.45% by mass, and more preferably 0.40% by mass.

The liquid crystal composition of the present invention more preferably simultaneously contains the compounds represented by formula (I-1), formula (II), general formula (III-A1), general formula (III-B1), and general formula (IV-I), more preferably simultaneously contains the compounds represented by formula (I-1), formula (II), general formula (III-A3), general formula (III-B5), and general formula (IV-I), more preferably simultaneously contains the compounds represented by formula (I-1), formula (II), general formula (III-A1), general formula (III-B4), and general formula (IV-I), and more preferably simultaneously contains the compounds represented by formula (I-1), formula (II), general formula (III-A1), general formula (III-B5), and general formula (IV-I). In this case, the content of the polymerizable compound represented by general formula (I-1) relative to the total content of the compound represented by general formula (I-1) and other compounds preferably contained simultaneously is preferably 0.01% by mass or more and 5.00% by mass or less. The lower limit thereof is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.10% by mass, preferably 0.15% by mass, preferably 0.20% by mass, preferably 0.25% by mass, and more preferably 0.30% by mass. The upper limit thereof is preferably 4.50% by mass, preferably 4.00% by mass, preferably 3.50% by mass, preferably 3.00% by mass, preferably 2.50% by mass, preferably 2.00% by mass, preferably 1.50% by mass, preferably 1.00% by mass, preferably 0.90% by mass, preferably 0.80% by mass, preferably 0.70% by mass, more preferably 0.60% by mass, more preferably 0.55% by mass, more preferably 0.50% by mass, more preferably 0.45% by mass, and more preferably 0.40% by mass.

The liquid crystal composition of the present invention contains a polymerizable compound represented by general formula (I-1); however, other polymerizable compounds can be used in combination. In this case, polymerizable compounds represented by general formula (I-41) and general formula (I-42) are preferable.

[Chem. 65]

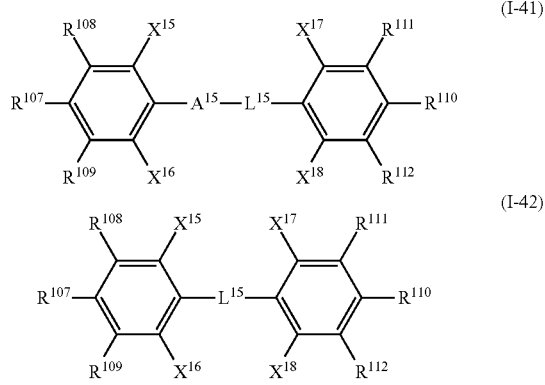

However, the compounds represented by general formula (I-1) are excluded.

In the formulae, $R^{107}$ represents $P^{107}$-$S^{107}$-, $R^{110}$ represents $P^{110}$-$S^{110}$-, $P^{107}$ and $P^{110}$ each independently represent one selected from formula (R-1) to formula (R-15) described above, $S^{107}$ and $S^{110}$ each independently represent a single bond or an alkylene group having 1 to 15 carbon atoms, and one or more —$CH_2$— in the alkylene group may each be substituted with —O—, —OCO—, or —COO— as long as oxygen atoms are not directly adjacent to each other; however, a single bond or an alkylene group having 1 to 6 carbon atoms (one or more —$CH_2$— in the alkylene group may each be substituted with —O— as long as oxygen atoms are not directly adjacent to each other). A single bond is particularly preferable.

In the formulae, $R^{108}$, $R^{109}$, $R^{111}$, and $R^{112}$ each independently represent formula (R-1) to formula (R-15), an alkyl group having 1 to 3 carbon atoms, an alkoxy group having 1 to 3 carbon atoms, a fluorine atom, or a hydrogen atom, $A^{15}$ represents a 1,4-phenylene group, a 1,4-cyclohexylene group, a pyridine-2,5-diyl group, a pyrimidine-2,5-diyl group, a naphthalene-2,6-diyl group, an indane-2,5-diyl group, a 1,2,3,4-tetrahydronaphthalene-2,6-diyl group, or a 1,3-dioxane-2,5-diyl group. The group may be unsubstituted or substituted with an alkyl group having 1 to 12 carbon atoms, a halogen (a fluorine atom or a chlorine atom), a cyano group, or a nitro group. $L^{15}$ represents a single bond, —$OCH_2$—, —$CH_2O$—, —$C_2H_4$—, —COO—, —OCO—, —CH=$CR^a$—COO—, —CH=$CR^a$—OCO—, —COO—$CR^a$=CH—, —OCO—$CR^a$=CH—, —($CH_2$)$_Y$—COO—, —($CH_2$)$_Y$—OCO—, —OCO—($CH_2$)$_Y$—, —COO—($CH_2$)$_Y$—, —CH=CH—, —$CF_2O$—, —$OCF_2$—, or —C≡C— (in the formulae, $R^a$ each independently represent a hydrogen atom or an alkyl group having 1 to 3 carbon atoms, and Y in the formulae represents an integer of 1 to 4). In the formulae, $X^{15}$, $X^{16}$, $X^{17}$, and $X^{18}$ each independently represent a hydrogen atom, an alkyl group having 1 to 3 carbon atoms, or a fluorine atom.

The polymerizable compounds represented by general formula (I-41) and general formula (I-42) are characterised in that they have a mesogen structure that includes 2 or 3 rings. When such polymerizable compounds are used in combination with the polymerizable compound represented by general formula (I-1) according to the present invention, the miscibility with the liquid crystal composition can be further improved.

The content of the polymerizable compounds represented by general formula (I-41) and general formula (I-42) is 0.01% to 5% by mass. The lower limit of the content is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.1% by mass, preferably 0.15% by mass, preferably 0.2% by mass, preferably 0.25% by mass, preferably 0.3% by mass, preferably 0.35% by mass, preferably 0.4% by mass, preferably 0.5% by mass, and preferably 0.55% by mass. The upper limit of the content is preferably 4.5% by mass, preferably 4% by mass, preferably 3.5% by mass, preferably 3% by mass, preferably 2.5% by mass, preferably 2% by mass, preferably 1.5% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, and preferably 0.55% by mass.

The compounds represented by general formula (I-42) are, for example, preferably compounds represented by formula (XX-1) to general formula (XX-10) and more preferably compounds represented by formula (XX-1) to formula (XX-4).

[Chem. 66]

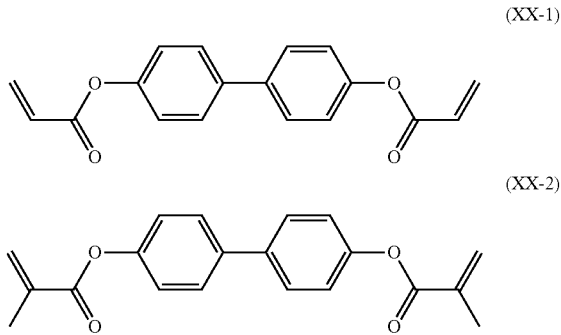

-continued (XX-3)
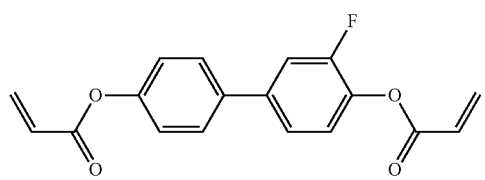

(XX-4)
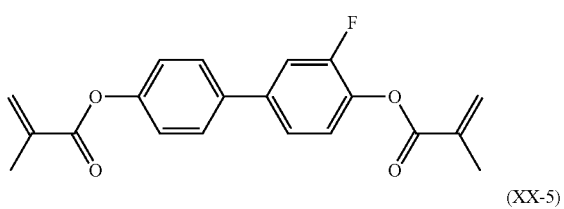

(XX-5)
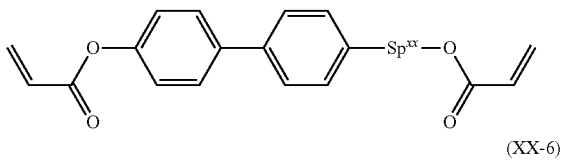

(XX-6)
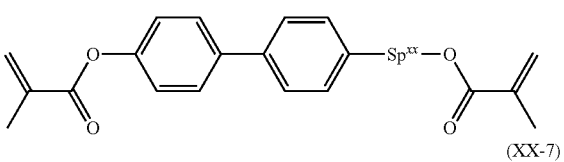

(XX-7)
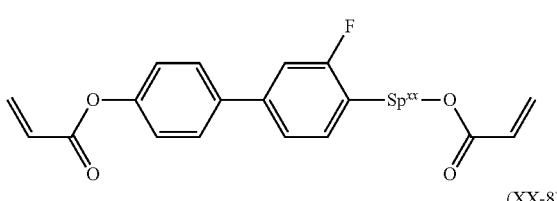

(XX-8)
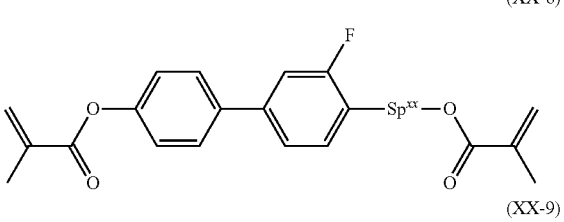

(XX-9)
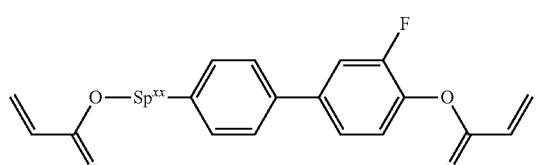

(XX-10)
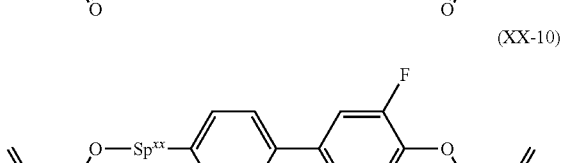

In formula (XX-1) to general formula (XX-10), Sp$^{xx}$ represents an alkylene group having 1 to 8 carbon atoms or —O—(CH$_2$)$_s$— (in the formula, s represents an integer of 2 to 7 and the oxygen atom is bonded to a ring).

In formula (XX-1) to general formula (XX-10), hydrogen atoms in the 1,4-phenylene group may each be further substituted with one selected from —F, —Cl, —CF$_3$, —CH$_3$, and formula (R-1) to formula (R-15), Preferable examples of the compounds represented by general formula (I-41) include polymerizable compounds such as those represented by formula (M31) to formula (M48).

[Chem. 67]

(M31)
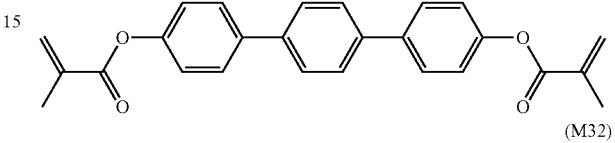

(M32)
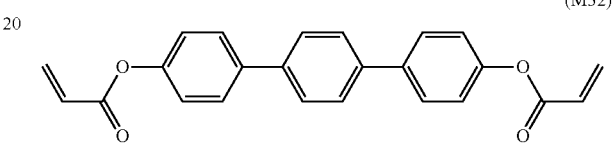

(M33)
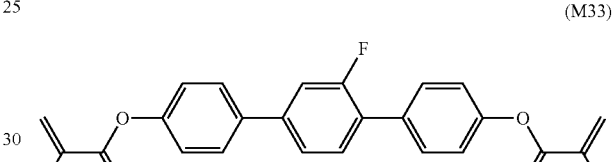

(M34)
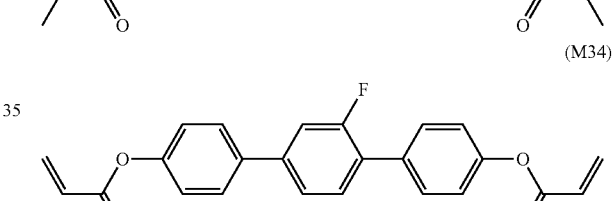

(M35)
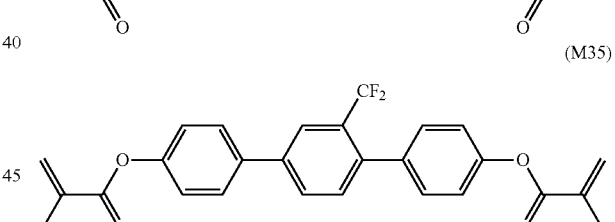

(M36)
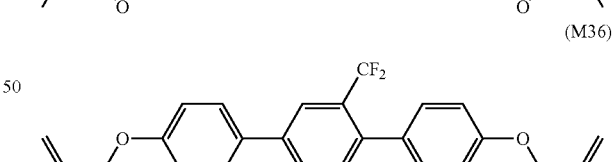

(M37)
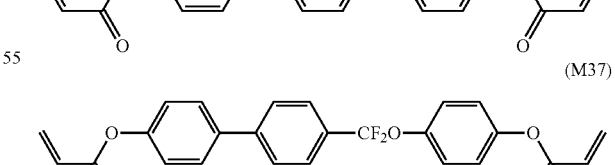

(M38)

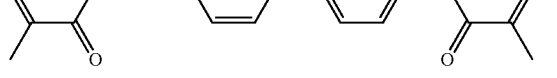
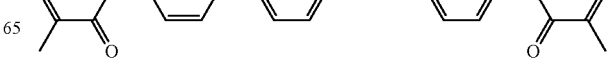

(M39)
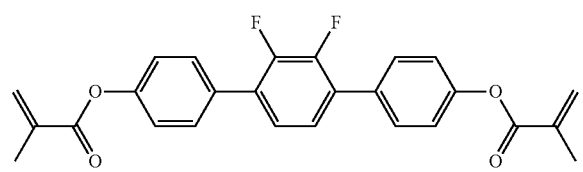
(M40)
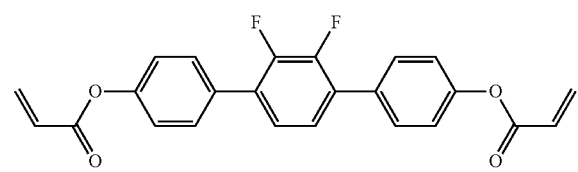
(M41)
(M42)
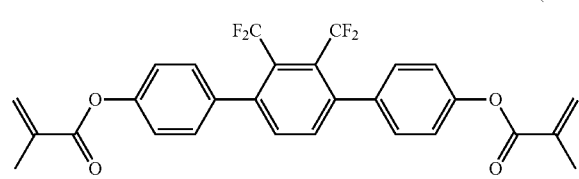
(M43)
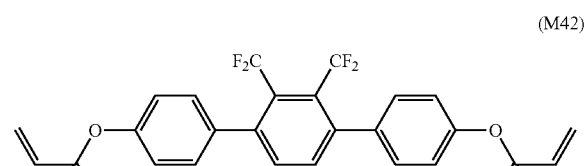
(M44)
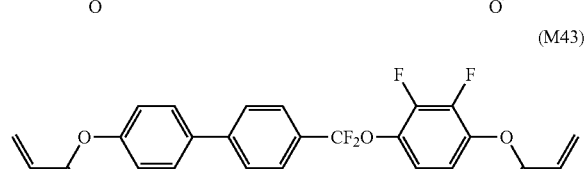
(M45)
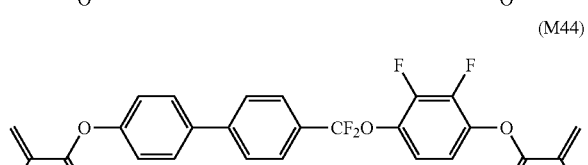
(M46)
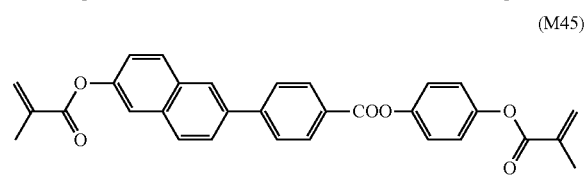
(M47)
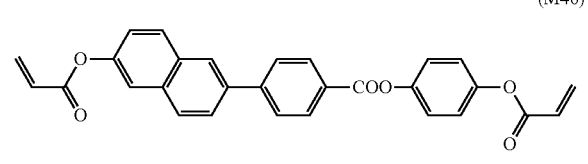
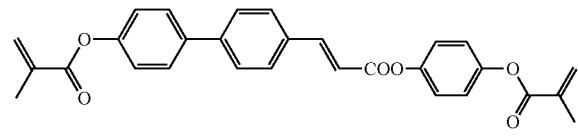
(M48)
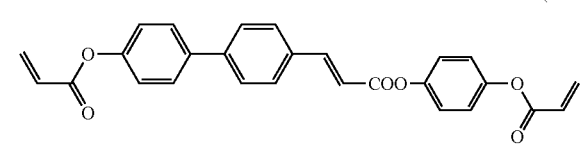
Furthermore, polymerizable compounds represented by formula (M301) to formula (M316) are also preferable.
[Chem. 68]
(M301)
(M302)
(M303)
(M304)
(M305)

(M306)
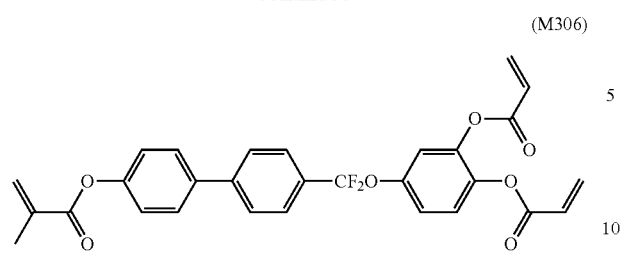
(M307)
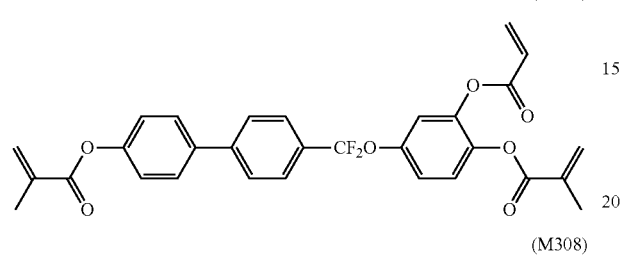
(M308)
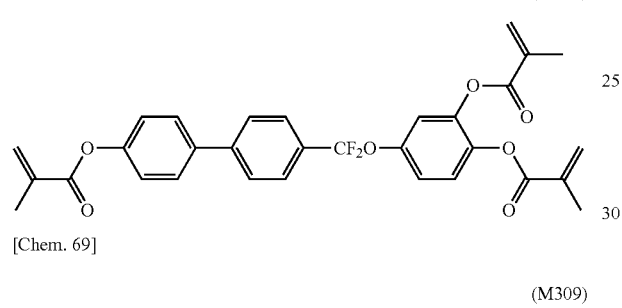
[Chem. 69]
(M309)
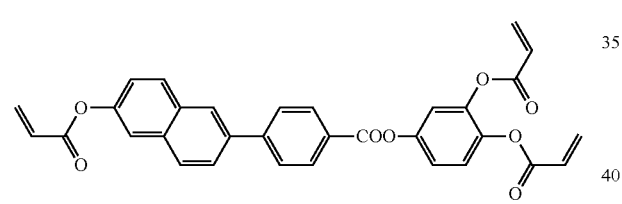
(M310)
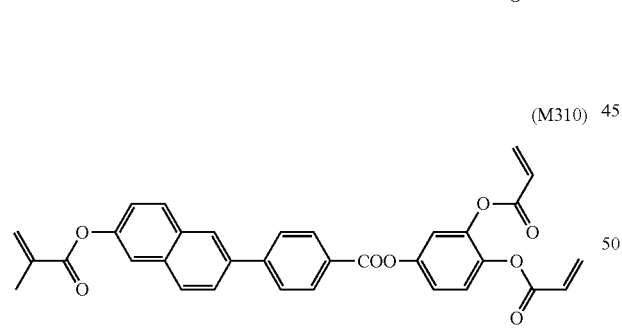
(M311)
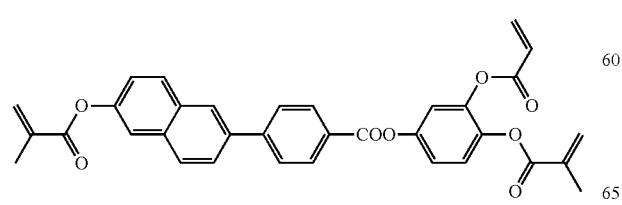
(M312)
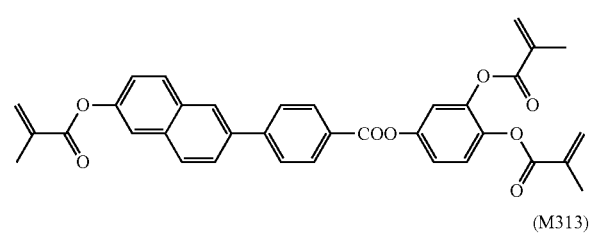
(M313)
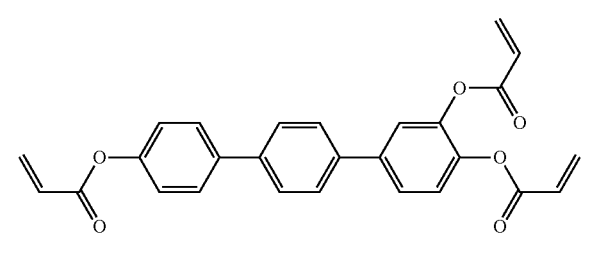
(M314)
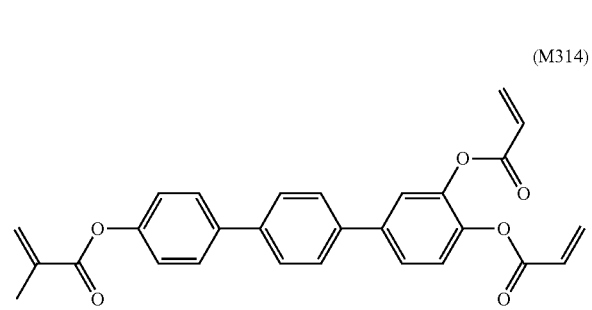
(M315)
(M316)
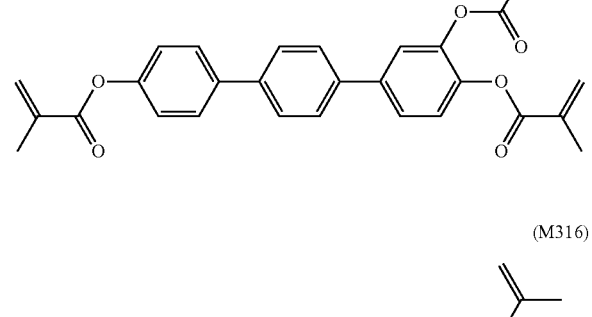
In formula (M301) to formula (M316), hydrogen atoms in the 1,4-phenylene group and the naphthalene group may each be further substituted with —F, —Cl, —CF$_3$, or —CH$_3$.
Polymerizable compounds such as those represented by formula (Ia-1) to formula (Ia-31) are also preferable.

[Chem. 70]
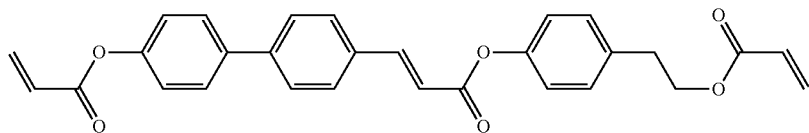
(Ia-1)
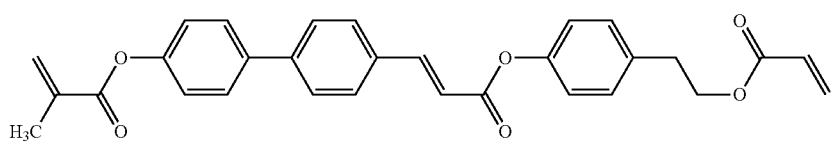
(Ia-2)
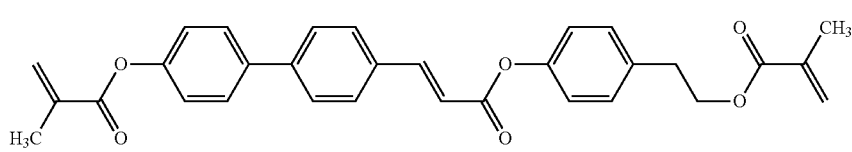
(Ia-3)
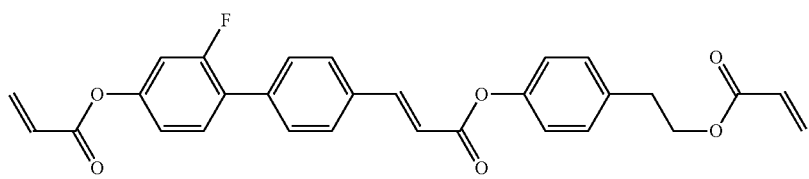
(Ia-4)
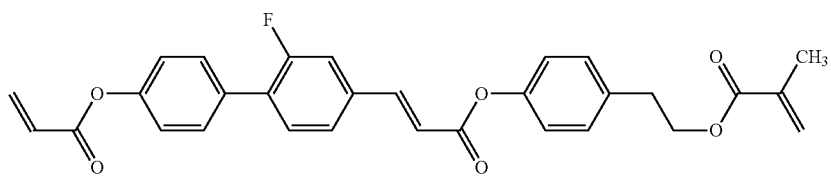
(Ia-5)
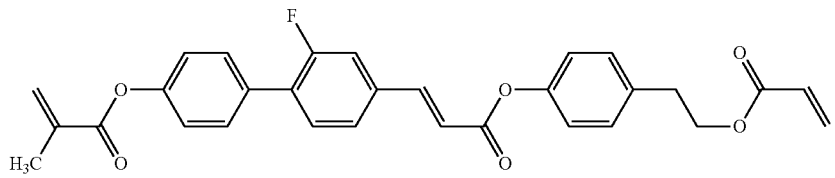
(Ia-6)
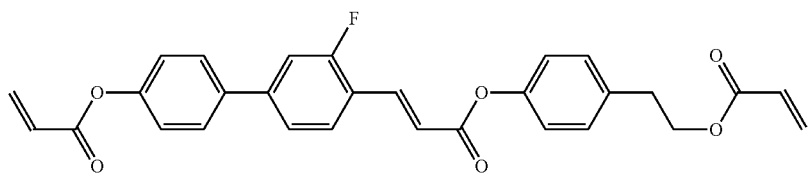
(Ia-7)
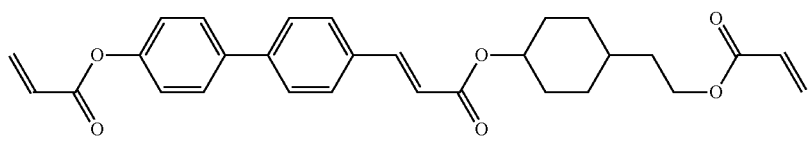
(Ia-8)
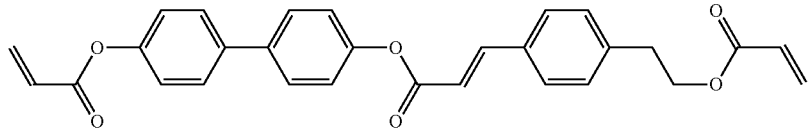
(Ia-9)

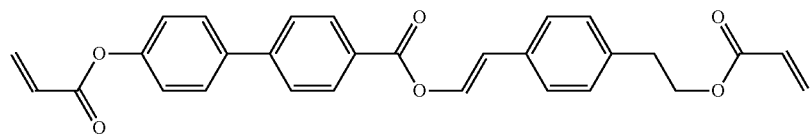 (Ia-10)
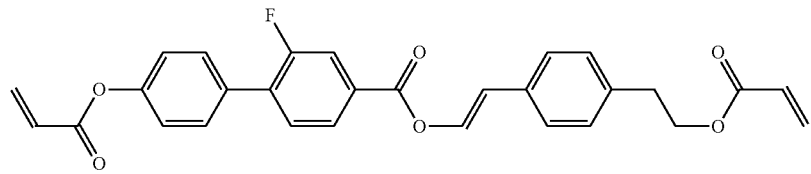 (Ia-11)
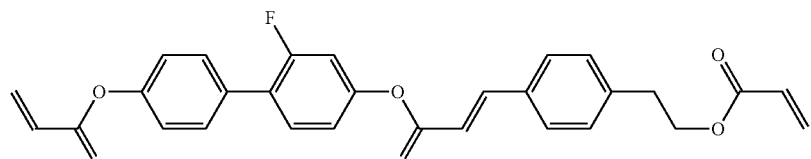 (Ia-12)
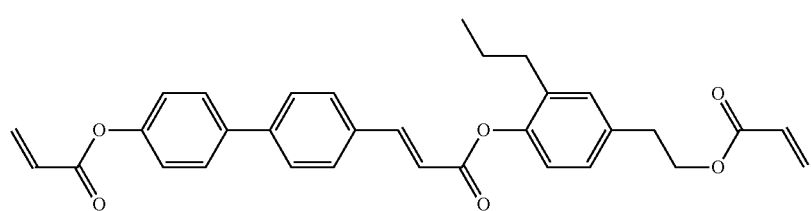 (Ia-13)
[Chem. 71]
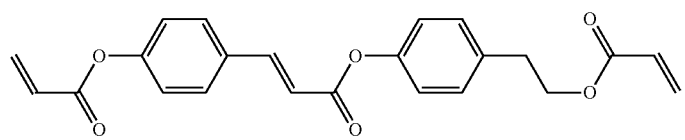 (Ia-14)
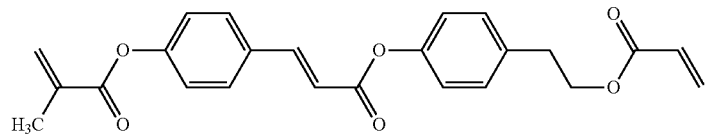 (Ia-15)
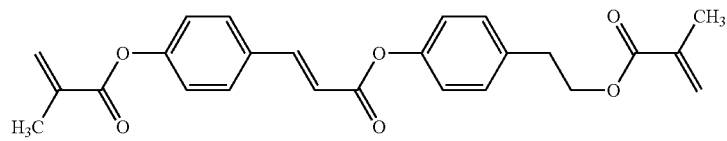 (Ia-16)
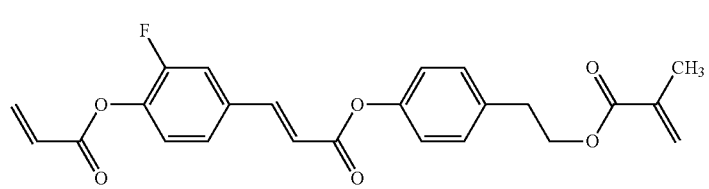 (Ia-17)
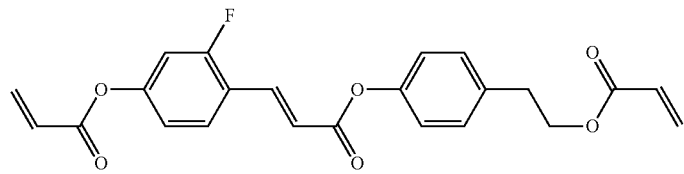 (Ia-18)

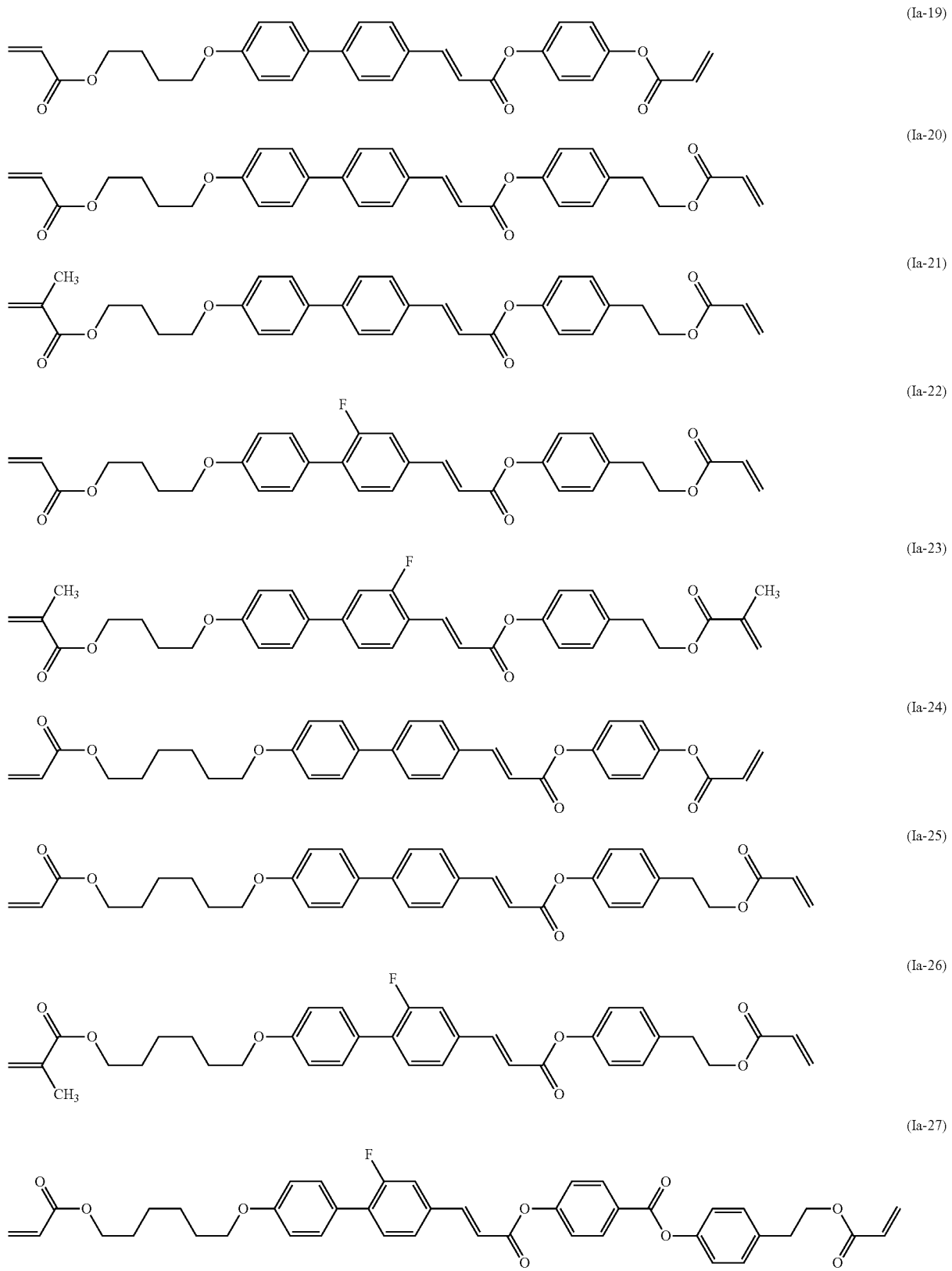

-continued (Ia-28)
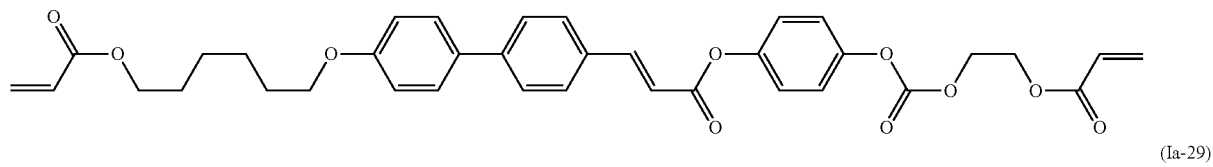

(Ia-29)
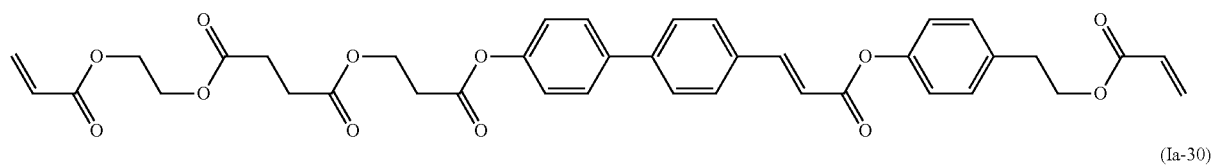

(Ia-30)
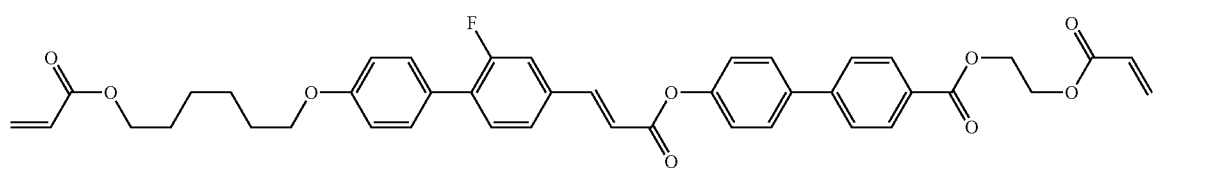

[Chem. 73]

(Ia-31)
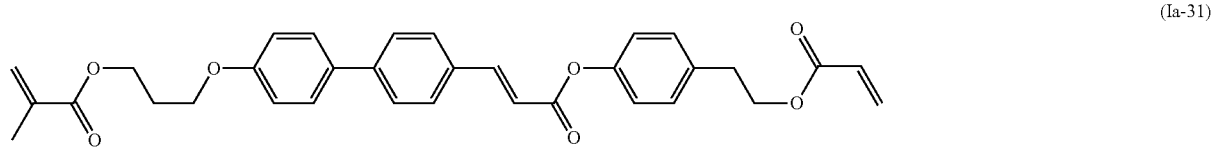

The liquid crystal composition of the present invention may contain, in addition to the compounds described above, common nematic liquid crystal, smectic liquid crystal, cholesteric liquid crystal, an antioxidant, a UV absorber, a photostabilizer, an infrared absorber, etc.

Examples of the antioxidant include hindered phenols represented by general formula (H-1) to general formula (H-4).

[Chem. 74]

(H-1)
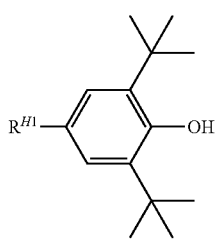

(H-2)
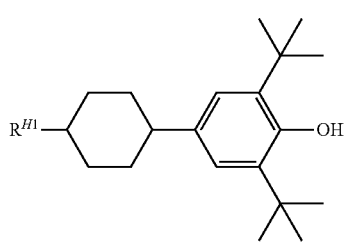

-continued (H-3)
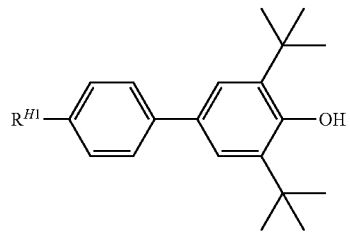

(H-4)
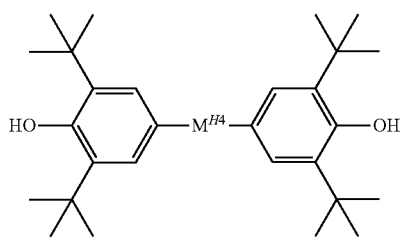

In general formula (H-1) to general formula (H-4), $R^{H1}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms. One —$CH_2$— or two or more non-adjacent —$CH_2$— present in the group may each independently be substituted with —O— or —S—, and one or more hydrogen atoms present in the group may each independently be substituted with a fluorine atom or a chlorine atom. More specifically, an alkyl group having 2 to 7 carbon atoms, an alkoxy group having 2 to 7 carbon atoms, an alkenyl group having 2 to 7 carbon atoms, or an alkenyloxy group having 2 to 7 carbon atoms is preferable. An alkyl group having 3 to 7 carbon atoms or an alkenyl group having 2 to 7 carbon atoms is more preferable.

In general formula (H-4), $M^{H4}$ represents an alkylene group having 1 to 15 carbon atoms (one or more —$CH_2$— in the alkylene group may each be substituted with —O—, —CO—, —COO—, or —OCO— as long as oxygen atoms are not directly adjacent to each other), —$OCH_2$—, —$CH_2O$—, —COO—, —OCO—, —$CF_2O$—, —$OCF_2$—, —$CF_2CF_2$—, —CH=CH—COO—, —CH=CH—OCO—, —COO—CH=CH—, —OCO—CH=CH—, —CH=CH—, —C≡C—, a single bond, a 1,4-phenylene group (any hydrogen atom in the 1,4-phenylene group may be substituted with a fluorine atom), or a trans-1,4-cyclohexylene group, but preferably represents an alkylene group having 1 to 14 carbon atoms. Considering volatility, the number of carbon atoms is preferably large. Considering viscosity, the number of carbon atoms is preferably not excessively large. Thus, the number of carbon atoms is more preferably 2 to 12, more preferably 3 to 10, more preferably 4 to 10, more preferably 5 to 10, and more preferably 6 to 10.

In general formula (H-1) to general formula (H-4), one —CH= or two or more non-adjacent —CH= in the 1,4-phenylene group may each be substituted with —N=. Hydrogen atoms in the 1,4-phenylene group may each independently be substituted with a fluorine atom or a chlorine atom.

In general formula (H-1) to general formula (H-4), one —$CH_2$— or two or more non-adjacent —$CH_2$— in the 1,4-cyclohexylene group may each be substituted with —O— or —S—. In the 1,4-cyclohexylene group, hydrogen atoms may each independently be substituted with a fluorine atom or a chlorine atom.

Specific examples are formula (H-11) to formula (H-15).

[Chem. 75]

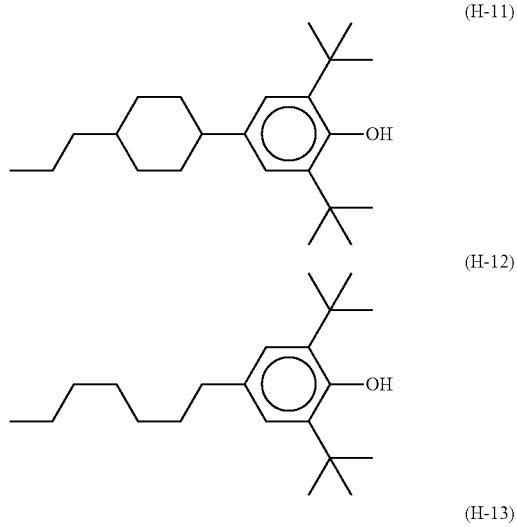

(H-11)

(H-12)

(H-13)

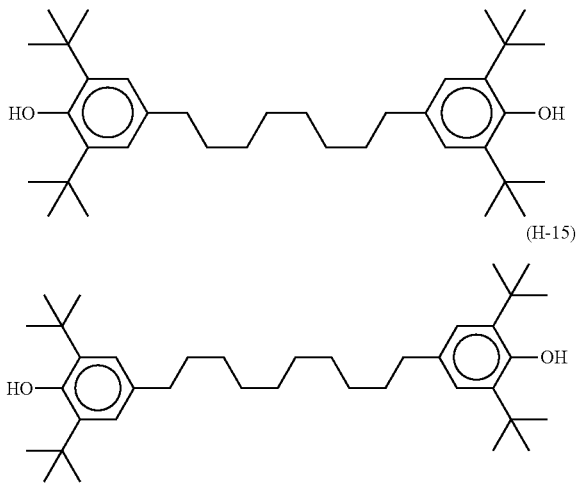

(H-14)

(H-15)

When the liquid crystal composition of the present invention contains an antioxidant, the content thereof is preferably 10 ppm by mass or more, preferably 20 ppm by mass or more, and preferably 50 ppm by mass or more. The upper limit when the antioxidant is contained is 10000 ppm by mass, but is preferably 1000 ppm by mass, preferably 500 ppm by mass, and preferably 100 ppm by mass.

The liquid crystal composition of the present invention has a dielectric anisotropy (Δε) at 25° C. of −2.0 to −8.0, preferably −2.0 to −6.0, more preferably −2.0 to −5.0, and most preferably −2.5 to −5.0.

The refractive index anisotropy (Δn) of the liquid crystal composition of the present invention at 25° C. is 0.08 to 0.14, but is more preferably 0.09 to 0.13 and yet more preferably 0.09 to 0.12. More specifically, in order to comply with a small cell gap, it is preferably 0.10 to 0.13, and in order to comply with a large cell gap, it is preferably 0.08 to 0.10.

The viscosity of the liquid crystal composition of the present invention at 20° C. is 10 to 50 mPa·s, but is preferably 10 to 45 mPa·s, preferably 10 to 40 mPa·s, preferably 10 to 35 mPa·s, preferably 10 to 30 mPa·s, more preferably 10 to 25 mPa·s, and yet more preferably 10 to 22 mPa·s.

The rotational viscosity ($γ_1$) of the liquid crystal composition of the present invention at 25° C. is 50 to 160 mPa·s, but is preferably 55 to 160 mPa·s, preferably 60 to 160 mPa·s, preferably 60 to 150 mPa·s, preferably 60 to 140 mPa·s, preferably 60 to 130 mPa·s, preferably 60 to 125 mPa·s, more preferably 60 to 120 mPa·s, more preferably 60 to 115 mPa·s, more preferably 60 to 110 mPa·s, and yet more preferably 60 to 100 mPa·s.

The nematic phase-isotropic liquid phase transition temperature ($T_{ni}$) of the liquid crystal composition of the present invention is 60° C. to 120° C., but is preferably 70° C. to 100° C. and more preferably 70° C. to 85° C.

A liquid crystal display element that uses the liquid crystal composition of the present invention has a notable feature, i.e., high-speed response. Furthermore, a satisfactory tilt angle is obtained, there are no or very little residual monomers, and the voltage holding ratio (VHR) is high. Thus, issues such as alignment defects and display defects do not arise or are satisfactorily suppressed. Since the tilt angle and the residual monomers can be controlled easily, the energy

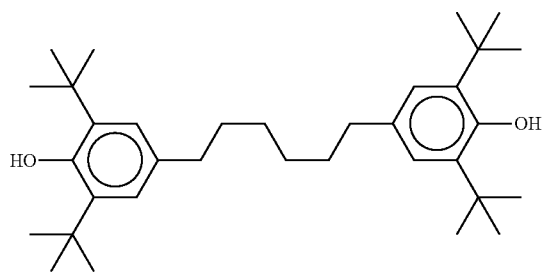

cost for production is easily optimized and reduced. Thus, the liquid crystal display element is optimum for improving the production efficiency and for mass production.

A liquid crystal display element that uses the liquid crystal composition of the present invention is particularly useful in active matrix-driving liquid crystal display elements and can be used in liquid crystal display elements of PSA mode, PSVA mode, VA mode, PS-IPS mode, or PS-FFS mode.

Two substrates of a liquid crystal cell used in the liquid crystal display element can be formed of flexible transparent material such as a plastic. One of the substrates may be formed of a non-transparent material such as silicon. A transparent substrate that has a transparent electrode layer can be obtained by, for example, sputtering indium tin oxide (ITO) on a transparent substrate such as a glass plate.

A color filter can be manufactured by a pigment dispersing method, a printing method, an electrodeposition method, a dyeing method, or the like. For example, according to a method for manufacturing a color filter by a pigment dispersing method, a curable color composition for a color filter is applied to the transparent substrate, patterning is performed, and the composition is cured under heating or irradiation with light. This process is performed for each of three colors, red, green and blue, to manufacture pixel portions for a color filter. In addition, pixel electrodes that include active elements, such as TFTs, thin-film diodes, metal-insulator-metal resistive elements, etc., can be formed on the substrate.

The substrates are arranged to face each other with the transparent electrode layer facing inward. During this process, a spacer may be used to adjust the gap between the substrates. In this case, the adjustment is preferably made so that the thickness of the photochromic layer is 1 to 100 μm. The thickness is more preferably 1.5 to 10 μm. When a polarizer is used, the product of the refractive index anisotropy Δn of the liquid crystal and the cell thickness d is preferably adjusted to maximize the contrast. When two polarizers are provided, the polarizing axis of each polarizer can be adjusted to improve the viewing angle and contrast. Moreover, a retardation film can be used to widen the viewing angle. Examples of the spacer include glass particles, plastic particles, alumina particles, and photoresist materials. Then a sealing agent such as an epoxy-based thermosetting composition is screen-printed onto the substrate while leaving a liquid crystal injection inlet, the substrates are bonded to each other, and the sealing agent is cured under heating.

Examples of the method for injecting the liquid crystal composition into a gap between the two substrates include a common vacuum injection method and an ODF method.

In order to obtain satisfactory liquid crystal alignment performance, an appropriate polymerization rate is desirable. Thus, the method for polymerizing the polymerizable compound contained in the liquid crystal composition of the present invention is preferably a polymerization method that involves applying an active energy ray, such as an ultraviolet ray or an electron beam, or two or more such active energy rays simultaneously or sequentially. When ultraviolet rays are used, a polarized light source or an unpolarized light source may be used. When polymerization is conducted by having the liquid crystal composition interposed between the two substrates, at least the irradiation-side substrate must have transparency appropriate for the active energy ray. Alternatively, after a particular part only is polymerized through a mask under irradiation with light, the conditions such as an electric field, a magnetic field, a temperature, etc., may be changed to change the alignment state of the unpolymerized portion, and then an active energy ray may be applied to conduct polymerization. In particular, in conducting ultraviolet ray exposure, it is preferable to apply an AC electric field to the liquid crystal composition during ultraviolet ray exposure. The AC electric field applied is preferably AC having a frequency of 10 Hz to 10 kHz and more preferably 60 Hz to 10 kHz. The voltage is selected depending on the desired pretilt angle of the liquid crystal display element. In other words, the pretilt angle of the liquid crystal display element can be controlled by adjusting the voltage applied. In a MVA-mode liquid crystal display element, the pretilt angle is preferably controlled to 80° to 89.9° from the viewpoints of alignment stability and contrast.

The temperature during irradiation is preferably within a temperature range at which the liquid crystal state of the liquid crystal composition according to the present invention is maintained. Polymerization is preferably conducted at a temperature near room temperature, i.e., typically 15° C. to 35° C. Examples of the lamp used to generate an ultraviolet ray include a metal halide lamp, a high-pressure mercury lamp, and an ultra-high-pressure mercury lamp. The ultraviolet ray applied is preferably an ultraviolet ray in the wavelength range outside the absorption wavelength range of the liquid crystal composition. If needed, some part of the ultraviolet ray may be cut before use. The intensity of the ultraviolet ray applied is preferably 0.1 mW/cm$^2$ to 100 W/cm$^2$ and more preferably 2 mW/cm$^2$ to 50 W/cm$^2$. The amount of energy of the ultraviolet ray applied can be appropriately adjusted but is preferably 10 mJ/cm$^2$ to 500 J/cm$^2$ and more preferably 100 mJ/cm$^2$ to 200 J/cm$^2$. In applying the ultraviolet ray, the intensity may be varied. The time the ultraviolet ray is applied is appropriately selected based on the intensity of the ultraviolet ray applied, but is preferably 10 to 3600 seconds and more preferably 10 to 600 seconds.

EXAMPLES

The present invention will now be described in detail through Examples which do not limit the present invention. Note that "%" for the compositions of Examples and Comparative Examples below denotes "% by mass".

In Examples, the following abbreviations are used to describe compounds.
(Side chain)
    -n —$C_nH_{2n+1}$ a linear alkyl group having n carbon atoms
    n- $C_nH_{2n+1}$— a linear alkyl group having n carbon atoms
    -On —$OC_nH_{2n+1}$ a linear alkoxy group having n carbon atoms
    nO- $C_nH_{2n+1}$O— a linear alkoxy group having n carbon atoms
    —V —CH=CH$_2$
    V— CH$_2$=CH—
    —V1 —CH=CH—CH$_3$
    1V— CH$_3$—CH=CH—
    -2V —CH$_2$—CH$_2$—CH=CH$_2$
    V2- CH$_2$=CH—CH$_2$—CH$_2$—
    -2V1 —CH$_2$—CH$_2$—CH=CH—CH$_3$
    1V2- CH$_3$—CH=CH—CH$_2$—CH$_2$—
    —F —F
    —OCF$_3$ —OCF$_3$
(Linking group)
    —CF2O— —CF$_2$—O—
    —OCF2— —O—CF$_2$—
    -1O— —CH$_2$—O—
    —O1- —O—CH$_2$—
    —COO— —COO—

(Ring structure)

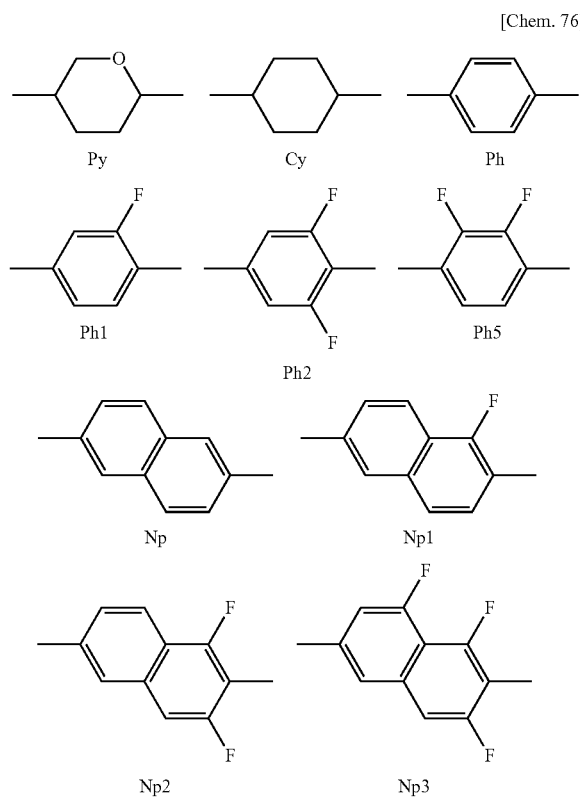
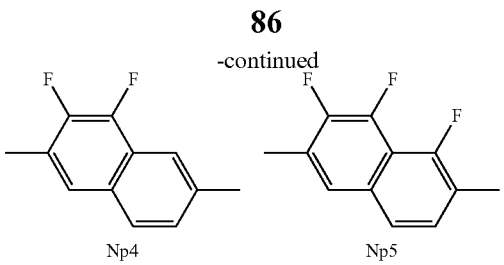

The properties measured in Examples are as follows.

$T_{ni}$: nematic phase-isotropic liquid phase transition temperature (° C.)
Δn: refractive index anisotropy at 20° C.
η: viscosity at 20° C. (mPa·s)
$γ_1$: rotational viscosity at 20° C. (mPa·s)
Δε: dielectric anisotropy at 25° C.
$K_{33}$: elastic modulus $K_{33}$ at 20° C. (pN)
Residual monomer (UV1 condition): amount (ppm) of monomers after irradiation of 24 J UV with a high-pressure mercury lamp
Residual monomer (UV2 condition): amount (ppm) of monomers after irradiation of 36 J UV with a high-pressure mercury lamp
VHR (UV): voltage holding ratio after 12 (J) UV irradiation with a high-pressure mercury lamp
A high-pressure mercury lamp, USH-500BY1 produced by USHIO INC., was used.

Comparative Example 1, Comparative Example 2, Example 1, and Example 2

Liquid crystal compositions LC-R1 (Comparative Example 1), LC-R2 (Comparative Example 2), LC-1 (Example 1), and LC-2 (Example 2) were prepared and their physical property values were measured. The configurations of the liquid crystal compositions and the physical property values are as shown in Table 1.

TABLE 1

|  |  | LC-001 | Comparative Example 1 LC-R1 | Comparative Example 2 LC-R2 | Example 1 LC-1 | Example 2 LC-2 |
| --- | --- | --- | --- | --- | --- | --- |
| LC-001 | Liquid crystal composition | — | 99.6 | 99.6 | 99.6 | 99.6 |
| RM-R1 | General formula (I-42) | — | 0.4 | — | — | — |
| RM-R2 | General formula (I-41) | — | — | 0.4 | — | — |
| RM-1 | General formula (I-1) | — | — | — | 0.2 | — |
| RM-2 | General formula (I-1) | — | — | — | 0.2 | — |
| RM-6 | General formula (I-1) | — | — | — | — | 0.2 |
| RM-7 | General formula (I-1) | — | — | — | — | 0.2 |
| 2-Cy-Cy-V1 | General formula (II) | 6 | — | — | — | — |
| 3-Cy-Cy-V | General formula (II) | 21 | — | — | — | — |
| 3-Cy-Cy-V1 | General formula (II) | 6 | — | — | — | — |
| 3-Ph-Ph-1 | General formula (IV-F) | 3 | — | — | — | — |
| 3-Cy-Ph-Ph-2 | General formula (IV-H) | 3 | — | — | — | — |
| 3-Cy-Ph5-O2 | General formula (III-A3) | 8 | — | — | — | — |
| 3-Ph-Ph5-O2 | General formula (III-A4) | 8 | — | — | — | — |
| 2-Cy-Cy-Ph5-O2 | General formula (III-B4) | 15 | — | — | — | — |
| 2-Cy-Cy-Ph5-O3 | General formula (III-B4) | 15 | — | — | — | — |
| 3-Cy-Ph-Ph5-O3 | General formula (III-B5) | 6 | — | — | — | — |
| 3-Ph-Ph5-Ph-2 | General formula (V) | 9 | — | — | — | — |
| Total |  | 100 | 100 | 100 | 100 | 100 |
| Tni | [° C.] | 74.4 | 74.2 | 74.3 | 74.3 | 74.4 |
| Δn |  | 0.104 | 0.104 | 0.104 | 0.104 | 0.104 |
| η [mPa · s] | [mPa · s] | 19.1 | 19.0 | 19.2 | 19.1 | 19.1 |
| γ1 [mPa · s] | [mPa · s] | 82 | 82 | 81 | 83 | 82 |

TABLE 1-continued
|  |  | LC-001 | Comparative Example 1 LC-R1 | Comparative Example 2 LC-R2 | Example 1 LC-1 | Example 2 LC-2 |
|---|---|---|---|---|---|---|
| Δε |  | −2.7 | −2.7 | −2.7 | −2.7 | −2.7 |
| K33 [pN] | [pN] | 13.9 | 13.9 | 13.8 | 14.0 | 14.1 |
| γ1/K33 |  | 5.9 | 5.9 | 5.9 | 5.9 | 5.8 |
| Residual monomer (UV1 condition) | [ppm] | — | 355 | 313 | 0 | 139 |
| VHR (UV) | [%] | 95 | 97 | 97 | 97 | 97 |
[Chem. 77]
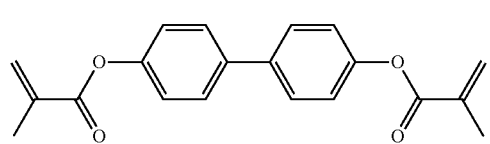
RM-R1
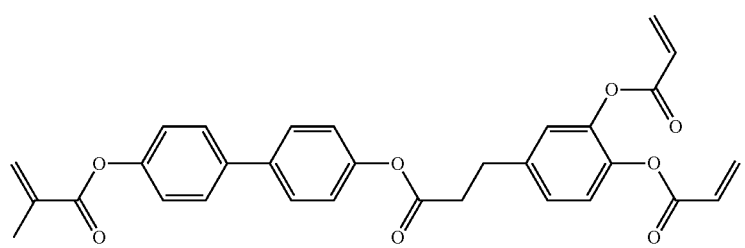
RM-R2
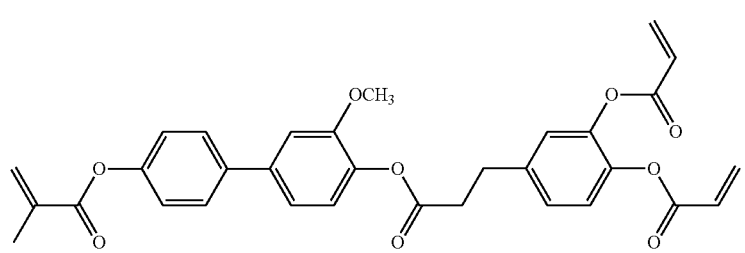
RM-1
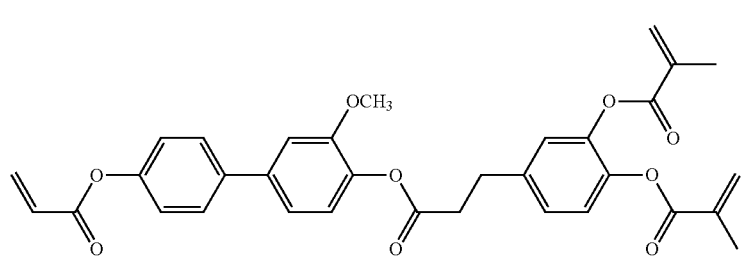
RM-2
[Chem. 78]
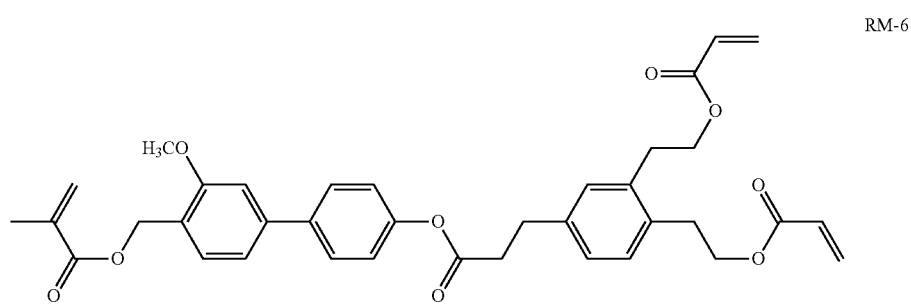
RM-6

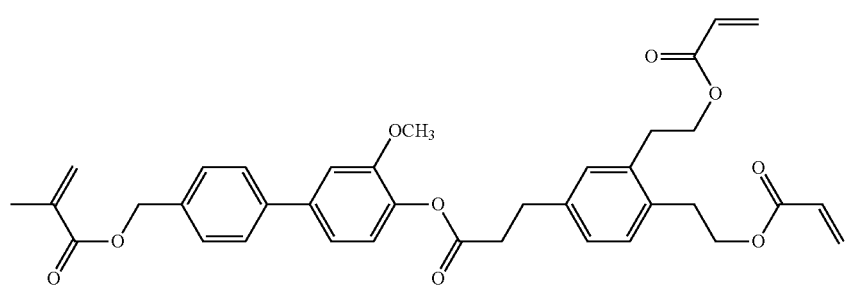
RM-7

The liquid crystal compositions LC-1 and LC-2 according to the present invention maintained the physical property values of LC-001, and if was confirmed that the amount of the residual monomers (UV1 condition) was zero or very small and that the voltage holding ratio (VHR) was high. It was confirmed by a measurement instrument PAS-301 produced by ELSICON, Inc., that a sufficient pretilt angle was formed and that the stability of the pretilt angle was high. The results suggested that image sticking caused by instability of the pretilt angle was eliminated.

In contrast, according to LC-R1, i.e., Comparative Example 1, and LC-R2, i.e., Comparative Example 2, a large quantity of residual monomers (UV1 condition) were found, and this suggested that there was a high possibility that one of serious display defects, image sticking, would occur. The response speeds of the liquid crystal display elements produced by using these compositions were measured and it was confirmed that the response speed was satisfactorily high. The cell thickness was 3.5 um, the alignment film was JALS2096, and the measurement conditions of the response speed were Von of 6 V, Voff of 1 V, and measurement temperature of 25° C. The measurement instrument used was DMS703 produced by AUTRONIC-MELCHERS.

Comparative Example 3, Example 3, Example 4, and Example 5

Liquid crystal compositions LC-R3 (Comparative Example 3), LC-3 (Example 3), LC-4 (Example 4), and LC-5 (Example 5) were prepared and their physical property values were measured. The configurations of the liquid crystal compositions and the results of the physical property values are as shown in Table 2.

TABLE 2

|  |  | LC-003 | Comparative Example 3 LC-R3 | Example 3 LC-3 | Example 4 LC-4 | Example 5 LC-5 |
|---|---|---|---|---|---|---|
| LC-003 | Liquid crystal composition | — | 99.7 | 99.7 | 99.7 | 99.7 |
| RM-R3 | General formula (I-42) | — | 0.3 | — | — | — |
| RM-1 | General formula (I-1) | — | — | 0.3 | — | 0.1 |
| RM-2 | General formula (I-1) | — | — | — | 0.3 | 0.1 |
| RM-3 | General formula (I-1) | — | — | — | — | 0.1 |
| 2-Cy-Cy-V1 | General formula (II) | 15 | — | — | — | — |
| 3-Cy-Cy-V | General formula (II) | 10 | — | — | — | — |
| 3-Cy-Cy-V1 | General formula (II) | 14 | — | — | — | — |
| 3-Ph-Ph-1 | General formula (IV-F) | 8 | — | — | — | — |
| 0d1-Cy-Ph-Ph-3 | General formula (IV-H) | 10 | — | — | — | — |
| 3-Cy-1O-Ph5-O2 | General formula (III-A) | 6 | — | — | — | — |
| 1d1-Cy-1O-Ph5-O1 | General formula (III-A) | 5 | — | — | — | — |
| 1d1-Cy-1O-Ph5-O2 | General formula (III-A) | 5 | — | — | — | — |
| 3-Cy-Cy-1O-Ph5-O2 | General formula (III-B1) | 13 | — | — | — | — |
| 0d1-Cy-Cy-1O-Ph5-O1 | General formula (III-B1) | 7 | — | — | — | — |
| 0d1-Cy-Cy-1O-Ph5-O2 | General formula (III-B1) | 7 | — | — | — | — |
| 3-Ph-Ph5-Ph-2 | General formula (V) | — | — | — | — | — |
| Total |  | 100 | 100 | 100 | 100 | 100 |
| Tni | [° C.] | 75.0 | 74.9 | 74.9 | 74.8 | 75.0 |
| Δn |  | 0.097 | 0.097 | 0.097 | 0.097 | 0.097 |
| η [mPa · s] | [mPa · s] | 14.5 | 14.4 | 14.5 | 14.6 | 14.5 |
| γ1 [mPa · s] | [mPa · s] | 82 | 83 | 83 | 82 | 81 |
| Δε |  | −3.0 | −3.0 | −3.0 | −3.0 | −3.0 |
| K33 [pN] | [pN] | 15.8 | 15.7 | 16.0 | 15.8 | 15.8 |
| γ1/K33 |  | 5.2 | 5.3 | 5.2 | 5.2 | 5.1 |
| Residual monomer (UV2 condition) | [ppm] | — | 674 | 190 | 202 | 132 |
| VHR (UV) | [%] | 95 | 93 | 96 | 96 | 97 |

[Chem. 79]

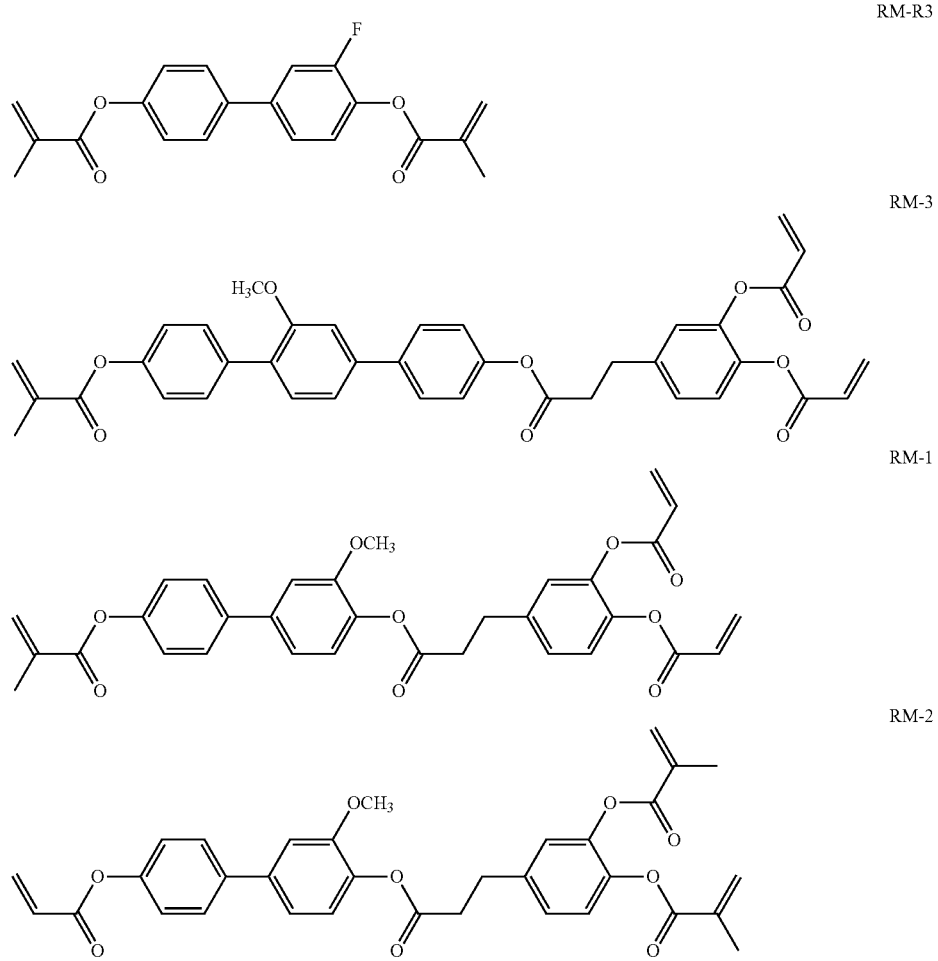

According to the liquid crystal compositions LC-3, LC-4, and LC-5 of the present invention, the amount of the residual monomer (UV2 condition) was half or less than half compared to LC-R3 and this suggested that there was a lower possibility that one of serious display defects, image sticking, would occur. Moreover, a high voltage holding ratio (VHR) was confirmed. Formation of a satisfactory pretilt angle was confirmed by a measurement instrument PAS-301 produced by ELSICON, Inc., and it was also confirmed that the stability of the pretilt angle was high. This suggested that image sticking caused by instability of the pretilt would not occur.

The response speeds of the liquid crystal display elements prepared by using these liquid crystal compositions were measured. If was confirmed that the response speed was satisfactorily high. The cell thickness was 3.5 um, the alignment film was JALS2096, and the conditions for measuring the response speed were Von of 6 V, Voff of 1 V, and a measurement temperature of 25° C. DMS703 produced by AUTRONIC-MELCHERS was used as the measurement instrument.

Example 6 and Example 7

Liquid crystal compositions LC-6 (Example 6) and LC-7 (Example 7) were prepared and their physical property values were measured. The configurations of the liquid crystal compositions and the results of the physical property values are as shown in Table 3.

TABLE 3

| | | LC-004 | Example 6 LC-6 | Example 7 LC-7 |
|---|---|---|---|---|
| LC-004 | Liquid crystal composition | — | 99.7 | 99.7 |
| RM-1 | General formula (I-1) | — | 0.3 | 0.1 |
| RM-2 | General formula (I-1) | — | — | 0.1 |
| RM-4 | General formula (I-1) | — | — | 0.1 |
| 0d1-Cy-Cy-Ph-1 | General formula (II) | 7 | — | — |
| 0d3-Cy-Cy-Ph-1 | General formula (II) | 17 | — | — |

TABLE 3-continued

|  |  | LC-004 | Example 6 LC-6 | Example 7 LC-7 |
|---|---|---|---|---|
| 2-Cy-Cy-V1 | General formula (II) | 5 | — | — |
| 3-Cy-Cy-V | General formula (II) | 28 | — | — |
| 3-Cy-Cy-V1 | General formula (II) | 5 | — | — |
| 3-Cy-Ph—O2 | General formula (IV-D) | 5 | — | — |
| 3-Ph—Ph2—CF2O—Ph2—F | General formula (M-1) | 3 | — | — |
| 3-Cy-Cy-CF2O—Ph2—F | General formula (M-2) | 8 | — | — |
| 2-Py—Ph—Ph2—CF2O—Ph2—F | General formula (M-3) | 2 | — | — |
| 3-Py—Ph—Ph2—CF2O—Ph2—F | General formula (M-3) | 5 | — | — |
| 3-Ph—Ph1—Ph2—CF2O—Ph2—F | General formula (M-4) | 3 | — | — |
| 4-Ph—Ph1—Ph2—CF2O—Ph2—F | General formula (M-4) | 4 | — | — |
| 3-Cy-Cy-Ph—OCF3 | General formula (M-5) | 4 | — | — |
| 3-Cy-Cy-Ph1—Ph2—F | General formula (M-8) | 2 | — | — |
| 3-Ph—Ph—Ph1—Ph2—F | General formula (M-8.52) | 2 | — | — |
| Total |  | 100 | 100 | 100 |
| Tni | [° C.] | 97 | 97 | 97 |
| Δn |  | 0.103 | 0.103 | 0.103 |
| γ1 [mPa · s] | [mPa · s] | 99 | 99 | 99 |
| Δε |  | 7.5 | 7.5 | 7.5 |
| K33 [pN] | [pN] | 18.5 | 18.5 | 18.5 |
| γ1/K33 |  | 5.4 | 5.4 | 5.4 |
| Residual monomer (UV1 condition) | [ppm] | — | 29 | 0 |
| VHR (UV) | [%] | 97 | 98 | 99 |

[Chem. 80]

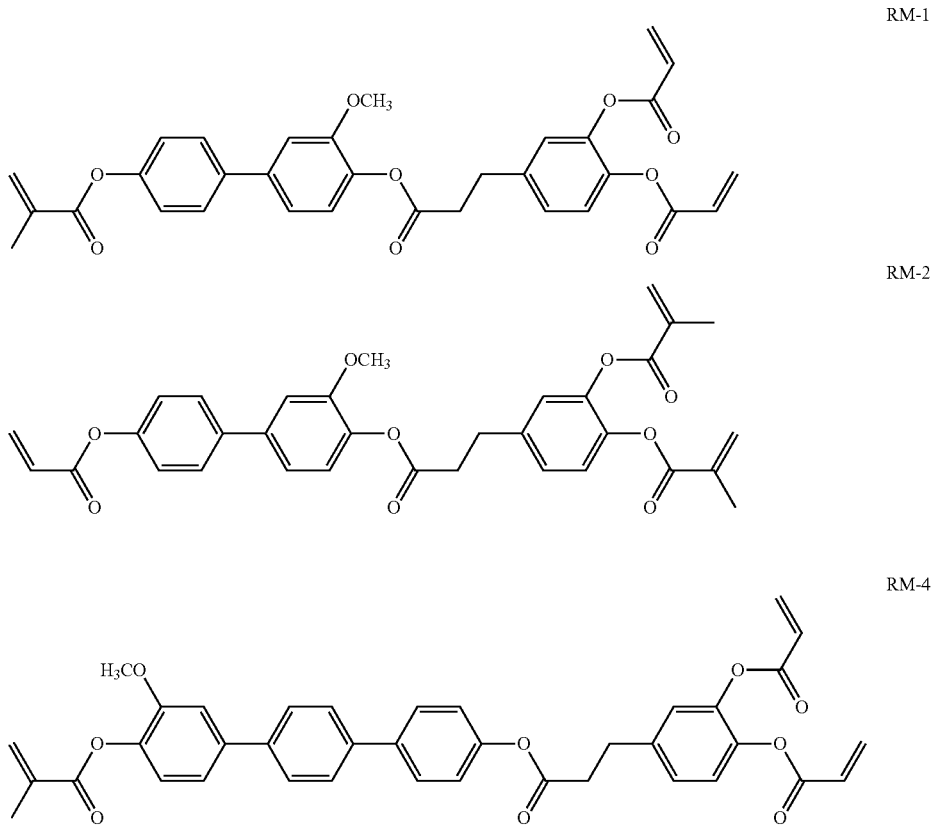

RM-1

RM-2

RM-4

According to the liquid crystal compositions LC-6 and LC-7 of the present invention, the amount of the residual monomer (UV1 condition) was small, and this suggested that there was a low possibility that one of serious display defects, image sticking, would occur. Moreover, a high voltage holding ratio (VHR) was confirmed. Formation of a satisfactory pretilt angle was confirmed by a measurement instrument PAS-301 produced by ELSICON, Inc.

The response speeds of the liquid crystal display elements prepared by using these liquid crystal compositions were measured. It was confirmed that the response speed was satisfactorily high. The cell thickness was 3.0 um, the alignment film was SE5300, and the conditions for measuring the response speed were Von of 6 V, Voff of 0 V, and a measurement temperature of 25° C. DMS703 produced by AUTRONIC-MELCHERS was used as the measurement instrument.

Example 8

A liquid crystal composition LC-8 (Example 8) was prepared and its physical property values were measured. The configuration of the liquid crystal composition and the results of the physical property values are as shown in Table 1.

TABLE 4

|  |  | LC-001 | Example 8 LC-8 |
|---|---|---|---|
| LC-001 | Liquid crystal composition | — | 99.7 |
| RM-8 | General formula (I-15-02) | — | 0.3 |
| 2-Cy-Cy-V1 | General formula (II) | 6 | — |
| 3-Cy-Cy-V | General formula (II) | 21 | — |
| 3-Cy-Cy-V1 | General formula (II) | 6 | — |
| 3-Ph—Ph-1 | General formula (IV-F) | 3 | — |
| 3-Cy-Ph—Ph-2 | General formula (IV-H) | 3 | — |
| 3-Cy-Ph5—O2 | General formula (III-A3) | 8 | — |
| 3-Ph—Ph5—O2 | Generel formula (III-A4) | 8 | — |
| 2-Cy-Cy-Ph5—O2 | General formula (III-B4) | 15 | — |
| 2-Cy-Cy-Ph5—O3 | General formula (III-B4) | 15 | — |
| 3-Cy-Ph—Ph5—O3 | General formula (III-B5) | 6 | — |
| 3-Ph—Ph5—Ph-2 | Generel formula (V) | 9 | — |
| Total |  | 100 | 100 |
| Tni | [° C.] | 74.4 | 74.3 |
| Δn |  | 0.104 | 0.104 |
| η [mPa · s] | [mPa · s] | 19.1 | 19.1 |
| γ1 [mPa · s] | [mPa · s] | 82 | 83 |
| Δε |  | −2.7 | −2.7 |
| K33 [pN] | [pN] | 13.9 | 14.0 |
| γ1/K33 |  | 5.9 | 5.9 |
| Residual monomer (UV1 condition) | [ppm] | — | 53 |
| VHR (UV) | [%] | 95 | 97 |

[Chem. 81]

RM-8

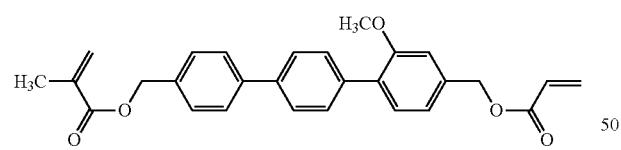

The liquid crystal composition LC-8 according to the present invention maintained the physical property values of LC-001, and it was confirmed that the amount of the residual monomers (UV1 condition) was very small and that the voltage holding ratio (VHR) was high. It was confirmed by a measurement instrument PAS-301 produced by ELSICON, Inc., that a sufficient pretilt angle was formed and that the stability of the pretilt angle was high. The results suggested that image sticking caused by instability of the pretilt angle was eliminated.

The response speed of the liquid crystal display element produced by using this composition was measured and if was confirmed that the response speed was satisfactorily high. The cell thickness was 3.5 um, the alignment film was JALS2096, and the measurement conditions of the response speed were Von of 6 V, Voff of 1 V, and measurement temperature of 25° C. The measurement instrument used was DMS703 produced by AUTRONIC-MELCHERS.

In view of the above, it was confirmed that the liquid crystal composition according to the present invention exhibits a sufficiently low viscosity (η), a sufficiently low rotational viscosity ($\gamma_1$), a large elastic modulus ($K_{33}$), and a negative dielectric anisotropy (Δε) having a large absolute value without decreasing the refractive index anisotropy (Δn) and the nematic phase-isotropic liquid phase transition temperature ($T_{ni}$). It was also confirmed that a liquid crystal display element of a VA type, PSVA type, PSA type, TN type, or IPS type prepared by using the liquid crystal composition exhibits a satisfactory pretilt angle, has no or less residual monomers, and has a high voltage holding ratio (VHR), high display quality, and high response speed.

The invention claimed is:
1. A liquid crystal composition comprising at least one polymerizable compound represented by general formula (I-1):

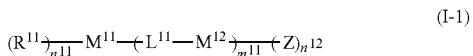

wherein Z represents a hydrogen atom, an alkyl group having 1 to 12 carbon atoms, an alkoxy group having 1 to 12 carbon atoms, or $P^{12}$-$S^{12}$-, $R^{11}$ represents $P^{11}$-$S^{11}$-, and $P^{11}$ and $P^{12}$ each independently represent a group selected from the group consisting of formulae (R-1) to formula (R-15):

(R-1)

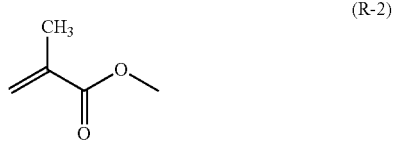

(R-2)

(R-3)

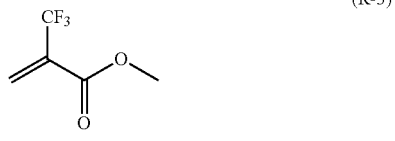

(R-4)

(R-5)

(R-6)

(R-7)

(R-8)

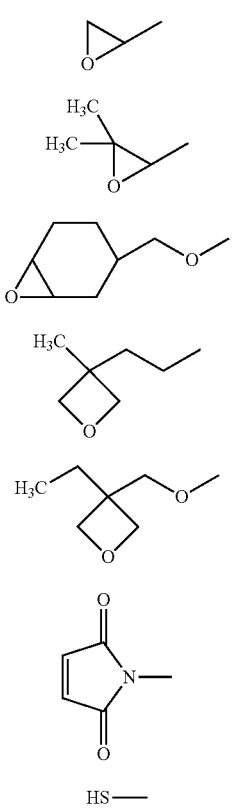

(R-9)

(R-10)

(R-11)

(R-12)

(R-13)

(R-14)

(R-15)

$S^{11}$ and $S^{12}$ each independently represent a single bond or an alkylene group having 1 to 15 carbon atoms, and one —CH$_2$— or two or more non-adjacent —CH$_2$— in the alkylene group may each be substituted with —O—, —OCO—, or —COO— as long as oxygen atoms are not directly adjacent to each other, $n^{11}$ represents an integer of 1 to 3, $n^{12}$ represents an integer of 1 to 3, and $m^{11}$ represents an integer of 1 to 2, $M^{11}$ represents a 1,4-phenylene group; however, when $n^{11}$ represents 2 or 3, $M^{11}$ further has a bond at any desired position in the 1,4-phenylene group, $M^{12}$ each independently represent a 1,4-phenylene group; however, when $n^{12}$ represents 2 or 3, $M^{12}$ bonded to Z further has a bond at any desired position in the 1,4-phenylene group, at least one 1,4-phenylene group selected from the group consisting of $M^{11}$ and $M^{12}$ may be substituted with at least one alkyl group having 1 to 12 carbon atoms, at least one alkoxy group having 1 to 12 carbon atoms, or at least one halogen; however, at least one 1,4-phenylene group selected from the group consisting of $M^{11}$ and $M^{12}$ is substituted with at least one alkoxy group having 1 to 12 carbon atoms, $L^{11}$ represents a single bond, and when two or more $R^{11}$, two or more Z, two or more $L^{11}$, and two or more $M^{12}$ are present, they may each be the same or different.

2. The liquid crystal composition according to claim 1, comprising a compound represented by general formula (II):

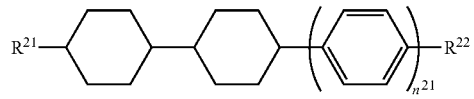
(II)

wherein $R^{21}$ represents an alkyl group having 1 to 10 carbon atoms or an alkenyl group having 2 to 10 carbon atoms, $R^{22}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one —CH$_2$— or two or more non-adjacent —CH$_2$— present in $R^{22}$ may each independently be substituted with —O— or —S—, one or more hydrogen atoms present in $R^{22}$ may each independently be substituted with a fluorine atom or a chlorine atom, and $n^{21}$ represents 0, 1, or 2.

3. The liquid crystal composition according to claim 1, comprising at least one compound selected from the group consisting of compounds represented by general formula (III-1) and/or general formula (III-2):

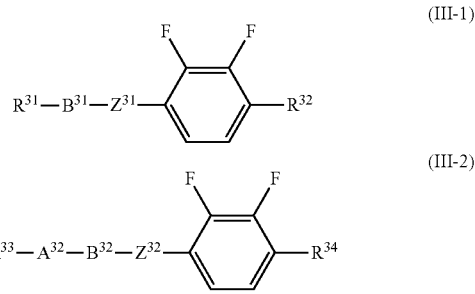

(III-1)

(III-2)

wherein $R^{31}$ to $R^{34}$ each independently represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one —CH$_2$— or two or more non-adjacent —CH$_2$—present in $R^{31}$ to $R^{34}$ may each independently be substituted with —O— or —S—, and one or more hydrogen atoms present in $R^{31}$ to $R^{34}$ may each independently be substituted with a fluorine atom or a chlorine atom, cyclic groups $A^{32}$, $B^{31}$, and $B^{32}$ each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2] octylene group, a piperidine-1,4-diyl group, a naphthalene-2,6-diyl group, a decahydronaphthalene-2,6-diyl group, or a 1,2,3,4-tetrahydronaphthalene-2,6-diyl group, and $Z^{31}$ and $Z^{32}$ each independently represent —OCH$_2$—, —CH$_2$O—, —CF$_2$O—, —OCF$_2$—, —CH$_2$CH$_2$—, —CF$_2$CF$_2$—, or a single bond.

4. The liquid crystal composition according to claim 1, comprising at least one compound selected from the group consisting of compounds represented by general formula (IV-A) to general formula (IV-J):

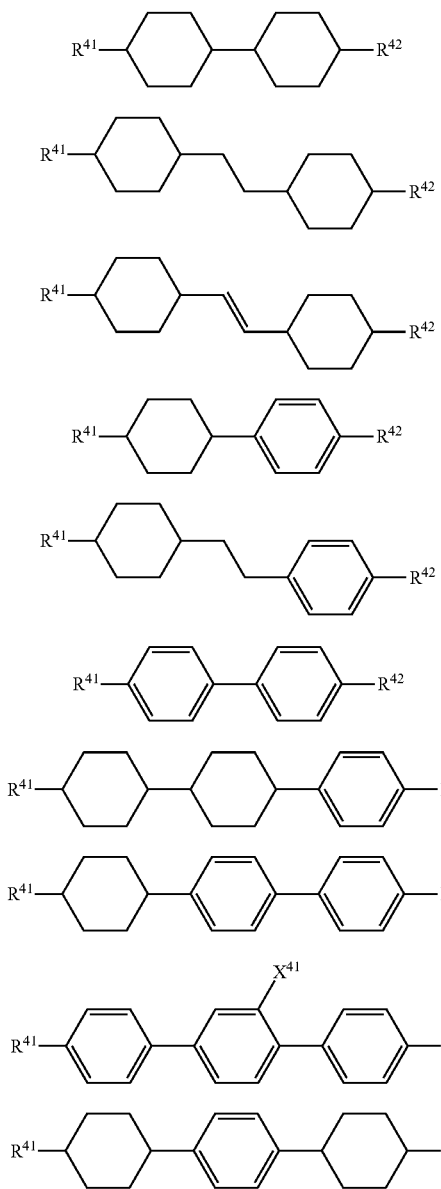

wherein $R^{41}$ and $R^{42}$ each independently represent an alkyl group having 1 to 5 carbon atoms or an alkoxy group having 1 to 5 carbon atoms, and $X^{41}$ represents an alkyl group having 1 to 3 carbon atoms, an alkoxy group having 1 to 3 carbon atoms, a fluorine atom, or a hydrogen atom;

however, compounds represented by general formula (II) are excluded.

5. The liquid crystal composition according to claim 1, wherein the polymerizable compound represented by general formula (I-1) comprises at least one compound selected from the group consisting of compounds represented by general formula (I-31) and general formula (I-32):

wherein $R^{107}$ and $R^{110}$ each represent $P^{13}$—$S^{13}$—,
$R^{108}$, $R^{109}$, $R^{111}$, and $R^{112}$ each independently represent $P^{14}$-$S^{14}$-, an alkyl group having 1 to 5 carbon atoms, an alkoxy group having 1 to 5 carbon atoms, a fluorine atom, or a hydrogen atom, $P^{13}$ and $P^{14}$ are the same as $P^{11}$ and $P^{12}$ defined in general formula (I-1), $S^{13}$ and $S^{14}$ are the same as $S^{11}$ and $S^{12}$ defined in general formula (I-1), and when two or more $P^{13}$, two or more $P^{14}$, two or more $S^{13}$, and two or more $S^{14}$ are present, they may each be the same or different, a cyclic group $A^{12}$ represents a 1,4-phenylene group and may be unsubstituted or substituted with an alkyl group having 1 to 5 carbon atoms, an alkoxy group having 1 to 5 carbon atoms, a halogen, a cyano group, or a nitro group, $L^{14}$ represents a single bond, and at least one selected from the group consisting of $R^{108}$, $R^{109}$, $R^{111}$, $R^{112}$, $X^{15}$, $X^{16}$, $X^{17}$, and $X^{18}$ represents an alkoxy group having 1 to 5 carbon atoms, and/or $A^{12}$ is substituted with at least one alkoxy group having 1 to 5 carbon atoms.

6. A liquid crystal display element that uses the liquid crystal composition according to claim 1.

7. An active matrix-driving liquid crystal display element that uses the liquid crystal composition according to claim 1.

8. A liquid crystal display element of a PSA mode, a PSVA mode, a PS-IPS mode, or a PS-FSS mode, the liquid crystal display element using the liquid crystal composition according to claim 1.

* * * * *